United States Patent [19]
Tanaka et al.

[11] Patent Number: 5,610,841
[45] Date of Patent: Mar. 11, 1997

[54] VIDEO SERVER

[75] Inventors: Tsutomu Tanaka, Nishinomiya; Shinzo Doi; Hiroshi Yokota, both of Osaka; Chishio Ueno, Ikoma; Yukiko Ito, Osaka, all of Japan

[73] Assignee: Matsushita Electric Industrial Co., Ltd., Osaka, Japan

[21] Appl. No.: 316,514

[22] Filed: Sep. 30, 1994

[30] Foreign Application Priority Data

| Sep. 30, 1993 | [JP] | Japan | 5-269995 |
| Jan. 20, 1994 | [JP] | Japan | 6-004472 |
| Feb. 10, 1994 | [JP] | Japan | 6-016848 |
| Apr. 4, 1994 | [JP] | Japan | 6-066063 |
| Apr. 12, 1994 | [JP] | Japan | 6-073595 |
| Apr. 27, 1994 | [JP] | Japan | 6-089585 |
| Aug. 8, 1994 | [JP] | Japan | 6-185955 |

[51] Int. Cl.$^6$ .................................................. H04N 9/79
[52] U.S. Cl. .......................................... 364/514 R; 348/12
[58] Field of Search ............................ 364/514 C, 514 R; 348/12, 13, 6, 7; 370/94.2, 94.1; 395/600

[56] References Cited

U.S. PATENT DOCUMENTS

| 5,191,410 | 3/1993 | McCalley et al. | 348/13 |
| 5,195,092 | 3/1993 | Wilson et al. | 370/94.2 |
| 5,208,665 | 5/1993 | McCalley et al. | 348/12 |
| 5,287,530 | 2/1994 | Davis et al. | |

OTHER PUBLICATIONS

Nikkei Communications, p. 41, Feb. 15, 1993.
Nikkei Communications, p. 47, Feb. 15, 1993.

Primary Examiner—Emanual T. Voeltz
Assistant Examiner—Thomas Peeso
Attorney, Agent, or Firm—Price, Gess & Ubell

[57] ABSTRACT

A video server in which each media segment file sever (MSFS) stores media segment files (MSFs) forming video data, and sequence control brokers (SCBs) installed between the video server and subscribers terminals receive video requests from the subscriber terminals, and read out the requested MSFs from the MSFSs. The readout MSFs are exchanged by an ATM switch to be transmitted to the SCBs respectively, which outputs the MSFs at predetermined intervals to the request-sender subscriber terminals.

86 Claims, 63 Drawing Sheets

FIG. 1
PROGRAM 1
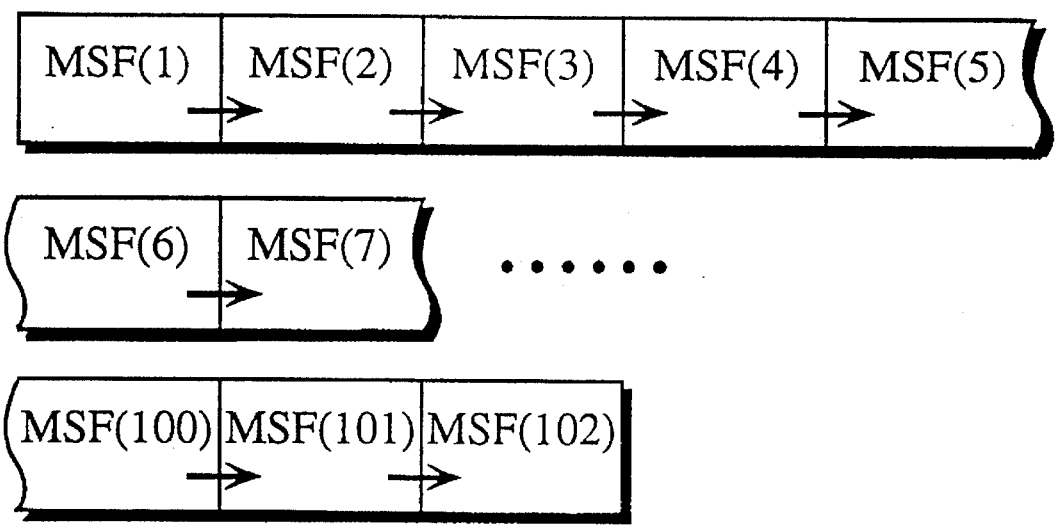
PROGRAM 2
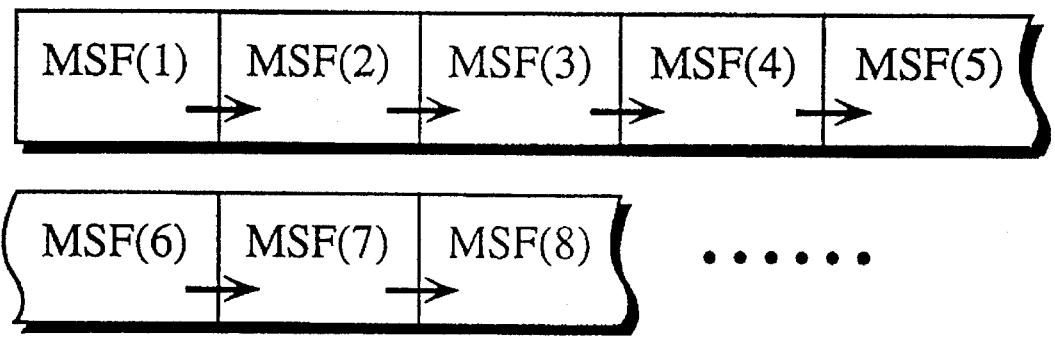

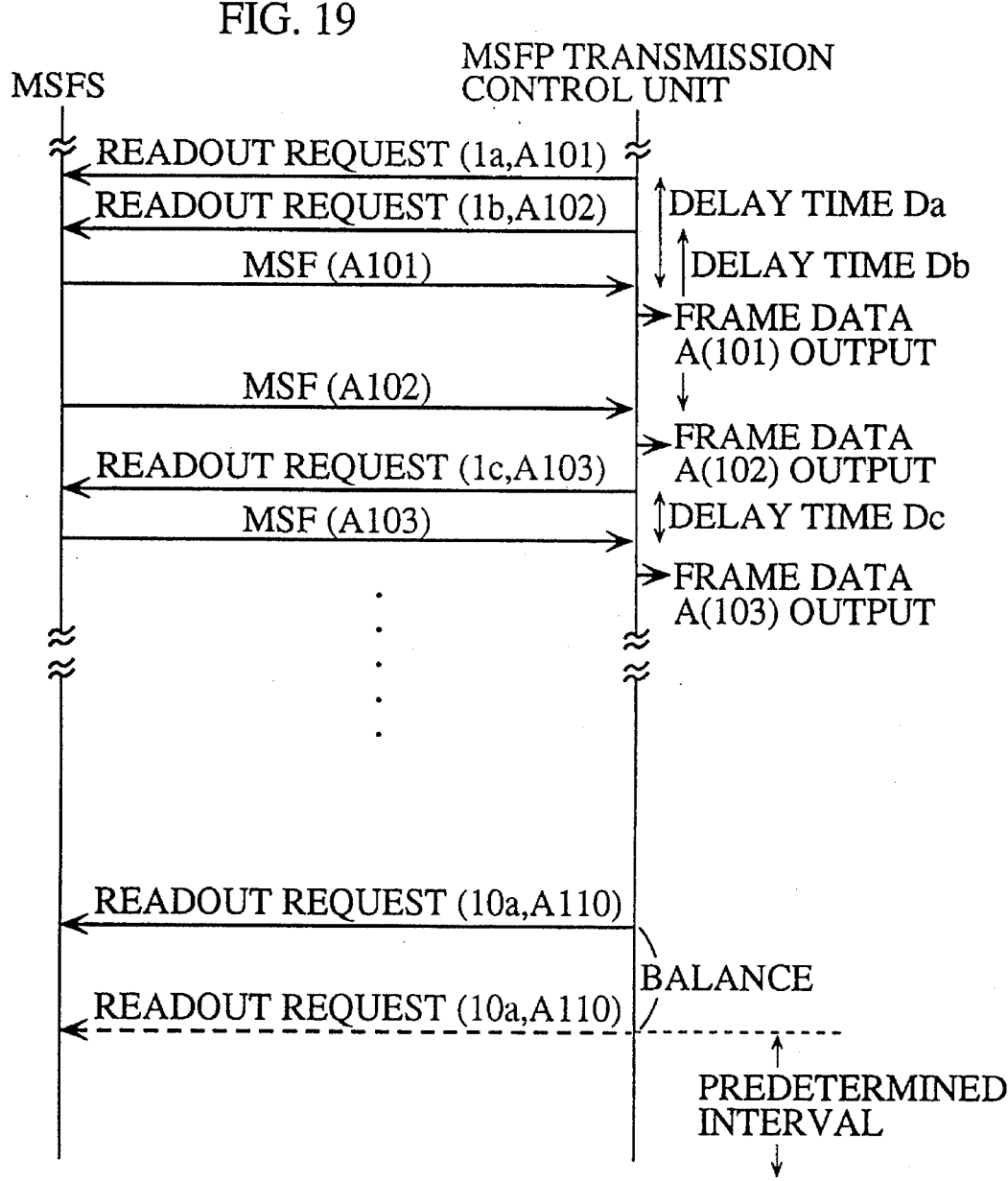

FIG. 40

| USR | INF | VAB | |
|---|---|---|---|
| TERMINAL'S ID | REQUESTED PROGRAM | MEAN RECEIPT RATE | |

| USR | ADD |
|---|---|
| TERMINAL'S ID | SCF(MSFPs) |

FIG. 45A

| TRANSMISSION SCHEDULE | usr IDENTIFIER |
|---|---|
| 1 | usr1 |
| ⋮ | ⋮ |
| 41 | usr1 |
| ⋮ | ⋮ |
| 81 | usr1 |
| ⋮ | ⋮ |
| 121 | usr1 |
| ⋮ | ⋮ |
| 161 | usr1 |

ISSUANCE INTERVAL 40

FIG. 45B

| TRANSMISSION SCHEDULE | usr IDENTIFIER |
|---|---|
| 1 | usr1 |
| ⋮ | ⋮ |
| 6 | usr4 |
| ⋮ | ⋮ |
| 41 | usr1 |
| ⋮ | ⋮ |
| 46 | usr4 |
| ⋮ | ⋮ |
| 81 | usr1 |
| ⋮ | ⋮ |
| 86 | usr4 |
| ⋮ | ⋮ |
| 121 | usr1 |
| ⋮ | ⋮ |
| 126 | usr4 |

FIG. 45C

| TRANSMISSION SCHEDULE | usr IDENTIFIER |
|---|---|
| 1 | usr1 |
| 6 | usr4 |
| 11 | usr2 |
| 16 | usr3 |
| 21 | usr5 |
| 41 | usr1 |

SECOND DATA REQUEST

FIRST DATA REQUEST
T : MIN. ISSUANCE INTERVAL

FIG. 56

MSF TRANSMISSION
MANAGEMENT TABLE

| REQUESTED MSF IDENTIFICATION No. | DESTINATION | OTHER DESTINATION LIST |
|---|---|---|
| 2130 | 1 | 10 |
| 6521 | 2 | 1,3 |
| 7651 | 3 | |
| 123 | 1 | |
| | | |
| | | |
| ⋮ | ⋮ | ⋮ |

VIDEO SERVER

BACKGROUND OF THE INVENTION (1) Field of the Invention

The present invention relates to a video server which can transmit a video as per request among a plurality of videos stored therein.

(2) Description of the Related Art

There has been active research for an interactive television system in the field of CATV (Cable Television) system, and the core of the system is a video server.

In the interactive television system, each subscriber requests a video (program) he would like to watch to the CATV station, and the station transmits the videos as per requests to individual subscribers. Thus, the interactive television system enables the subscribers to enjoy the videos at any convenient time once it is put into practical use.

Among various applications of the interactive television system, the on-demand television system has been already made available to the public. The on-demand television system comprises a video tape library, a plurality of video tape players for playing the video tapes, a plurality of TV (television) cables for transmitting a plurality of videos being played to terminals equipped at the subscribers' end, and a switch for switching the TV cables.

The entire system is controlled manually by a plurality of operators at the station. To be more specific, upon receipt of the requests from the subscribers, the operators connect the TV cables to the their terminals by means of the switch, and play the video as per their requests by means of the video tape players. Accordingly, each video being played is transmitted to their respective subscribers via the connected TV cables.

However, such a manual control limits the service of the on-demand television system to a small number of subscribers. For example, it is well assumed to receive 100 requests at a time if there are 1000 subscribers. However, it is almost impossible to manage all the requests simultaneously under the manual control; there is a considerable lag time between the time the requests are received and the transmission of the requested videos.

Given these circumstances, the pure-on-demand television system was proposed in "Nikkei Communication" No. 144, pp. 38–55, Feb. 15, 1993, and "Nikkei Electronics", No. 584, pp. 58 as an ideal interactive television system, and it has been attracting public interests.

The pure-on-demand television system comprises a storage unit for storing digital data of the videos, a plurality of cables for transmitting the digital video data to individual subscribers, a plurality of decoders for generating visible images by decoding the transmitted digital video data, and an ATM (Asynchronous Transfer Mode) switch for switching the cables.

Since the videos are transmitted in the form of digital data, they are processed quickly, and the subscribers can not only play the videos in real time whenever they want, but also play the videos quickly in both directions (fast-forward and fast-rewind) in real time as if they were manipulating the video tape player.

However, even with this ideal system the problem of the time lag is not solved. This is because a myriad of requests are sent to one storage unit at a time, and it takes time to read out the requested video data from the storage unit. In addition, it takes time to transmit the readout data to the subscribers by the means of the ATM switch when there is considerable traffic therein. Thus, the time lags caused in both reading out and transmitting the video data make the real time transmission impossible.

SUMMARY OF THE INVENTION

Accordingly, the present invention has a first object to provide a video server that can send video data in real time when a plurality of requests are received at a time.

The present invention has a second object to provide a video server that can rewrite the video data while transmitting the same.

The present invention has a third object to provide a video server that can construct a large scale interactive television system.

The first object can be fulfilled by a video server which transmits digital video data stored therein to subscriber terminals as per video requests comprising: a plurality of frame block servers, each including an image memory and a readout control unit for the image memory, each image memory storing a plurality of frame blocks, each frame block being one of sections forming a piece of digital video data, the readout control unit receiving readout requests and in response reading out requested frame blocks from the image memory; a management unit for storing management data specifying which frame block server stores which frame block in the image memory; a plurality of subscriber interfaces for receiving the video requests from the subscriber terminals, and in response sending readout requests to the frame block servers to readout the frame blocks forming requested digital image data in a predetermined sequence while referring to the management data, and for transmitting the frame blocks transmitted from the frame block servers to the subscriber terminals at such timing that ensures a continuous play; and an exchange unit for interconnecting each block server and each subscriber interface to transfer the frame blocks read out from the frame block servers as per the readout requests to the request-sender subscriber interfaces.

The management data may comprise a plurality of block pointers, each identifying a location of each frame block respectively, and including an address of each frame block server that stores each frame block respectively, and each subscriber interface may include: a management data obtainment unit for receiving the video request from the subscriber terminal, and in response retrieving block pointers for the requested piece of digital video data from the management unit; a readout request generation unit for generating a readout request for each retrieved block pointer addressing to the frame block server specified by the address included therein; a readout request transmission unit for transmitting the readout requests to the specified frame block servers, one readout request being transmitted at a time; and a frame block output unit for receiving the frame blocks read out as per the readout requests, and in response outputting the frame blocks to the request-sender subscriber terminal at predetermined timing.

The frame block output unit may include: a frame block receipt unit for receiving the frame blocks addressed to the self's subscriber interface; a block buffer for accumulating a certain number of frame blocks received by the frame block receipt unit; an accumulated amount judgment unit for judging whether the block buffer stores more than a predetermined number of frame blocks; and an output unit for outputting the certain number of the frame blocks accumulated in the block buffer when the accumulated amount judgment unit judges that the block buffer stores more than the predetermined number of frame blocks, one frame block being outputted at a time to the request-sender subscriber terminal.

Each subscriber interface may be connected to a plurality of subscriber terminals, each subscriber terminal outputting a video request including a terminal identifier, and the management data obtainment unit may further include an identifier detection unit for detecting the terminal identifiers contained in the video requests sent from the subscriber terminals upon receipt thereof, and the readout request transmission unit may further include an identifier attachment unit for attaching the terminal identifiers detected by the identifier detection unit to reach readout request generated by the readout request generation unit, and the readout control unit in each frame block server may include: a readout request receipt unit for detecting the terminal identifiers when receiving the readout requests from the readout request transmission unit; and a frame block transmission unit for attaching the terminal identifiers detected by the readout request receipt unit to each request frame block read out as per the readout requests before the transmission thereof to the request-sender subscriber interface, and the frame block output unit may further include a distribution output control unit for receiving the terminal-identifier-attached frame blocks and in response outputting the same to the request-sender subscriber terminal identified by the terminal identifier.

The exchange unit may be an ATM cell switch for exchanging cells, and each image memory may be a disk array comprising K disk drives for storing the frame blocks, and each block pointer may include an address of each frame block server storing each frame block, and an address of the frame block in the disk array, and the readout request may be of a cell structure, and the readout request transmission unit writes the address of the frame block server in a header area of the cell structure while writing the address of the frame block in the disk array in a data area of the cell structure to generate a readout request for each block pointer, and the readout control unit in the frame block server may detect the address of the frame block in each readout request and read out the requested frame block by accessing to the address of the disk array.

The readout control unit in each frame block server may include: K queues for holding the readout requests to read out the requested frame blocks from corresponding disk drives in an order of receipt, one queue being furnished for one disk drive; a readout request receipt unit for receiving the readout requests addressed to the self's frame block server; an address analysis unit for detecting the address of the requested frame block contained in each readout request received by the readout request receipt unit and in response specifying the disk drives to which each readout request is addressed using the detected address, and for having the queue furnished for the specified disk drive store the readout request; a disk access unit for retrieving one readout request from the K queues, and in response accessing to a memory area in the specified disk drive at the address contained in the readout request to have the disk drive read out the requested frame block; a transmission stand-by buffer for holding the frame blocks read out from the K disk drives; and a frame block transmission unit for retrieving the frame blocks from the transmission stand-by buffer to transmit to the request-sender subscriber interface.

The frame block transmission unit may include: a readout request storage unit for storing a readout request for which a requested frame block has been read out and stored in the transmission stand-by buffer together with a correlation with the frame block; a frame block retrieval unit for retrieving the frame blocks from the transmission stand-by buffer; a request-sender detection unit for detecting a request-sender subscriber interface of the readout request for the frame block retrieved from the transmission stand-by buffer; a frame block division unit for dividing the retrieved frame block from the transmission stand-by buffer into a set of sub-blocks of an equal size; a writing unit for writing each sub-block into the data area of the cell structure, and writing the request-sender detected by the request-sender detection unit into the header area of the cell structure; and a cell transmission unit for transmitting the cells written with the sub-block and the request-sender subscriber interface to the request-sender subscriber interface.

According to the above construction, upon receipt of a video request, the data of the requested video are readout per frame block from a plurality of frame block servers in a predetermined sequence and transmitted to the request-sender terminal, and thus enabling real time video transmission.

When there are a plurality of requests to one video, each frame block server reads out the frame blocks independently and sends the same to each terminal simultaneously. Thus, a plurality of subscribers can access to one video at one same time.

Further, since the ATM switch operates asynchronously which each image memory and readout out unit, the number of the subscribers and the kinds of videos can be changed relatively easy in the interactive system.

The second object can be fulfilled by a video server which transmits digital video data stored therein to subscriber terminals as per video request and which can rewrite the digital video data comprising: a plurality of frame block servers, each including an image memory, a readout control unit for the image memory, and a writing control unit for the image memory, each image memory storing a plurality of frame blocks, each frame block being one of sections forming a piece of digital video data, the read control unit receiving readout requests and in response reading out requested frame blocks from the adequate image memory, the write control unit receiving a write request and in response writing the frame blocks into the image memory; a management unit for storing management data specifying which frame block server stores which frame block in the image memory and which frame block server has a writable area in the image memory, and for updating the management data each time a frame block is written in the image memory; a plurality of subscriber interfaces for receiving the video requests from the subscriber terminals, and in response sending readout requests to frame block servers to readout frame blocks forming requested digital image data in a predetermined sequence while referring to the management data, and for transmitting the frame blocks transmitted from the frame block servers to the subscriber terminals at such timing that ensures continuous video-play; a write interface for obtaining a digital video to divide the digital video into a set of sections, and for transmitting the divided sections to the frame block servers having the writable areas together with the write request, each section being of a same size as the frame block; and an exchange unit for interconnecting each block server, each subscriber interface, and each write interface, and for transferring the frame blocks read out from the frame block servers and transmitted from the write interface to the request-sender subscriber interfaces and the frame block servers having the writable areas respectively.

The management data may comprise a plurality of block pointers, each identifying a location of each frame block respectively, and including an address of each frame block server that stores each frame block respectively, and each subscriber interface may include: a management data obtainment unit for receiving the video request from the subscriber terminal, and in response retrieving block pointers for the requested piece of digital video data from the management unit; a readout request generation unit for generating a readout request for each retrieved block pointer addressing to the frame block server specified by the address included therein; a readout request transmission unit for transmitting the readout requests to the specified frame block servers, one readout request being transmitted at a time; and a frame block output unit for receiving the frame blocks read out as per the readout requests, and in response outputting the frame blocks to the request-sender subscriber terminal at predetermined timing.

The image memory in each frame block server may have a memory area which is divided in a set of areas, each area being sufficiently large to record one frame block, and the management unit may include: a write pointer storage unit for storing write pointers, each write pointer being data showing a correspondence between the writable area in the image memory and its location; a write control data generation unit for retrieving the write pointers for each frame block server from the write pointer storage unit when the write interface receives the write request, and for aligning the retrieved write pointers in sequence to generate write control data for a piece of digital video data to be recorded; a management data conversion unit for converting the write control data generated by the write control data generation unit into the management data, and the write interface may include: a management data obtainment unit for receiving the write request, and in response retrieving the write pointers for the piece of digital video data to be recorded from the management unit; and a write request generation unit for generating a write request for each retrieved write pointer addressing to the frame block server specified by the write pointer; a division unit for generating a plurality of frame blocks by dividing the digital video data; a write request transmission unit for transmitting the write requests first and then the requested frame blocks to the specified frame block servers, one of one write request and requested frame block being transmitted at a time, and wherein each specified frame block server writes the frame block on the writable area in the image memory specified by the write request when the write request and the frame block are received.

The exchange unit may be an ATM cell switch for exchanging cells, and each image memory may be a disk array comprising K disk drives for storing the frame blocks, and each block pointer may include an address of each frame block server storing each frame block, and an address of the frame block in the disk array, and each write pointer may include an address of a frame block server storing the corresponding frame block, and an address of the writable are in the disk array; the readout request may be of a cell structure, and the readout request transmission unit writes the address of the frame block server in a header area of the cell structure while writing the address of the frame block in the disk array in a data area of the cell structure to generate a readout request for each block pointer, and the write request transmission unit may write the address of the frame block server in the header area while writing the address of the writable area in the data area, and the readout control unit in the frame block server may detect the address of the frame block in each readout request and reads out the requested frame block by accessing to the address of the disk array, and the write control unit in the frame block server may detect the address of the frame block in each write request and writes the frame block in the writable area.

According to the above construction, the video data can be rewritten while being transmitted to their respective destination terminals, which makes a variety of videos available to the subscribers.

The third object can be fulfilled by a video server which transmits digital video data stored therein to subscriber terminals as per video requests comprising: a plurality of frame block servers, each including an image memory and a readout control unit for the image memory, each image memory storing a plurality of frame blocks, each frame block being one of sections forming a piece of digital video data, the readout control unit receiving readout requests and in response reading out requested frame blocks from the image memory; a management unit for storing management data specifying which frame block server stores which frame block in the image memory; a plurality of subscriber interfaces for receiving the video requests from the subscriber terminals, and in response sending readout requests to the frame block servers to readout the frame blocks forming requested digital image data in a predetermined sequence while referring to the management data, and for transmitting the frame blocks transmitted from the frame block servers to the subscriber terminals at such timing that ensures a continuous play; and an exchange network including a plurality of exchange units interconnected each other, each being selectively connected to a plurality of frame block servers and a plurality of subscriber interfaces for transferring the frame blocks addressed to the self's frame block server to the request-sender subscriber interfaces respectively.

The management data may comprise a plurality of block pointers, each identifying a location of each frame block respectively, and including an address of each frame block server that stores each frame block respectively, and each subscriber interface may include: a management data obtainment unit for receiving the video request from the subscriber terminal, and in response retrieving block pointers for the requested piece of digital video data from the management unit; a readout request generation unit for generating a readout request for each retrieved block pointer addressing to the frame block server specified by the address included therein; a readout request transmission unit for transmitting the readout requests to the specified frame block servers, one readout request being transmitted at a time; and a frame block output unit for receiving the frame blocks read out as per the readout requests, and in response outputting the frame blocks to the request-sender subscriber terminal at predetermined timing.

The exchange network may be an ATM cell switch for transferring the cells, and each image memory may be a disk array comprising K disk drives for storing the frame blocks, and each block pointer may include an address of each frame block server storing each frame block, and an address of the frame block in the disk array, and the readout request may be of a cell structure, and the readout request transmission unit may write the address of the frame block server in a header area of the cell structure while wiring the address of the frame block in the disk array in a data area of the cell structure to generate a readout request for each block pointer, and the readout control unit in the frame block server may detect the address of the frame block in each readout request and may read out the requested frame block by accessing to the address of the disk array.

The disk array may comprise K disk drives interconnected by a SCSI, and the address of the frame block may be formatted for a readout command in a SCSI system.

According to the above construction, the frame blocks can be transferred between a plurality of the ATM switches, and thus the scale of the video server can be extended.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 1 is a logical format of video data supplied by a video server of the present invention;

FIG. 18 is a view explaining how a delay management unit shown in FIG. 17 manages the delay times;

FIG. 19 is the control sequence of a video server in accordance with the second embodiment;

FIG. 40 is a data format of a second data request in accordance with a tenth embodiment of the present invention;

FIGS. 45A through 45C are the views explaining how issuance is scheduled by an issuance time management unit shown in FIG. 41;

FIG. 56 is a view showing an example of an MSF transmission management table in accordance with a twelfth embodiment of the present invention;

DESCRIPTION OF THE PREFERRED EMBODIMENTS

First Embodiment

The format of the digital video data supplied by a video server 100 in accordance with the first embodiment of the present invention is shown in FIG. 1. The digital video data are compressed by, for example, the MPEG (Motion Pictures Expert Group) 2 method, and divided into a set of 64 Kbyte files; hereinafter the resulting files are referred to as MSFs (Media Segment Files) which are numbered with their respective sequence numbers in one program as shown in FIG. 1: (MSF)(1), MSF(2), MSF(3), MSF(4), . . . . For example, a 10-minute long MPEG 2 video with a transmission rate of 6.4 Mbps (bit per second) is divided into 7500 MSFs.

Figure 2:
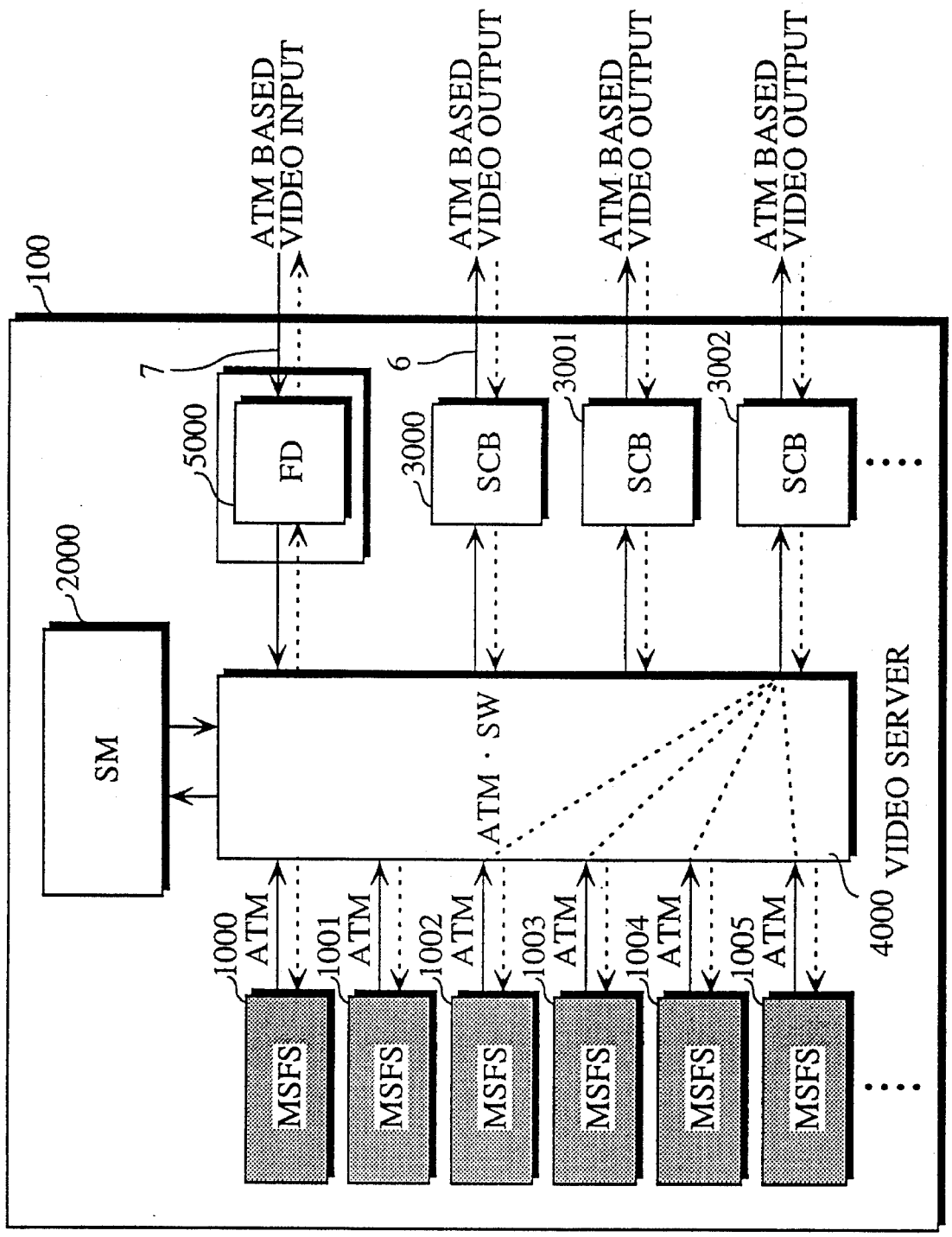
FIG. 2 is a view depicting the structure of a video server in accordance with a first embodiment of the present invention.

FIG. 2 is a block diagram showing the structure of the video server 100. The video server 100 comprises a plurality of MSFSs (Media Segment File Servers) 1000, 1001, 1002, 1003 . . . , an SM (System Manager) 2000, a plurality of SCBs (Sequence Control Brokers) 3000, 3001, 3002, 3003, . . . , an ATM switch 4000, and an FD (File Distributor) 5000.

Figure 3:
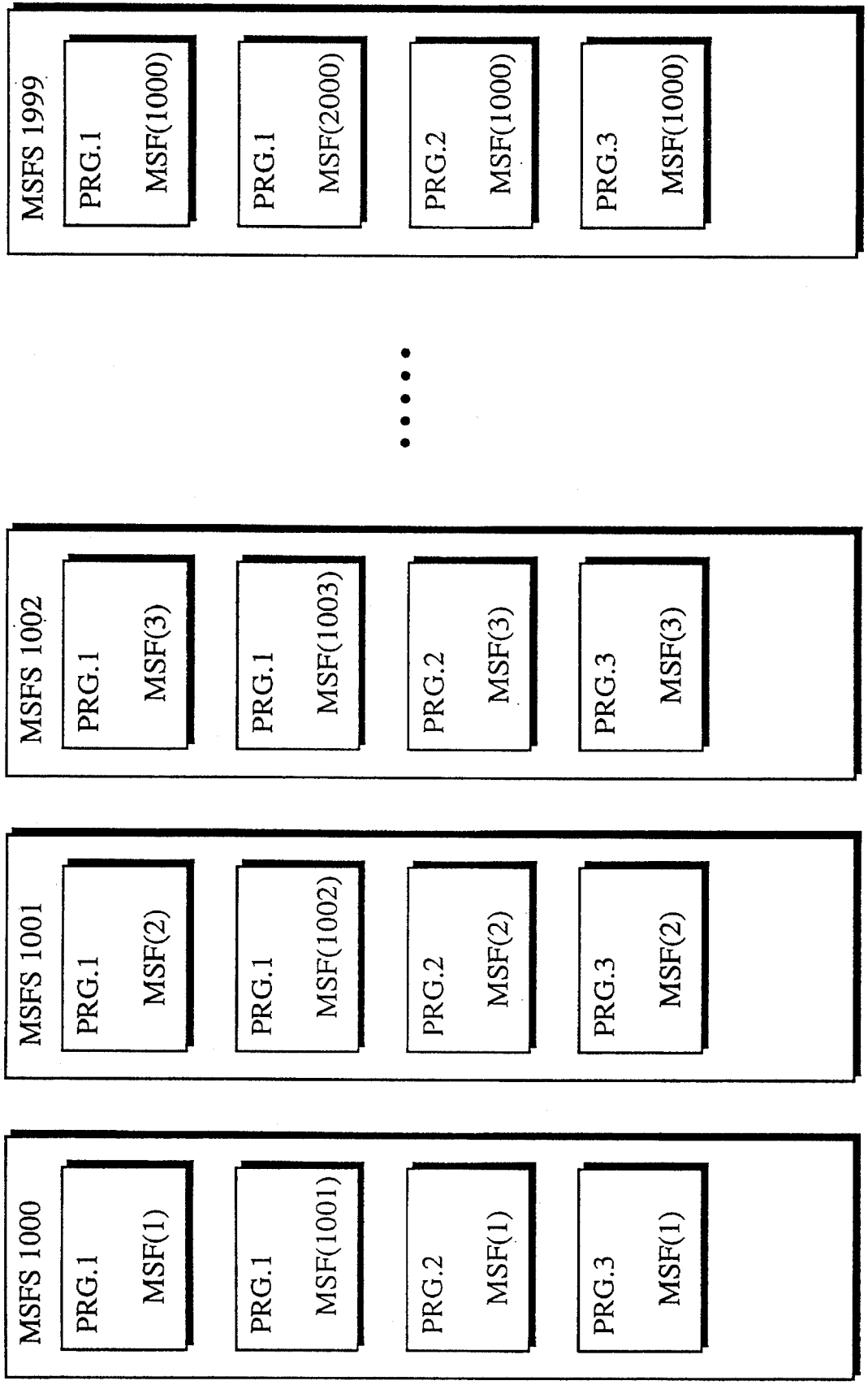
FIG. 3 is a view explaining how each MSFS (Media Segment File Server) stores MSFs (Media Segment Files)

Each MSFS includes a SCSI (Small Computer System Interface) disk array for storing a plurality of MSFs and transmits the same. How each MSFS stores the MSFs will be explained while referring to FIG. 3.

In the drawing, each rectangle represents one MSFS while squares within each rectangle representing the MSFs stored therein, and the MSFs forming one program are stored separately in the MSFSs. Assume that there is 1000 MSFSs, PROGRAM 1 consists of 2000 MSFs and each of PROGRAMS 2 and 3 consists of 1000 MSFs, then the MSF(1) of PROGRAM 1 is stored in the MSFS 1000, (MSF(2) in the MSFS 1001, MSF(3) in the MSFS 1002, . . . , MSF(1000) in the MSFS 1999, MSF(1001) in the MSFS 1000, MSF(1002) in the MSFS 1001, MSF(1003) in the MSFS 1002, . . . , and MSF(2000) in the MSFS 1999. Similarly, the MSF(1) of PROGRAM 2 is stored in the MSFS 1000, MSF(2) in the MSFS 1001, . . . , and MSF(1000) in the MSFS 1999; the MSF(1) of PROGRAM 3 is stored in the MSFS 1000, MSF(2) in the MSFS 1001, . . . , and MSF(1000) in the MSFS 1999.

If a 10-minute long MPEG2 video consisting of 7500 MSFs are stored in 100 MSFSs, 75 MSFs are stored in each MSFS.

Each MSFS transmits the MSFs thus stored to the ATM switch 4000 as per readout requests send from the SCBs 3000, 3001, 3002, 3003 . . . by means of the ATM switch 4000.

Figure 4:
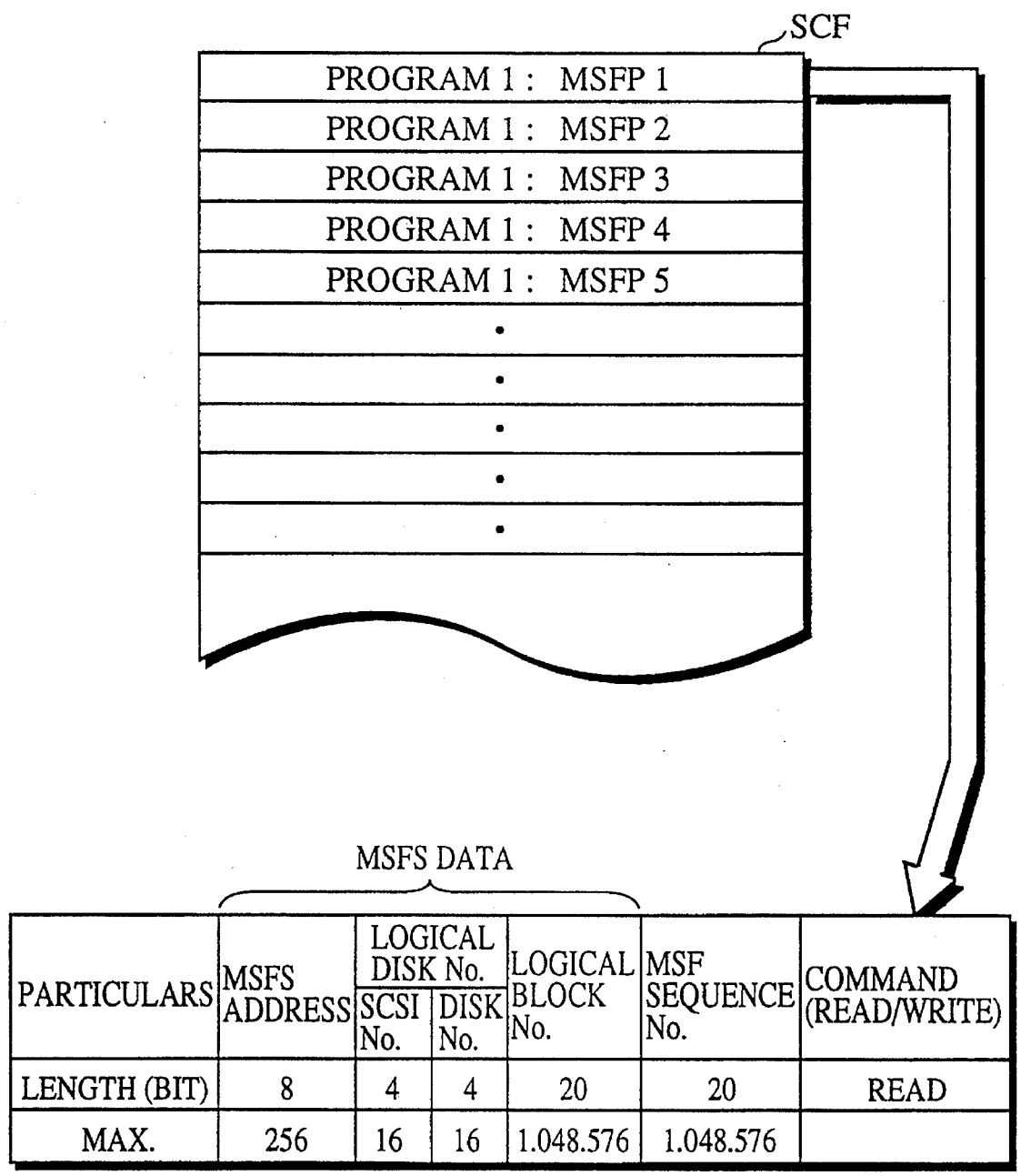
FIG. 4 is a view showing a logical format of an SCF (Sequence Control File) and MSFPs (Media Segment File Pointers)

The SM 2000 stores SCFs (Sequential Control Files) for each program and transmits the same: when the SM 2000 receives an SCF obtainment request from the SCBs 3000, 3001, 3002, . . . , it transmits the requested SCF to the request-sender SCB by means of the ATM switch 4000. The SCF is the data used to convert the MSFs stored separately in the MSFSs into the video data of one program, and consists of MSFPs (Media Segment File Pointers) that indicate which MSF is stored in which MSFS. Examples of the SCF and MSFPs are shown in FIG. 4. The MSFPs are aligned according to the sequence of the corresponding MSFs, and each MSFP consists of data related to the MSFS storing the MSF, a sequence number at which the MSF is read out or written in, and a command assigned to the MSFP. The MSFS data consist of an MSFS's address (the one managed by the ATM switch 4000), a number specifying an SCSI of a disk storing the MSF (4 bits), a number specifying the disk (4 bits), and a number specifying a logical block indicating the MSF's storage location (20 bits). The command specifies which disk control command is assigned to the MSFP, and a "read" command is assigned in general. Thus, since each MSFP includes parameters of the read command for the disk array, it also serves as a disk control command to read out the data by accessing to the disk array.

The SCBs 3000, 3001, 3002, 3003, . . . are equipped on subscriber lines connecting the ATM switch 4000 and terminals installed at each subscriber's end, and responsible for the program request transmission, MSFP transmission, and MSF reception defined as follows.

The program request transmission by the SCBs means to have the SM 2000 transmit the SCF including the MSFPs for a selection request sent from the terminal by retrieving the data related to the program from the selection request.

The MSFP transmission by the SCBs means to have the MSFSs 1000, 1001, 1002, . . . transmit the MSFs specified by the MSFPs in the SCF transmitted from the SM 2000 by generating readout requests using the MSFPs and transmitting the same by means of the ATM switch 4000.

The MSF reception by the SCBs means to receive the MSFs successively transmitted from the MSFSs 1000, 1001, 1002, . . . by means of the ATM switch 4000 and align the same sequentially to output the same to the terminal as the original digital video data.

The ATM switch 4000 is an ATM switch that exchanges cells asynchronously, and all the readout request, SCF obtainment requests, SCFs and MSFs are converted into the cells to be transmitted by the ATM switch 4000. The cells referred herein are the data consisting of a 5-byte header area and 48-byte data area. The header area includes a destination address and an area used to check the validity of the destination address. The ATM switch is explained in "Information Processing", Vol. 33, No. 2, February 1992, and further explanation is omitted herein. The destination addresses referred herein are the addresses of the SCBs 3000, 3001, 3002, 3003, . . . , MSFSs 1000, 1001, 1002, 1003, 1004, . . . , and SM 2000, and each cell travels within the video server 100 using these addresses.

The FD 5000 receives a digital-video signal in the form of the digital codes, and divides the same into a set of MSFs to write into the MSFS 1000, 1001, 1002, . . . separately.

The terminal, to which the video sis supplied, comprises a display for showing a video transmitted from the video server 100, a video selection panel enabling the subscriber to select a video, a playback mode selection panel enabling the subscriber to select a playback mode, and an output unit outputting a selection signal containing data related to the selected video and playback mode.

Figure 5:
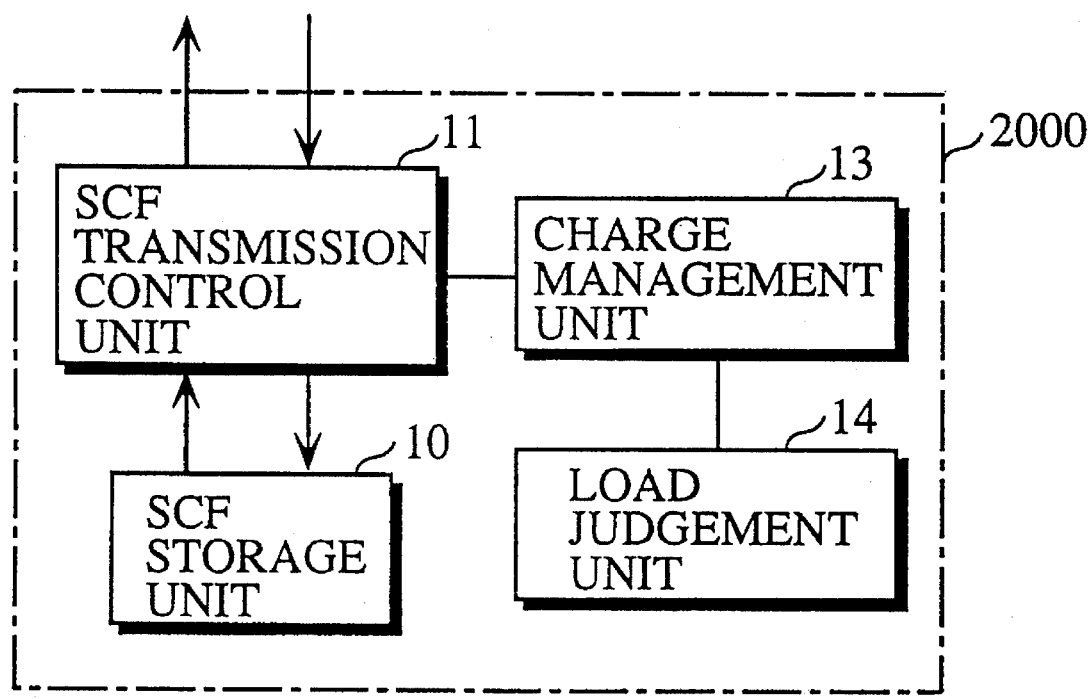
FIG. 5 is a view depicting the structured of an SM (System Manager) shown in FIG. 2.

The structure of the SM 2000 is depicted in FIG. 5. The SM 2000 comprises an SCF storage unit 10, an SCF transmission control unit 11, a charge management unit 13, and a load judgment unit 14.

More precisely, the SCF storage unit 10 stores the SCFs for each program in relation with their respective transmission rates. The transmission rate is directly proportional to the quality of the programs transmitted by the video server 100. For example, the transmission rate is set at 6.0 Mbps for a high quality program, and 1.5 Mbps for a relatively low quality program.

Figure 6:
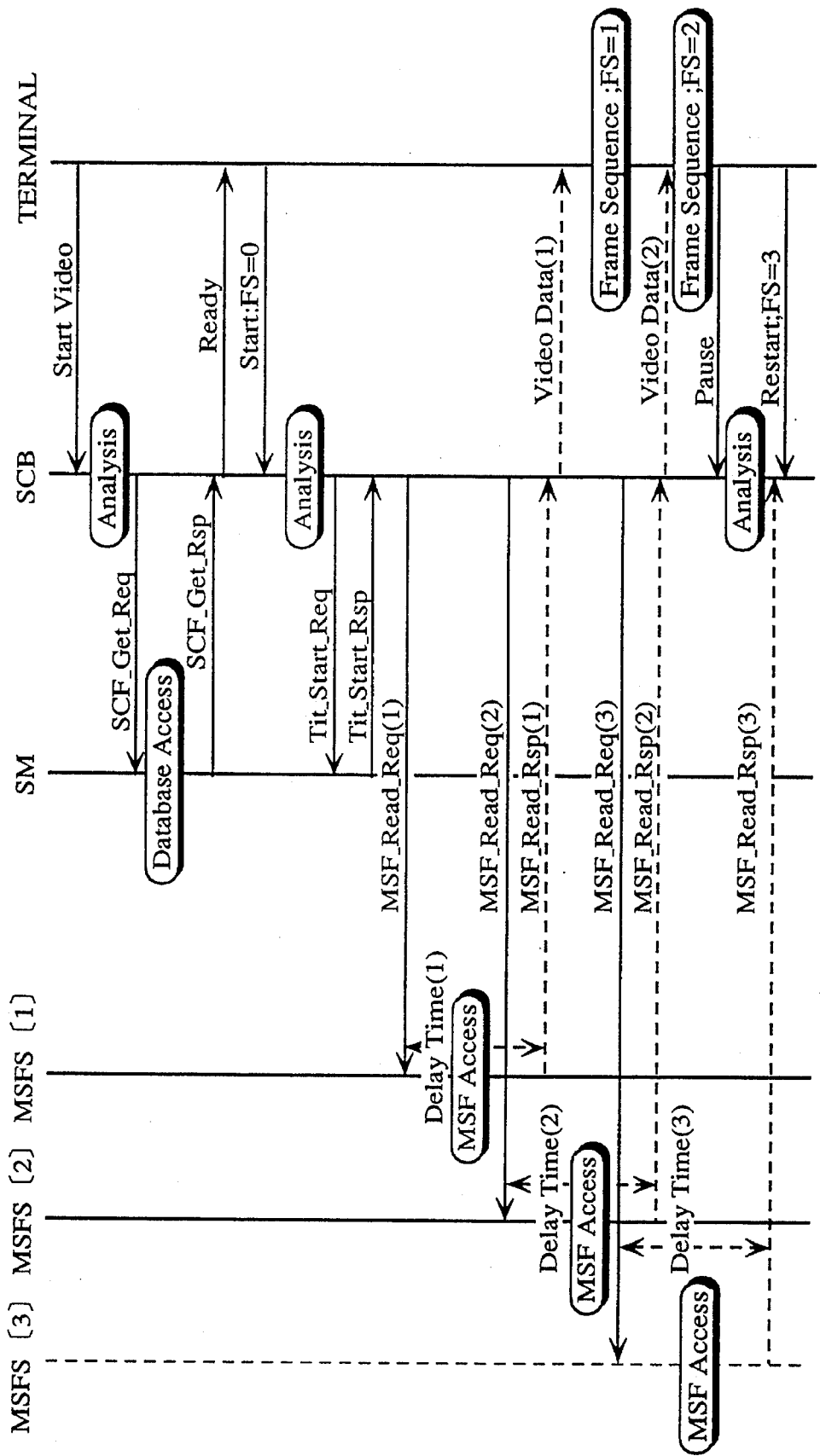
FIG. 6 is the control sequence of the video server in transmitting the SCFs and MSFPs.
Figure 7:
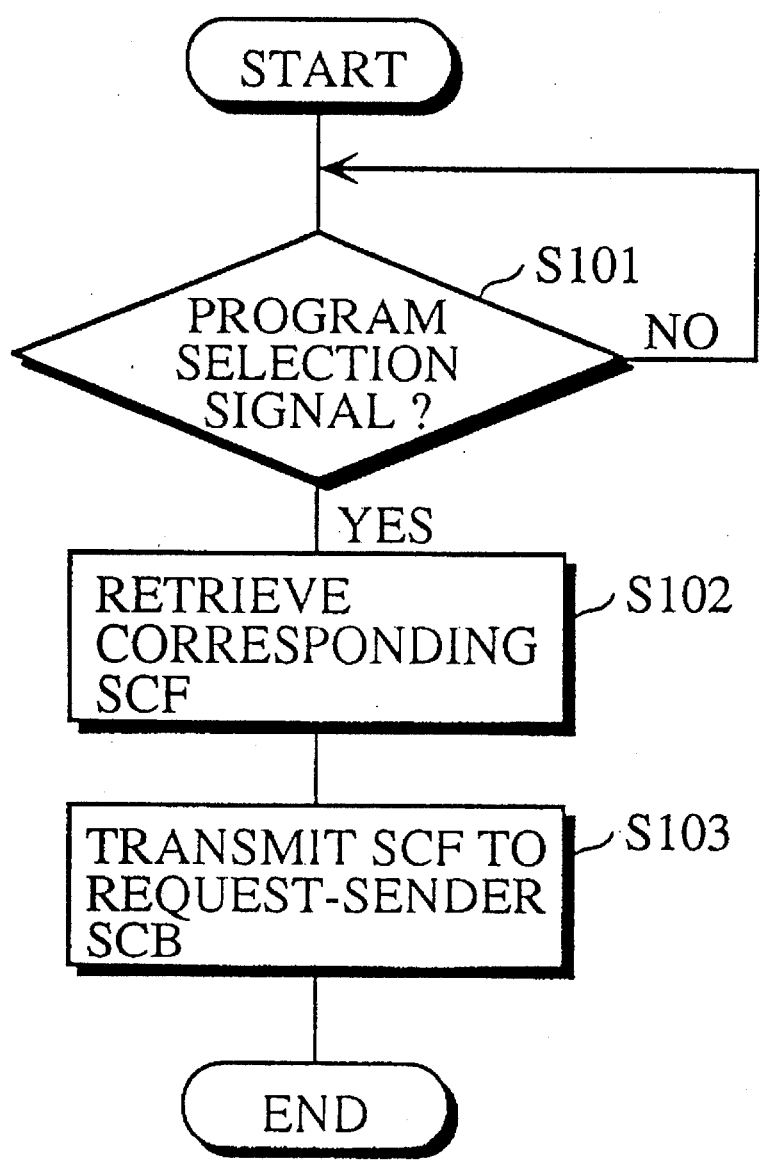
FIG. 7 is a flowchart detailing the operation of an SCF transmission control unit.

THE SCF transmission control unit 11 controls the transmission of the SCFs, which will be explained while referred to FIGS. 6 and 7. FIG. 6 is the sequence showing the video data readout operation within the video server 100, and FIG. 7 is a flowchart detailing the operation of the SCF transmission control unit 11. Assume that a subscriber selects a soccer news by means of his terminal, then a selection signal (Start_ Video) is inputted into one of the SCBs (herein 3000) from the terminal. Accordingly, the SCB 3000 sends an SCF obtainment request (SCF_Get_Req) to the SCF transmission control unit 11 by means of the ATM switch 4000. Upon receipt of the SCF obtainment request (SCF_Get_Req) (S101), the SCF transmission control unit 11 retrieves the SCF corresponding to the soccer news from the SCF storage unit 10 (S102) and transmits the same (SCF_Get_Rsp) to the request-sender SCB 3000 (S103).

The charge management unit 13 retrieves the SCF specified by the SCF obtainment request from the SCF storage unit 10 to detect the size thereof when the SCF transmission control unit 11 receives the SCF obtainment request, and sets the charges based on the detected size. By setting the charges depending on the SCF sizes, the charges become directly proportional to the video length.

The load judgment unit 14 determines whether the SCF obtainment request received by the SCF transmission control unit 11 should be accepted or rejected. Such judgment is made based on each program's transmission rate stored in the SCF storage unit 10 and the traffic within the ATM switch 4000. In case of rejection, the load judgment unit 14 transmits a notice of rejection to the SCF transmission control unit 11, which in return transmits the notice of rejection to the SCF-obtainment request-sender terminal via the SCB 3000 instead of the response (SCF_Get_Rsp).

Figure 8:
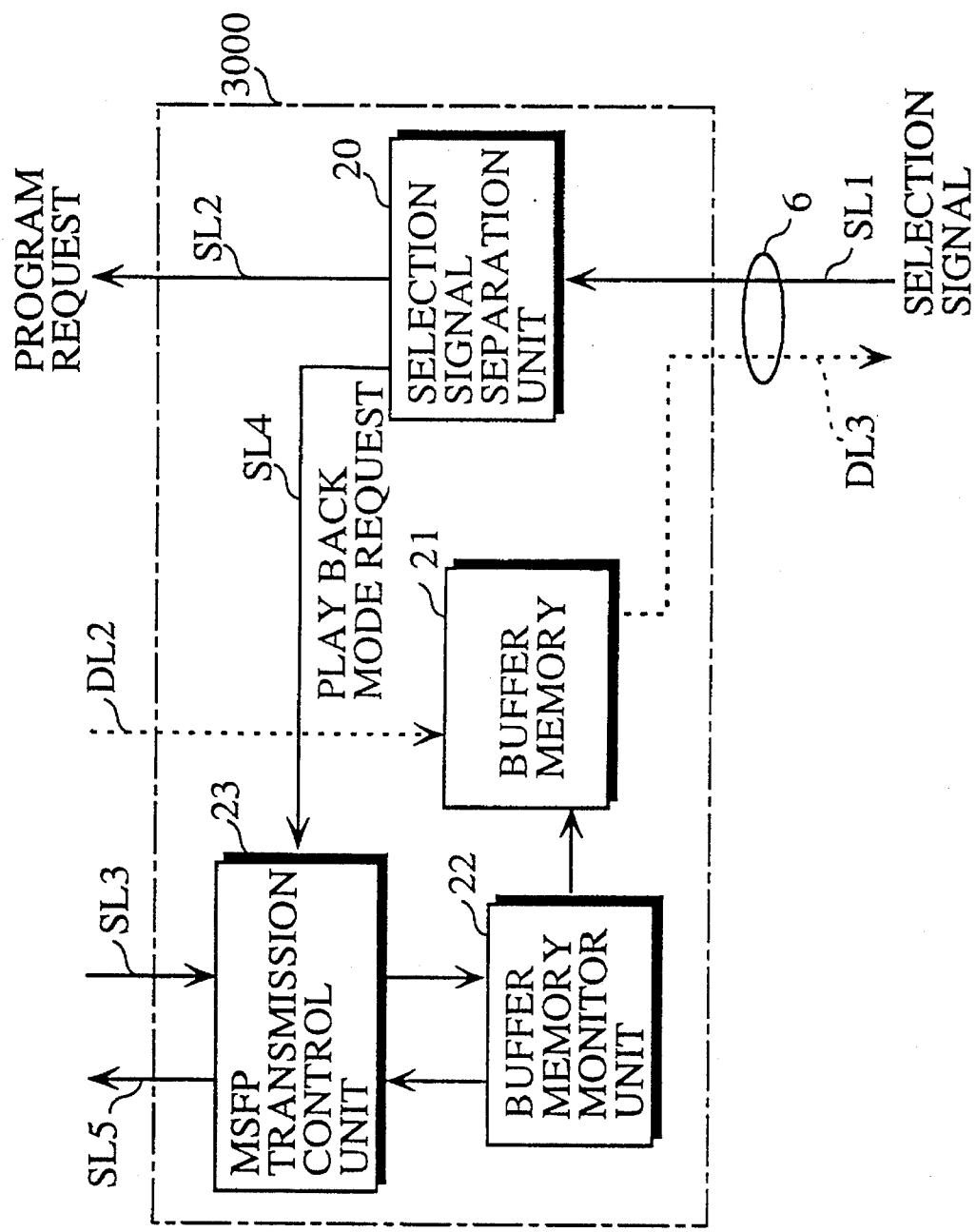
FIG. 8 is a view depicting the structure of an SCB (Sequence Control Broker) shown in FIG. 2.

The SCBs 3000, 3001, 3002, . . . are of the same structure, and the SCB 3000 will be explained as an example while referring to FIG. 8 depicting the structure thereof.

The SCB 3000 comprises a selection signal separation unit 20, a buffer memory 21, a buffer memory monitor unit 22, and an MSFS transmission control unit 23.

More precisely, the selection signal separation unit 20 separates the selection signal sent from the terminal via a subscriber line 1 (SL1): upon receipt of the selection signal, it separates the same into a program request and a playback mode request; the former is transmitted to the SM 2000 by means of the ATM switch 4000 via a subscriber line 2 (SL2), and the latter to the MSFP transmission control unit 23 via a subscriber line 4 (SL4). The playback mode referred herein includes normal, fast, reverse, frame-by-frame, skip, still, and location-specifying modes.

The buffer memory 21 is a memory temporarily holding a predetermined length of MSFs successively transmitted from the MSFSs 1000, 1001, 1002, . . . via a data line 2 (DL2) by means of the ATM switch 4000. The buffer memory 21 outputs the MSFs to the terminal synchronously with a predetermined block signal via a data line 3 (DL3). The cycle of the clock signal is determined depending on the video length for one MSF. Assume that 1-second long video consists of 30 frames and one MSF corresponds to 10 frames, then the buffer memory 21 transmits one MSF every ⅓ second to the terminal.

The buffer memory monitor 22 monitors an available capacity of the buffer memory 21.

Figure 9:
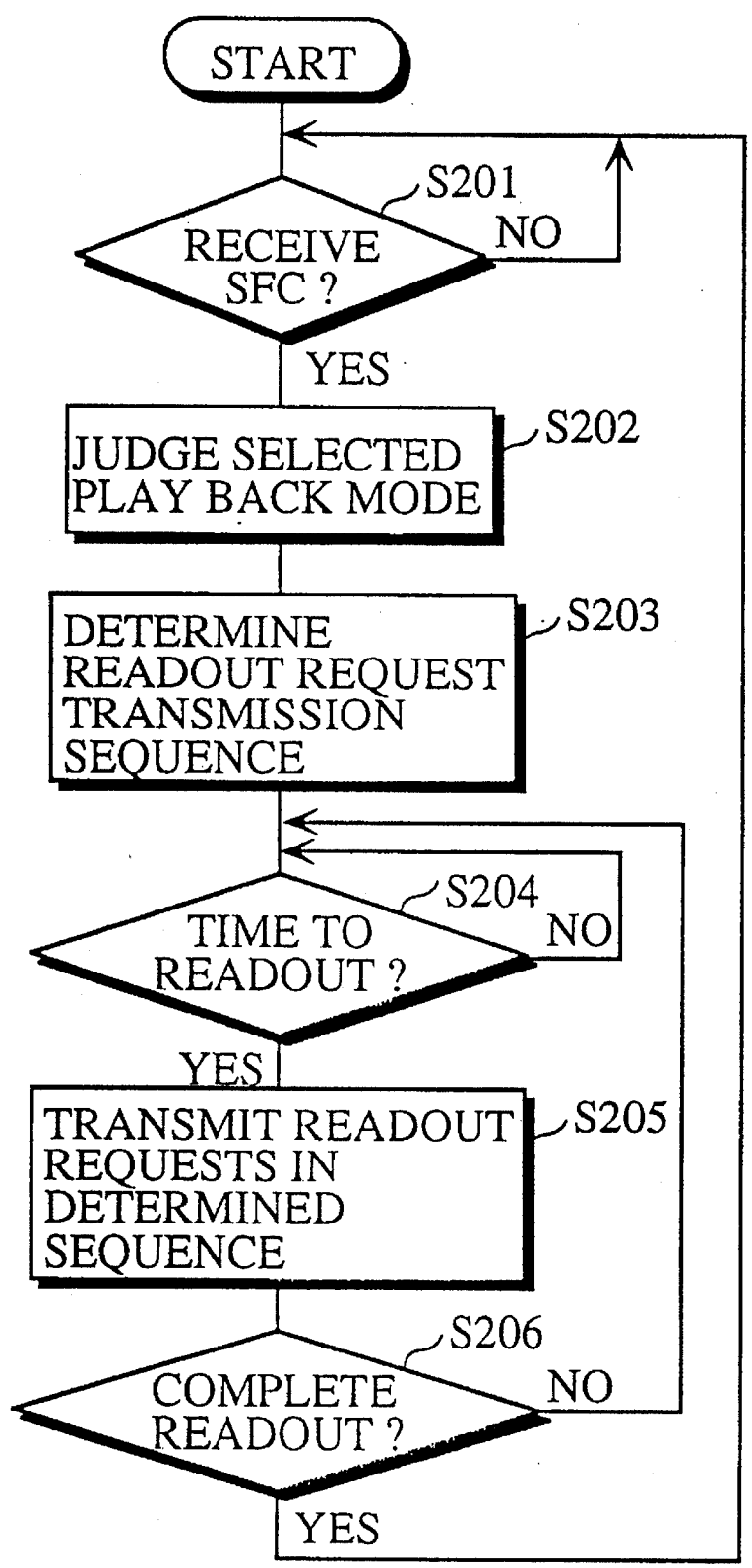
FIG. 9 is a flowchart detailing the operation of an MSFP transmission control unit.

The MSFP transmission control unit 23 includes an SCF buffer (not shown) withholding the SCFs transmitted from the SM 2000, and controls the above-defined MSFP transmission. The operation of the MSFP transmission control unit 23 will be explained while referring to FIG. 6 and the flowchart in FIG. 9.

The MSFP transmission control unit 23 receives the playback mode request from the selection signal separation unit 20 and the SCF from the SM 2000 by means of the ATM switch 4000, and stores the SCF into the SCF buffer (S201). Subsequently, the MSFP transmission control unit 23 outputs a ready signal to the terminal and judges the selected playback mode (S202). Assuming that the normal mode has been selected, then the MSFP transmission control unit 23 determines to transmit the readout requests as per SCF (S203). Having determined the transmission sequence, the MSFP transmission control unit 23 outputs a start request (Tit_Start_Req) to the SM 2000, and waits for a response (Tit_ Start_Rsp). Upon receipt of the response and SCF, the MSFP transmission control unit 23 generates readout requests for the requested video using the MSFPs in the SFC; the readout requests are in effect the cells storing the parameters of the MSFPs to convey the MSFPs to the MSFSs. In FIG. 6, (MSF_Read_Req(1)) is the first readout request addressed to the MSFS 1000 (MSFS[1]), and MSF Read_Req(2)) and (MFS_Read_Req(3)) are the second and third readout requests addressed to the MSFS 1001 (MSFS[2]) and the MSFS 1002 (MSFS[3]) respectively.

Having generated the readout requests for the video, the MSFP transmission control unit 23 transmits the same to their respective MSFSs successively. For example, the MSFP transmission control unit 23 transmits the first readout request (MFS_Read_Req(1)) to the MSFS 1000 at a predetermined interval before the buffer memory 21 transmits the MSF[1] (S204, S205, S206), and transmits the following readout request (MSF_Read_Req(2)) and (MSF_Read_ Req(3)) at the predetermined interval before the buffer memory 21 transmits the MSF[2] and MSF[3] respectively S204, S205, S206). The predetermined interval referred herein is an estimated interval between the time when each readout request is transmitted and the receipt of the corresponding MSF, and it is calculated using the MSFS's MSF readout rate, ATM switch 4000's exchange ability, and the buffer memory 21's MSF transmission rate.

The MSFS 1000 reads out the MSF(1) as per the first readout request (MSF_Read_Req(1)) upon receipt thereof, and sends the same to the MSFP transmission control unit 23 as a response (MSF_Read_Rsp(1)). The MSF(1) thus readout is stored in the buffer memory 21 after some interval (Delay Time (1)) has passed.

Similarly, the responses (MSF_Read_Rsp(2)) and (MSF_Read_Rsp(3)) are successively transmitted to the MSFP transmission control unit 23 from the MSFS 1001 and MSFS 1002 after some intervals, (Delay Time (2)) and (Delay Time (3)) respectively, and the MSFP transmission control unit 23 stores the same into the buffer memory 21. The MSFs stored in the buffer memory 21 are successively transmitted to the terminal, which accordingly converts the MSFs into consecutive video data (Video_Data(1) and Video_Data (2)) first and then decodes the same while counting the number of the frames of the video data, playing the requested video.

While the memory buffer 21 stores the MSFs, the MSFP transmission control unit 23 periodically inquires the buffer memory monitor unit 22 whether there is an available capacity in the buffer memory 21. The MSFP transmission control unit 23 does so because the buffer memory 21 must have an available capacity to store the MSFs successively read out from the MSFSs as per readout requests: when the buffer memory 21 has an overflow or underflow within the predetermined interval, the MSFP transmission control unit 23 adjusts the timing of the readout request transmission.

When a pause request is inputted from the terminal, the pause request is transmitted to the MSFP transmission control unit 23 by means of the selection signal separation unit 20. The MSFP transmission control unit 23 accordingly has the buffer memory 21 suspend the MSF transmission to the terminal.

When resuming the video play, a resume request is transmitted to the MSFP transmission control unit 23 from the terminal with a number representing the frame from which the video-pay is resumed.

When the reverse mode is selected, the MSFP transmission control unit 23 arranges the sequence of the MSFPs in a manner reversed to the sequence in the SFC and determines the same as the readout request transmission sequence, for example, MSFP 1200–MSFP 1199–MSFP 1198–MSFP 1197.

When the skip mode is selected, the MSFP transmission control unit 23 arranges the sequence of the MSFPs by skipping a predetermined number of the MSFPs to determine the same as the readout request transmission sequence, for example, MSFP 1–MSFP 60–MSFP 120–MSFP 180.

When the location-specifying playback mode is selected, the MSFP transmission control unit 23 arranges the sequence of the MSFPs starting from an MSFP specified by the subscriber to determine the same as the readout request transmission sequence, for example, MSFP 301–MSFP 302–MSFP 303–MSFP 304.

While controlling the MSFP transmission, the MSFP transmission control unit 23 checks the last MSFP in the SCF by referring to the sequence number of the MSFSs in the readout requests, and once the MSFP transmission control unit 23 has transmitted the last readout request (S206), it waits for the following SFC (S201).

Figure 10:
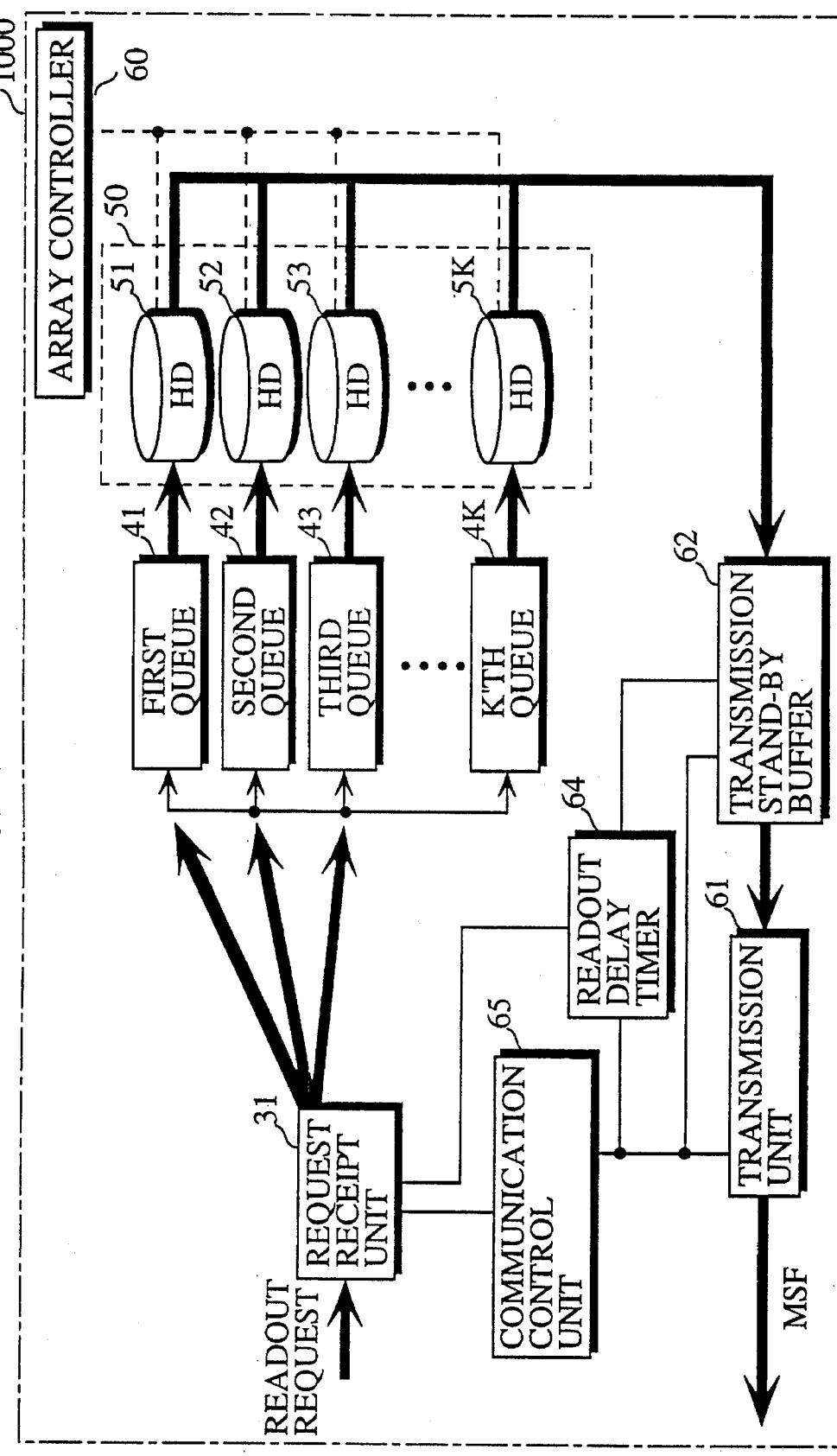
FIG. 10 is a view depicting the structure of the MSFS shown in FIG. 2.

The MSFSs 1000, 1001, 1002, 1003, . . . are of the same structure, and the MSFS 1000 will be explained as an example while referring to FIG. 10 depicting the structure thereof. The MSFS 1000 comprises a request receipt unit 31, first through K'th queues 41 . . . 4K, a SCSI disk array 50 including first through K'th hard disk drives 51 . . . 5K, an array controller 60, a transmission stand-by buffer 62, a readout delay timer 64, a transmission unit 61, and a communication control unit 65.

The request receipt unit 31 receives the readout requests successively transmitted from the SCBs by means of the ATM switch 4000.

The queues 41 . . . 4K are furnished for the hard disk drives 51 . . . 5K respectively, and each accumulates the readout requests for the respective hard disk drives.

The disk array 50 includes the hard disk drives 51 . . . 5K which are interconnected each other by a SCSI and operate in parallel. Each hard disk drive comprises a disk whose memory is divided into a set of sectors each storing the 1024-byte data forming the MSF, a disk driving system, and a head for reading out the data in the sectors, and a seek system for seeking the head. Each hard disk drive reads out the data in the sectors by controlling the disk driving system and seek driving system. For this reason, not all the data are read out at the same readout rate: the readout rate is directly proportional to the distances between the head and the sectors. The disks in the hard disk drives 51 . . . 5K operate in parallel, and thus the hard disk drives 51 . . . 5K operate as if they were one unit by driving the disks alternately or sequentially. Note that one of the hard disk drives is exclusively used for code correction to ensure the reliability.

Figure 11A:
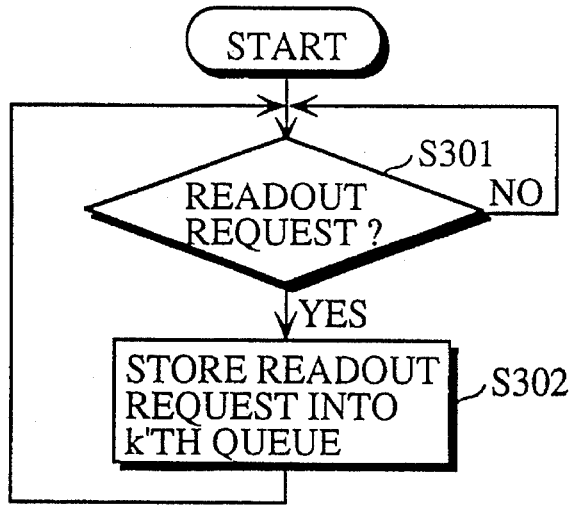
FIGS. 11A and 11B are the flowcharts detailing the operation of an array controller shown in FIG. 10.

The array controller 60 controls the disk array 50 and MSF transmission. The operation of the array controller 60 will be explained while referring to the flowcharts in FIGS. 11A and 11B. In the drawing, Kdisk is a variable equal to 2 or more ($k \geq 2$) that specifies the queues furnished for each hard disk drive and its disk in the disk array 50.

When the request receipt unit 31 receives the readout request (MSF_Read_Req) (S301), the array controller 60 analyses the same to specify the disk that contains the requested MSF. Assume that the requested MSF is stored in the k'th hard disk drive 5k, the array controller 60 stores the readout request into the corresponding k'th queue 4k (S302). When the k'th queue 4k receives the readout request (S303), the array controller 60 retrieves the readout request in the k'th queue (S304) to readout the MSF per sector (S305). When the readout operation completes (S306), the array controller 60 increments the queue number by one (S307).

Figure 12:
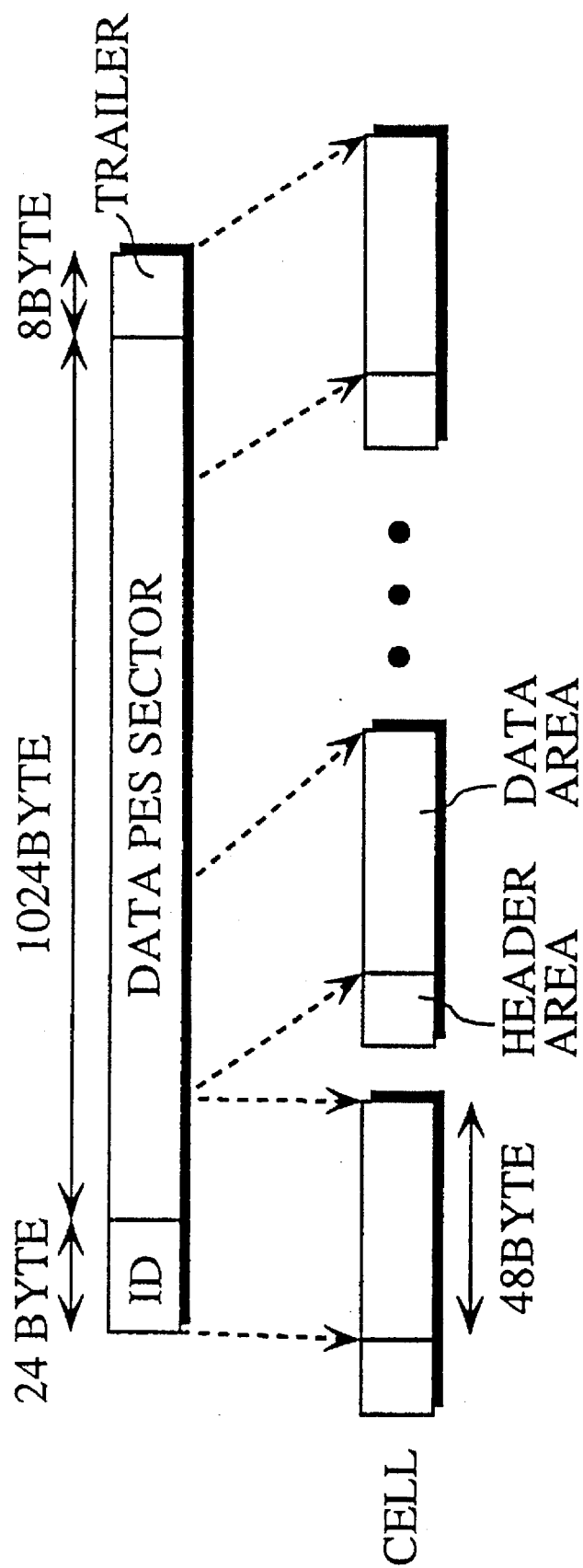
FIG. 12 is a view explaining how the data per sector are converted into cells.

The transmission unit 61 converts the MSFs read out from the disk array 50 per sector into a set of cells and outputs the same to the ATM switch 4000, which will be explained more in detail while referring to FIG. 12.

The transmission unit 61 attaches 24-byte ID data and 8-byte trailer to 1024-byte data of one sector, making 1056-byte data, divides the resulting 1056-byte data into a set of 48-byte data areas, and attaches a 5-byte header area to each generating 22 cells as a result. Having generated the cells, the transmission data 61 detects the SCB that has sent the readout request and stores the address thereof into the header area.

Because one MSF has a file size of 64 Kbytes, 64×22 (1048) cells are generated from one MSF, which are separately transmitted to the SCBs 3000, 3001, . . . . Since the transmission unit 61 carries out the above MSF-to-Cell conversion process 64×22 (1408) times to transmit one MSF, the MSFs read out from the disk array 50 are not transmitted instantaneously.

Also, the transmission unit 61 inquires whether the ATM switch 4000 has an overflow, and in case of overflow, to suspend the cell transmission until the overflow is eliminated.

The transmission stand-by buffer 62 is a FIFO (first-in-first-out) memory to withhold the MSFs read out from the disk array 50 to deliver the same to the transmission unit 61 in the readout sequence; for the readout MSFs are not transmitted instantaneously.

The readout delay timer 64 includes a plurality of counters that operate in parallel, and sets a timing to deliver the MSFs in the transmission stand-by buffer 62 to the transmission unit 61.

The communication control unit 65 controls the MSF transmission by the MSFS 1000, which will be explained while referring to the flowchart in FIG. 13.

The communication control unit 65 monitors the receipt of a readout request by the request receipt unit 31, and the completion of the MSF transmission by the transmission unit 61 (C10, C11). Upon detection of the readout request receipt in C10, the communication control unit 65 activates the readout delay timer 64 to count the time for the readout request (C12), and has the array controller 60 accumulate the readout request in the corresponding queue (C13). When the transmission unit 61 completes the transmission of one MSF in C11, the communication control unit 65 checks whether there is any MSF in the transmission stand-by buffer 62 (C14) to further check whether the time-out has come for the first-in MSF therein. (C15). When the time-out has come, the communication control unit 65 has the transmission stand-by buffer 62 deliver the first-in MSF to the transmission unit 61 (C16), which accordingly transmits the same to the ATM switch 4000.

Figure 13:
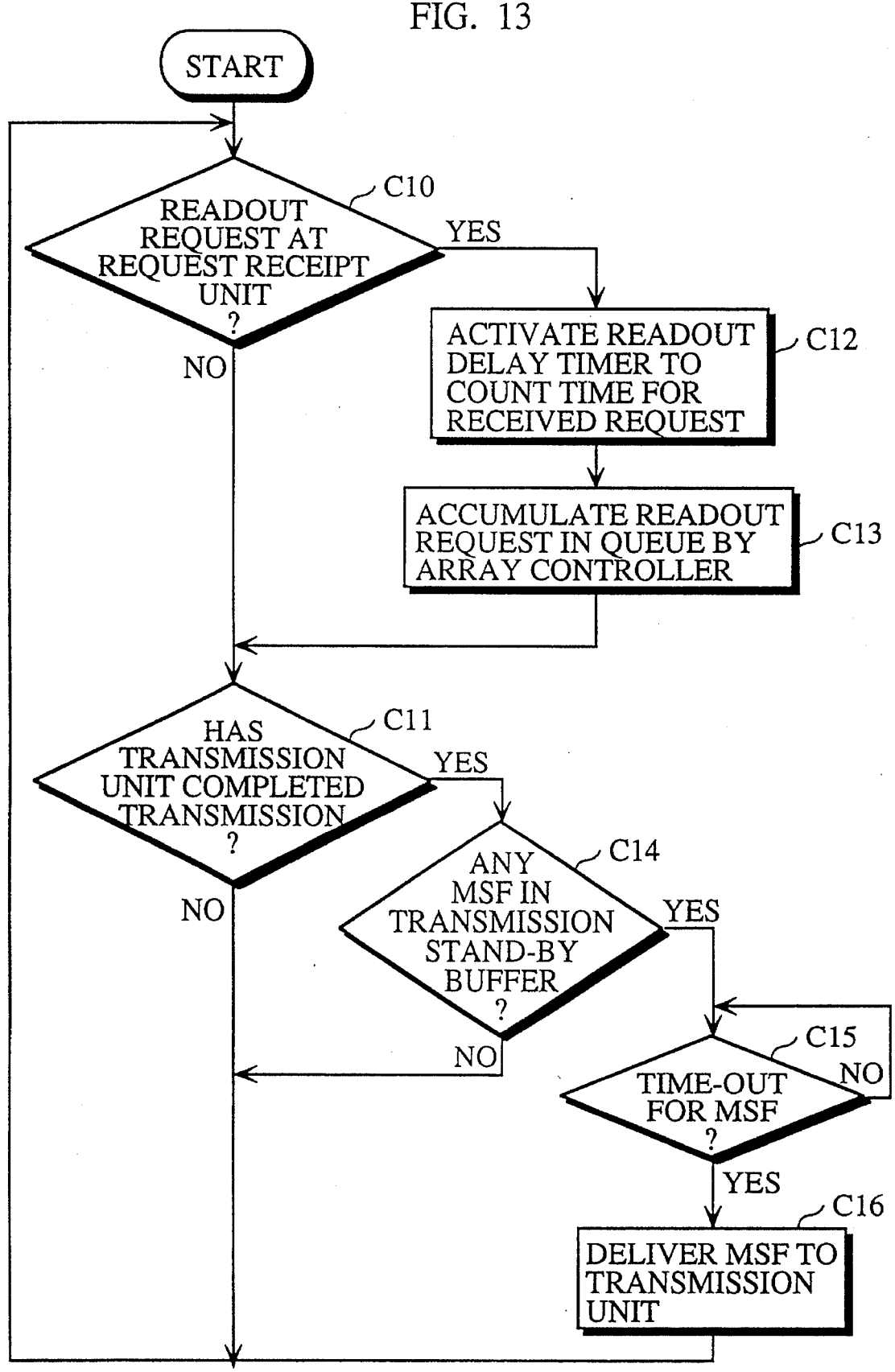
FIG. 13 is a flowchart detailing the operation of a communication control unit.
Figure 14:
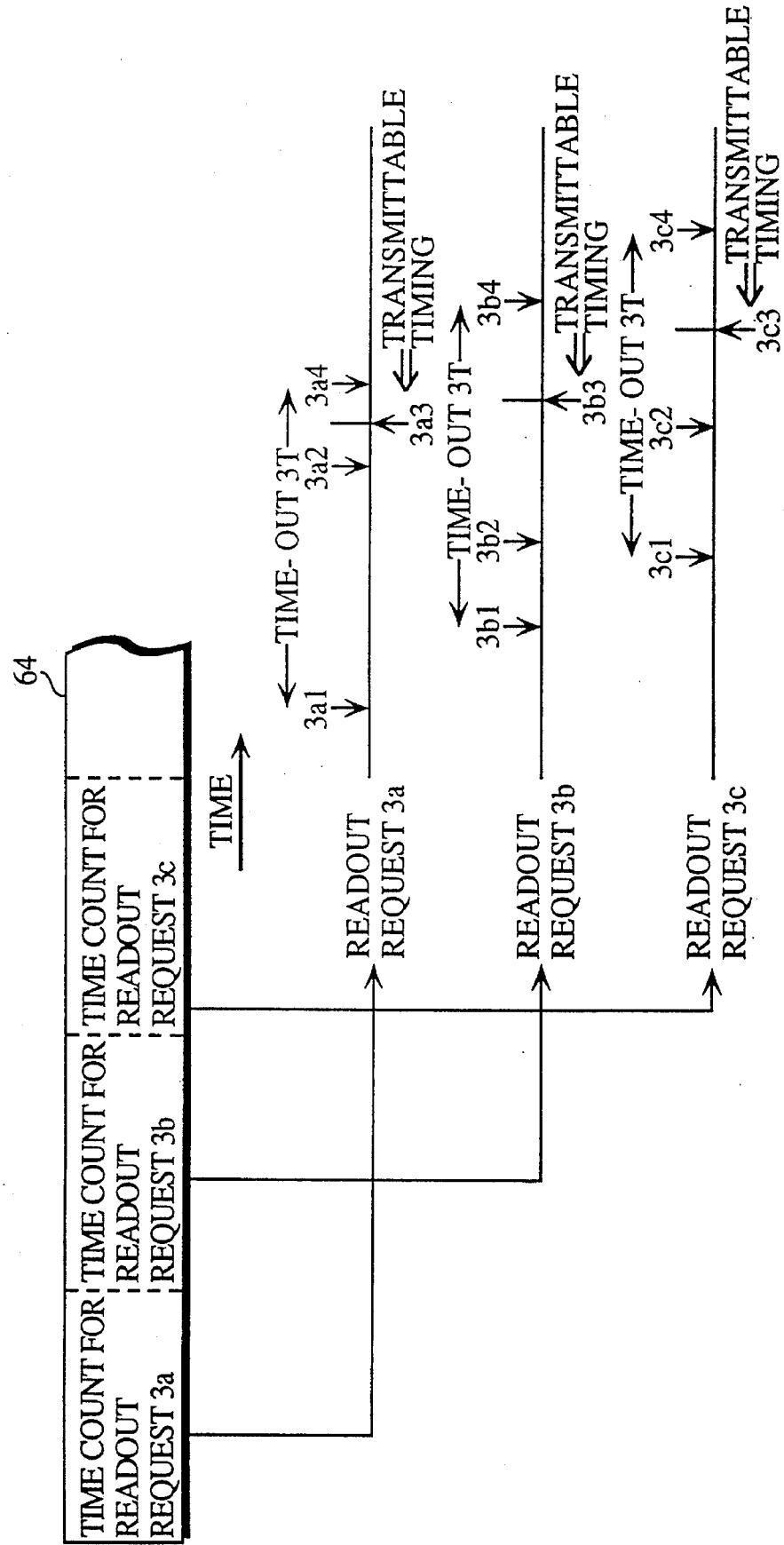
FIG. 14 is a view explaining how a transmission unit shown in FIG. 10 transmits the MSFs.

FIG. 14 details the timing control by the readout delay timer 64 described using the flowchart in FIG. 13. When the request receipt unit 31 receives a readout request 3a at the timing of 3a1 (C10), the readout delay timer 64 start to count the time for the readout request 3a. Accordingly, the MSF3a is read out from the disk array 50 as per the readout request 3a and stored in the transmission stand-by buffer 62 at the timing of 3a2. Although it becomes possible for the transmission stand-by buffer 62 to transmit the MSF3a at the timing of 3a3 (C11), the MSF3a is not delivered to the transmission unit 61 until the readout delay timer 64 counts the time-out 3T. When the readout delay timer 64 counts 3T (3a4), the communication control unit 65 has the transmission stand-by buffer 62 deliver the MSF3a to the transmission unit 61 (C16).

Similarly, when the request receipt unit 31 receives readout request 3b and 3c at the timing of 3b1 and 3c1 respectively (C10), the readout delay timer 64 starts to count the time for each request. Then, the MSF3b is readout from the disk array 50 as per the readout request 3b and stored in the transmission stand-by buffer 62 at the timing of 3b2. Subsequently, the MSF3c is readout from the disk array 50 as per the read request 3c and stored in the transmission stand-by buffer 62 at the timing of 3c2. Note that the MSF3a, MSF3b, and MSF3c are readout at the different timing because the time required to read out the MSFs varies depending on where they are stored in the disks. Although it becomes possible for the transmission stand-by buffer 62 to deliver the MSF3b and MSF3c at the timing of 3b3 and 3c3 respectively (C11), neither the MSF3b nor MSF3c is delivered until the readout delay timer 64 counts 3T for each. When the readout delay timer 64 counts 3T for each (3b4 and 3c4), the communication control unit 65 has the transmission stand-by buffer 62 deliver the MSF3b and MSF3c to the transmission unit 61 (C16).

Due to the above timing control by the readout delay timer 64, the MSFs are delivered to the transmission unit 61 at regular intervals from the receipt of their respective readout requests even when the MSFs are readout at different timing.

Following is the explanation of how the scale of an interactive system employing the above video server 100 will be determined.

First, the number of the subscribers (NSB) of the interactive system must satisfy Equation (1) as follows:

$$NSB < EX/(\rho \times rt) \tag{1}$$

where

EX is the ATM switch 4000's exchange ability;

rt is a transmission rate per video of the subscriber line connecting the SCBs and terminals;

$\rho$ is the usage frequency per subscriber (times/second).

Now, let EX be 2.4 Gbps, rt be 1.5 Mbps, and $\rho$ be 0.05, then we get NSB<32000.

Thus, the interactive television system employing the video server 100 can provide the service to approximately 32000 subscribers.

Then, the number of the MSFSs (NDB) is found by Equation (2) as follows:

$$NDB > EX/rr \tag{2}$$

where rr is the MSFS's maximum retrieval rate.

Let rr be 12 Mbps, then we get NDB>200, which means the video server 100 must be furnished with 201 or more MSFSs.

Further, the number of subscribers (NACC) that can access to the video server 100 simultaneously is found by Equation (3) as follows:

$$NACC = NDB \times (rr/rt) \tag{3}$$

Thus, we get NACC=1600.

Also, the disk array 50 within each MSFS demands a capacity (DB×NB) calculated by Equation (4) as follows:

$$(DB \times NB) > Sm \times T \times rt/NDB \tag{4}$$

where

DB is the file size of one MSF;

NB is the maximum number of MSFs stored in one MSFS;

Sm is the number of the videos; and

T is the length of one video in time unit.

Let T be 3 minutes and Sm be 3000, then we get (DB×NB)=approximately 5 GB.

Further, a capacity (B) of the buffer memory 21 is found by Equation (5) as follows:

$$B > tr \ (rr-rt) = \{1-(rt/rr)\} \cdot DB \tag{5}$$

tr(=DB/rr) is the time required to transmit one MSF from the MSFS to the SCB; and tt(=DB/rt) is the time required to transmit one MSF from the SCB to the terminal.

For the interactive system constructed as above, PC/AT compatible personal computers installing an ATM interface card for the cell transmission and an i486DX-2-66 CPU (Intel Corp.) can be used as the MSFS 1000, 1001, 1002, . . . , SM 2000, SCBs 3000, 3001, 3002, . . . .

According to the first embodiment, when a video is requested from the subscriber, the MSFs forming the requested video are read out from a plurality of MSFSs in a predetermined sequence and successively transmitted to the request-sender subscriber via the subscriber line, making the read time access possible without having the subscriber kept waiting.

Also, by transmitting the MSFs consecutively at regular intervals even when the MSFs are read out at different timing, the video is transmitted continuously.

In this embodiment, the SCF stores the readout sequence of all the MSFs in one program; however, it may store only the MSFS's address of the first MSF of the program and its sequence number to have each hard disk drive store the addresses of the following MSFs (such as the address of the MSFS 1000). In this case, when the first MSF is read out, a chain of the following MSFs is read out. That is to say, each time one MSF is read out from the corresponding hard disk drive, the MSFP transmission control unit 23 receives the address of the following MSF and sends the readout request to the corresponding hard disk drive.

Also, the MSFP transmission control unit 23 sends the readout requests for the second and onwards MSFs sequentially at the predetermined interval before the buffer memory 21 transmits the corresponding MSF in the first embodiment. However, the MSFP transmission control unit 23 may transmit the same each time an adequate capacity becomes available in the buffer memory 21 or when most of the MSFs in the buffer memory 21 have been transmitted using the buffer memory monitor unit 22.

The MSFSs, SM and SCBs are not necessarily provided separately, the MSFS and SCB may be one unit.

The MSFs may be transmitted at irregular intervals to the terminals in the form of packets.

Second Embodiment

Figure 17:
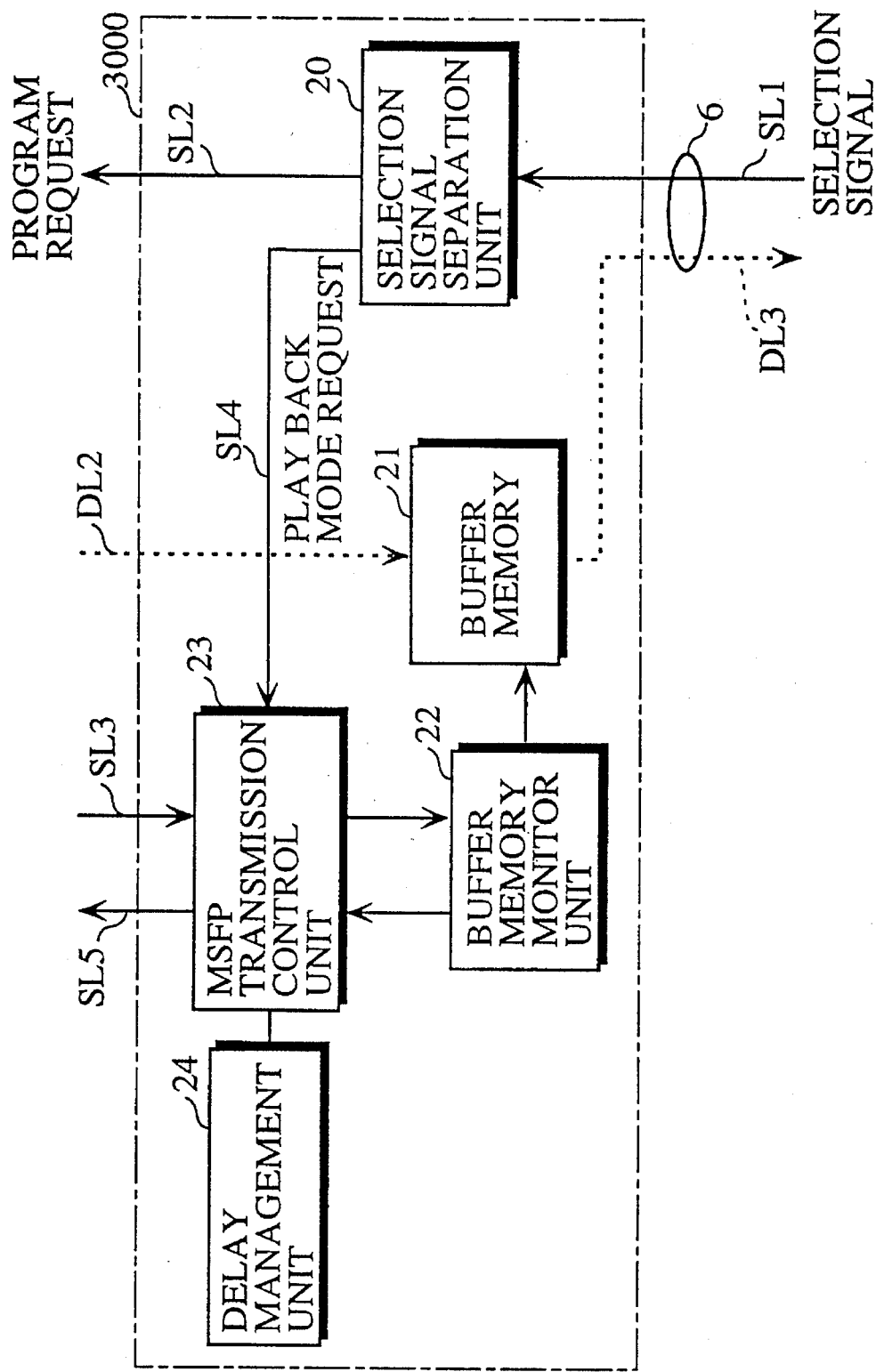
FIG. 17 is a view depicting the structure of an SCB in accordance with a second embodiment of the present invention.

In the second embodiment, each SCB counts the delay time between the transmission of the readout request and the receipt of the requested MSF, and exploits the delay time for the following readout request transmission. Thus, each SCB in the second embodiment additionally includes a delay management unit 24 as shown in FIG. 17.

The delay management unit 24 counts the time between the transmission of the readout request and the receipt of the requested MSF as a delay time, and manages the delay times in relation with the individual MSFSs as delay data. An example of the delay data is shown in FIG. 18, and the delay management unit 24 manages the delay times for the readout request to MSFS 1000, MSFS 1001, and MSFS 1002 separately. Further, the delay management unit 24 directs the MSFP transmission control unit 23 to transmit the readout requests based on the delay data.

FIG. 19 shows an example of a control sequence of the MSFP transmission control unit 23 and MSFSs 1000, 1001, 1002, . . . . In the drawing, (1a, A101) is a readout request addressed to the MSFS 1000 to read out MSF(A101). Similarly, (1b, A102) is a readout request addressed to the MSFS 1001 to read out the MSF(A102), and (1c, A103) is a readout request addressed to the MSFS 1002 to readout the MSF(A103). The control sequence shows that the MSFP transmission control unit 23 transmits these readout requests to the corresponding MSFSs 1000, 1001, 1002 and the buffer memory 21 receives the requested MSFs (A101), (A102), and (A103) after the delay management unit 24 has counted the delay times Da, Db, and Dc, respectively. Accordingly, the delay management unit 24 subtracts the predetermined interval explained in the first embodiment from the delay times and notifies the balance to the MSFP transmission control unit 23. By so doing, in case of FIG. 19, the delay management unit 24 have the MSFP transmission control unit 23 transmit a readout request (10a, A110) addressed to the MSFS 1009 (not shown) to readout the MSF(A110) at an interval corresponding to the balance before the predetermined interval. By managing the delay time for each MSFS and transmitting the readout requests by taking the delay time into account, the requested MSFs are received at regular intervals even when they are transmitted at different timing.

In the second embodiment, the delay times are managed in relation with the individual MSFSs; however, the delay time for the latest readout request to the same MSFS may be used instead. In this case, the latest delay time is compared with the delay time in the delay data, and when the two values do not coincide, the latter is updated by the former.

Third Embodiment

In the third embodiment, each MSFS estimates the delay time depending on the number of the accumulated readout requests, and notifies the estimated delay time to the SCB (herein 3000) that has sent the readout request besides the effects realized by the second embodiment.

Figure 20:
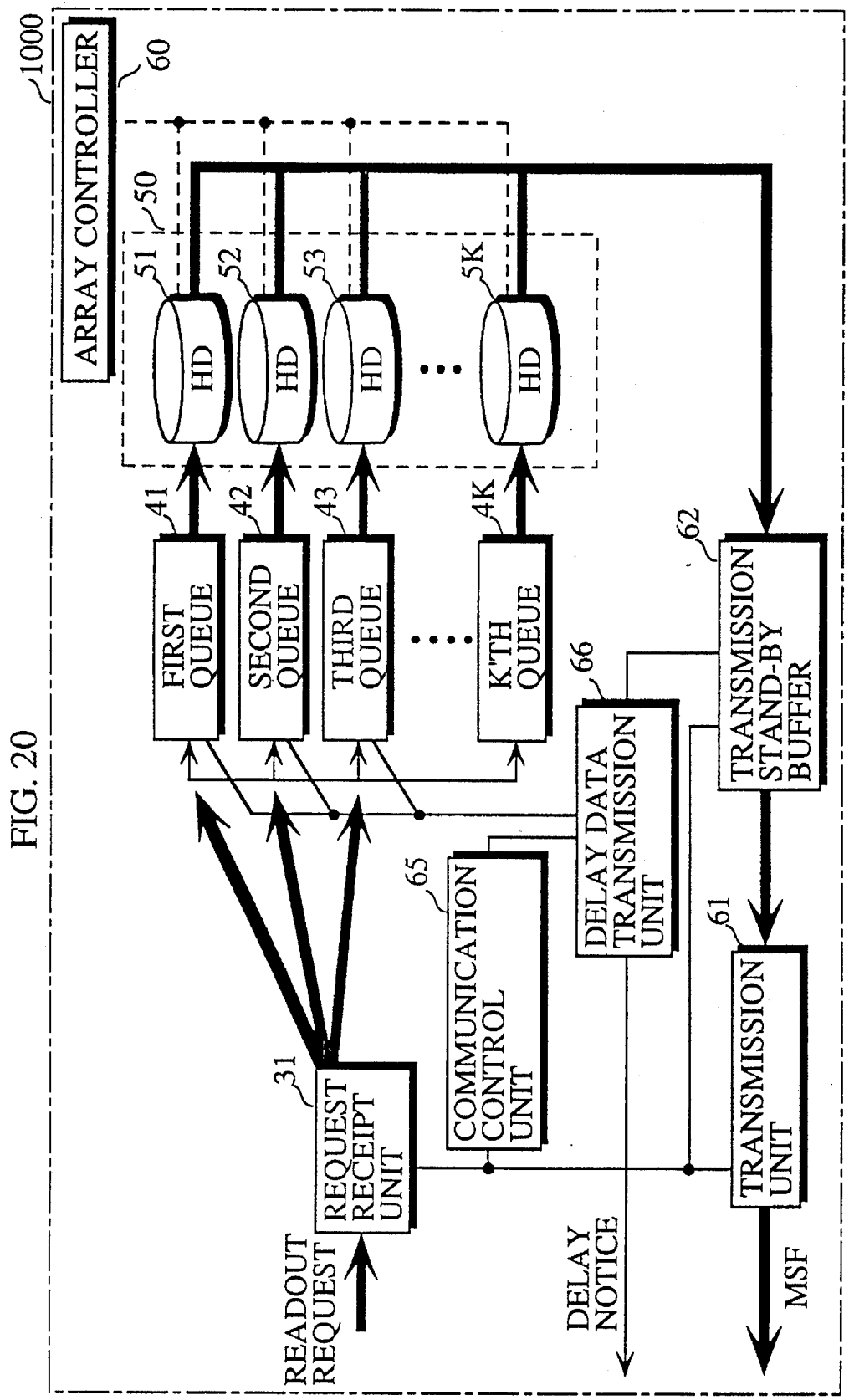
FIG. 20 is a view depicting the structure of an MSFS in accordance wit a third embodiment of the present invention.

Thus, as shown in FIG. 20, the MSFS 1000 in the third embodiment includes a delay data transmission unit 66 instead of the readout delay timer 64 to notify the estimated delay time value to the SCB 3000.

The delay data transmission unit 66 estimates the time required to complete a readout request received by the request receipt unit 31 depending on the number of the readout requests accumulated in the corresponding queue. When the estimated time exceeds a predetermined value, the delay data transmission unit 66 converts the estimated value into the cells, and transmits the same to the delay management unit 24 in the SCB 3000 as a delay notice. Having received the delay notice, the delay management unit 24 manages the estimated time in the delay notice as the delay time for the MSFS 1000.

Figure 21:
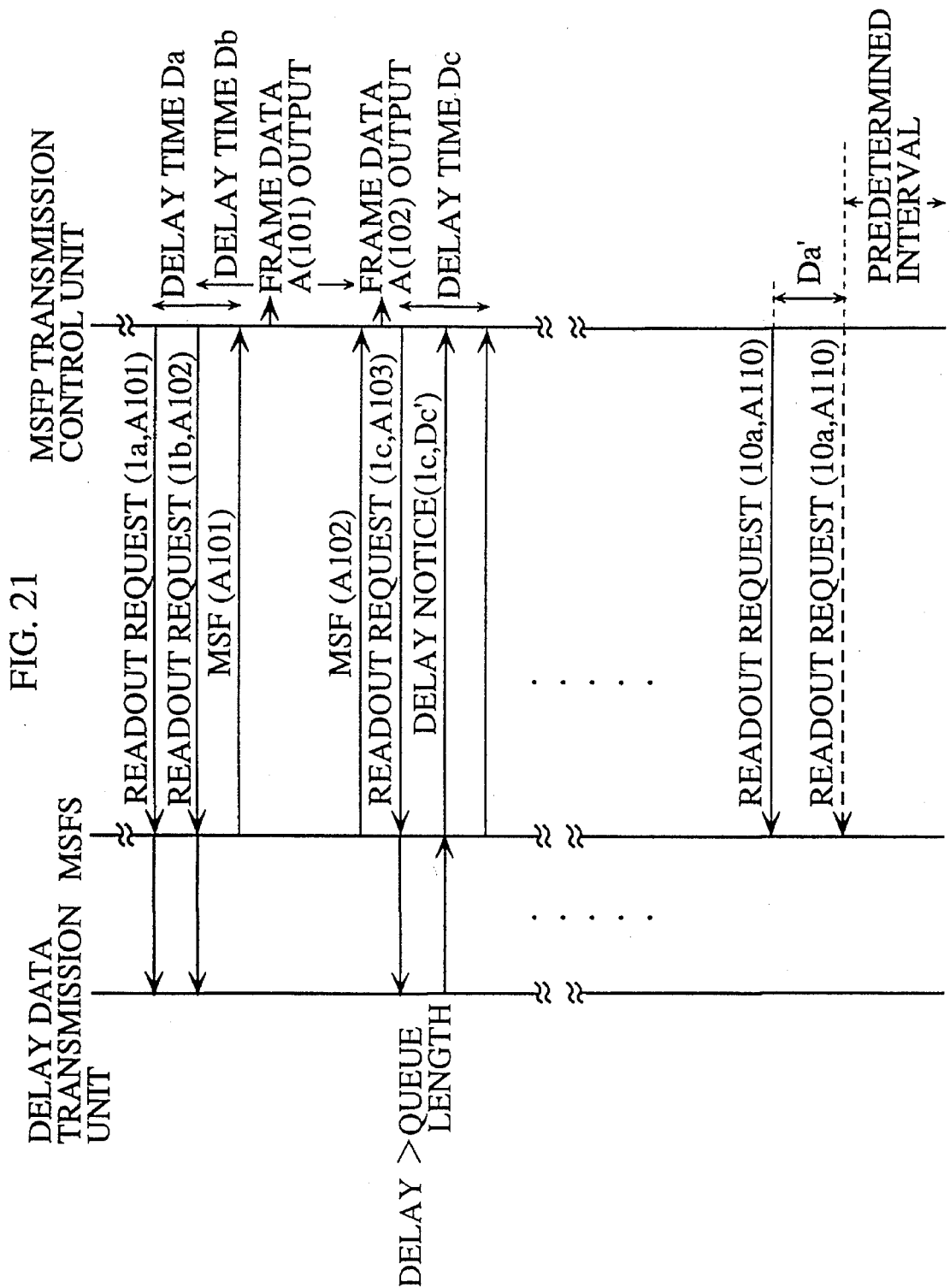
FIG. 21 is the control sequence of a video server in accordance with the third embodiment.

The operation of the delay data transmission unit 66 will be explained while referring to FIG. 21 showing an example of a control sequence of the MSFP transmission control unit 23 and MSFSs 1000, 1001, 1002, . . . . In the drawing, (1a, A101) is a readout request addressed to the MSFS 1000 to readout MSF(A101). Similarly, (1b, A102) is a readout request addressed to the MSFS 1001 to readout MSF(A102) and (1c, A103) is a readout request addressed to the MSFS 1002 to readout MSF(A103).

Assume that the readout request (1c, A103) received by MSFS 1002 is accumulated in the corresponding queue, then the delay data transmission unit 66 estimates the delay time for the readout request (1c, A103) by taking into account the queue length (the number of the readout request accumulated in the queue), and returns the estimated delay time Dc' as the delay notice to the delay management unit 24 in the SCB 3000. Then, the delay management unit 24 directs the MSFP transmission control unit 23 to transmit the following readout request by taking into account the delay time Dc'.

By managing the estimated delay time for each MSFS and sending the readout requests by taking the estimated delay

19 time into account, the MSFs are received at regular intervals when the MSFs are transmitted at different timing.

Fourth Embodiment

In the fourth embodiment, each SCB counts the time between the transmission of the readout request and the receipt of the requested MSF, and when the counted time exceeds a predetermined time Td1, the SCB discards the received MSF.

To be more efficient, each MSFS in the fourth embodiment also discards the MSFs which are likely to be discarded by the SCBs before it transmits such MSFs to the ATM switch 4000.

Figure 22:
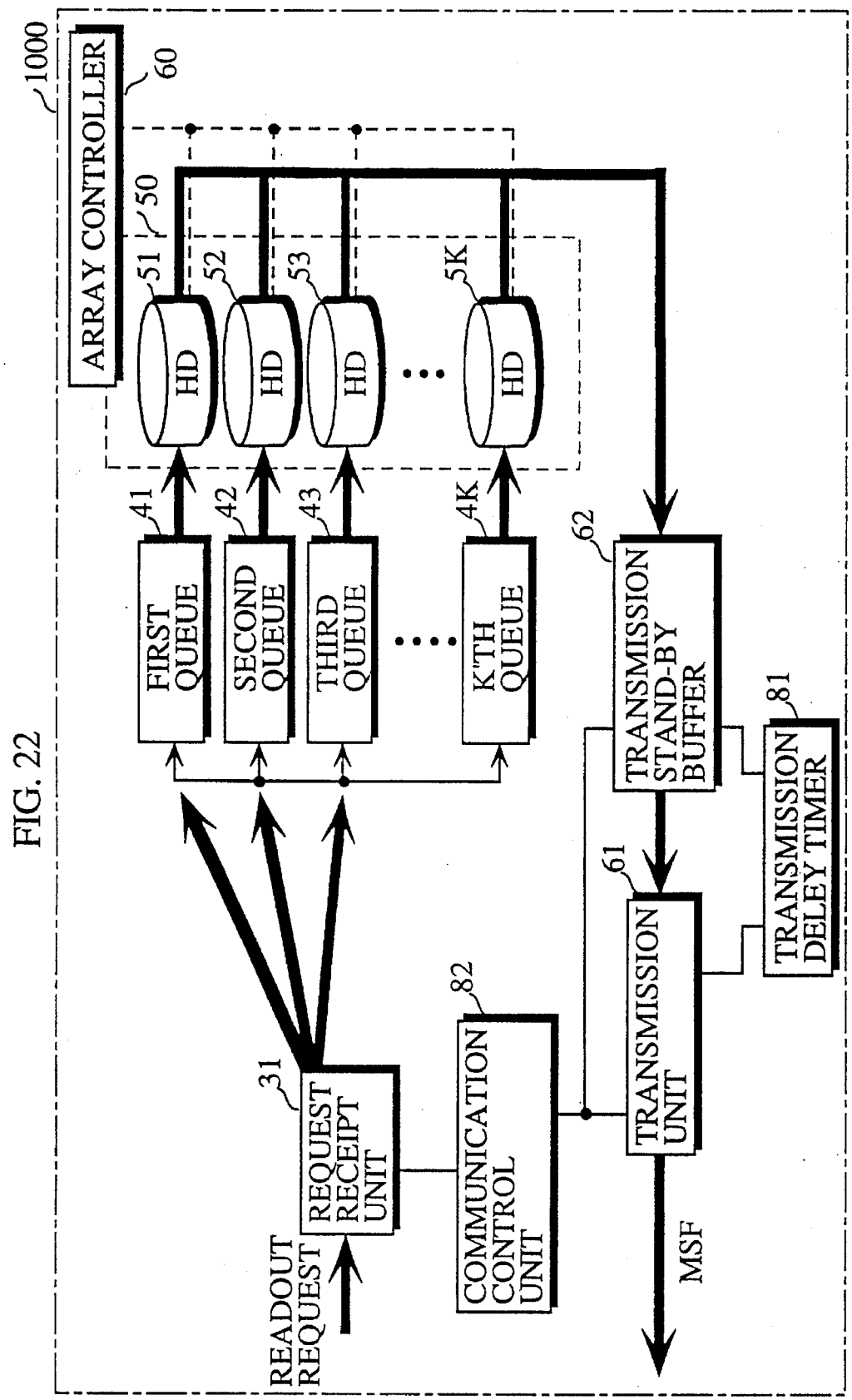
FIG. 22 is a view depicting the structure of an MSFS in accordance with a fourth embodiment of the present invention.

Thus, each MSFS in the fourth embodiment includes a transmission delay timer 81 instead of the readout delay timer 64 and a communication control unit 82 instead of the communication control unit 65 as shown in FIG. 22.

The transmission delay timer 81 is of the same structure as the readout delay timer 64; however, it counts a waiting time for each MSF in the transmission stand-by buffer 62, and the maximum waiting time is set as the time-out Tm1 using Equation 6 as below.

$$Tm1=Td1-Ta1-Tb1 \quad (6)$$

wherein

Ta1 is the minimum delay time between the transmission of the readout request from the SCB 3000 and the delivery of the requested MSF to the transmission unit 61;

Tb1 is the minimum delay time between the transmission of the MSF from the transmission unit 61 and the receipt of the same at the SCB 3000.

Figure 23:
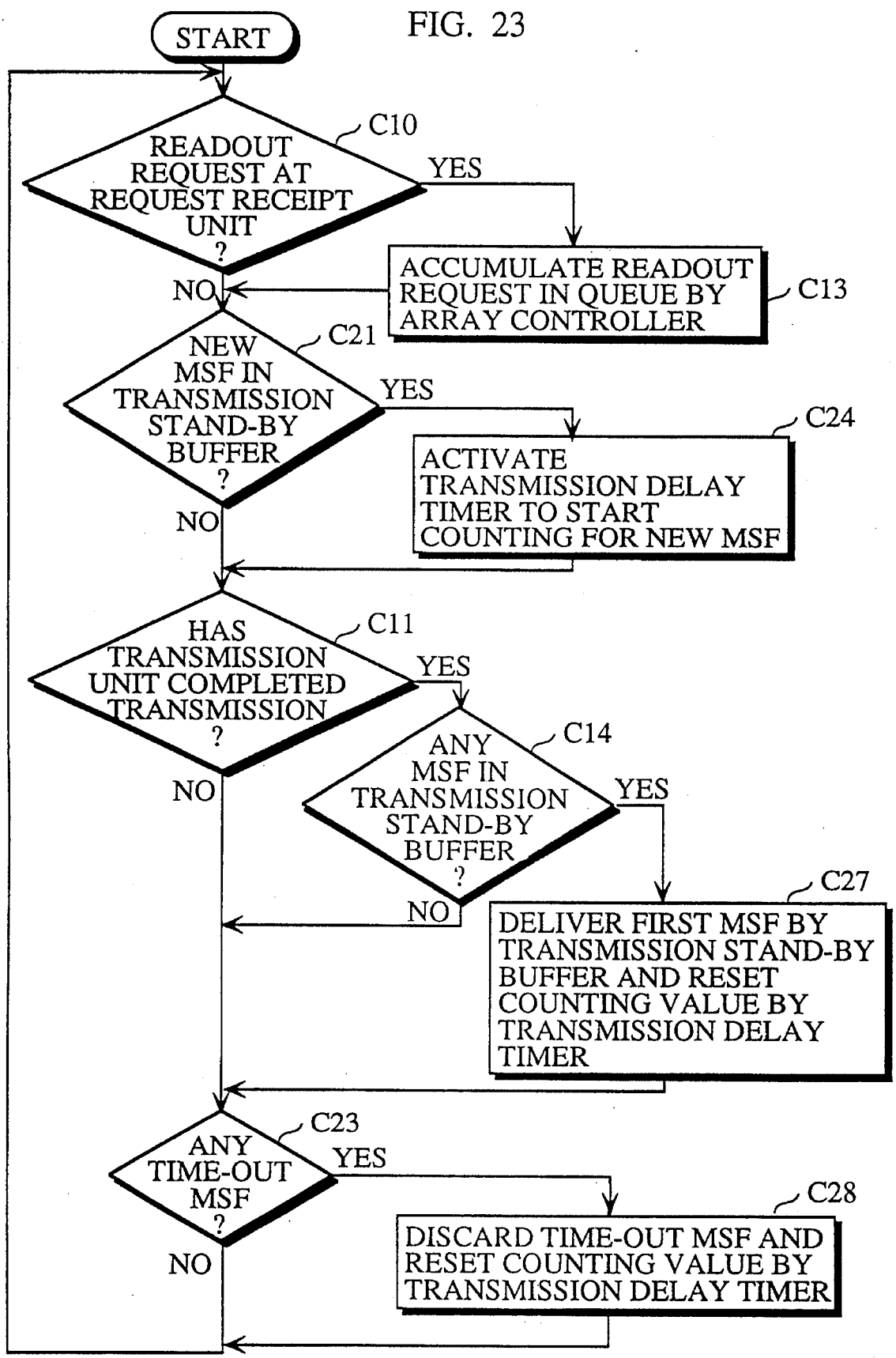
FIG. 23 is a flowchart detailing the operation of a communication control unit in accordance with the fourth embodiment.

The communication control unit 82 controls the communication within the MSFS 1000, and whose operation will be explained while referring to the flowchart in FIG. 23. Since the flowchart is partly identical with the flowchart in FIG. 13, only the different steps will be explained.

The communication control unit 82 monitors the receipt of a readout request at the request receipt unit 31 (C10), a new MSF in the transmission stand-by buffer 62 (C21), the completion of the MSF transmission by the transmission unit 61 (C11), and time-out MSFs (C23).

When the request receipt unit 31 has not received any readout request in C10, and a new MSF is stored in the transmission stand-by buffer 62 in C21, the communication control unit 82 activates the transmission delay timer 81 to start to count the waiting time for the new MSF (C24). When the transmission unit 61 has completed the transmission of one MSF (C22), the communication control unit 82 checks whether there is any MSF in the transmission stand-by buffer 62 (C14) to have the transmission stand-by buffer 62 deliver the first-in MSF therein to the transmission unit 61, while having the transmission delay timer 81 reset the counting value for the delivered MSF (C27).

When the communication control unit 82 detects the time-out MSF in C23, it discards such an MSF (C28) and has the transmission delay timer 81 reset the counting value for the discarded MSF (C28).

By discarding the MSFs that have been withheld in the transmission stand-by buffer 62 for a long time in each MSFS, most of the MSFs that are likely to be discarded by the SCBs are discarded before they are transmitted to the ATM switch 4000, and thus reducing the load to the ATM switch 4000.

20

The time between the MSF delivery from the transmission stand-by buffer 62 and the MSF transmission by the transmission unit 61 is counted in this embodiment. However, the time between the receipt of the readout request and the transmission of the requested MSF at each MSFS may be counted instead.

Fifth Embodiment

In the fifth embodiment, priority is given to the cells converted from the MSFs that took a considerably long time to be read out.

Thus, the MSFS 1000 in the fifth embodiment is of the same structure as the MSFS 1000 in the first embodiment except that the communication control unit 65 has the transmission unit 61 set a delay level in each cells forming the MSFs.

The communication control unit 65 transmits the cells by the transmission unit 61 after the transmission unit 61 has set a low delay level to each when the corresponding MSF is read out before the time-out, and a high delay level when it is readout after the time-out.

Figure 24:
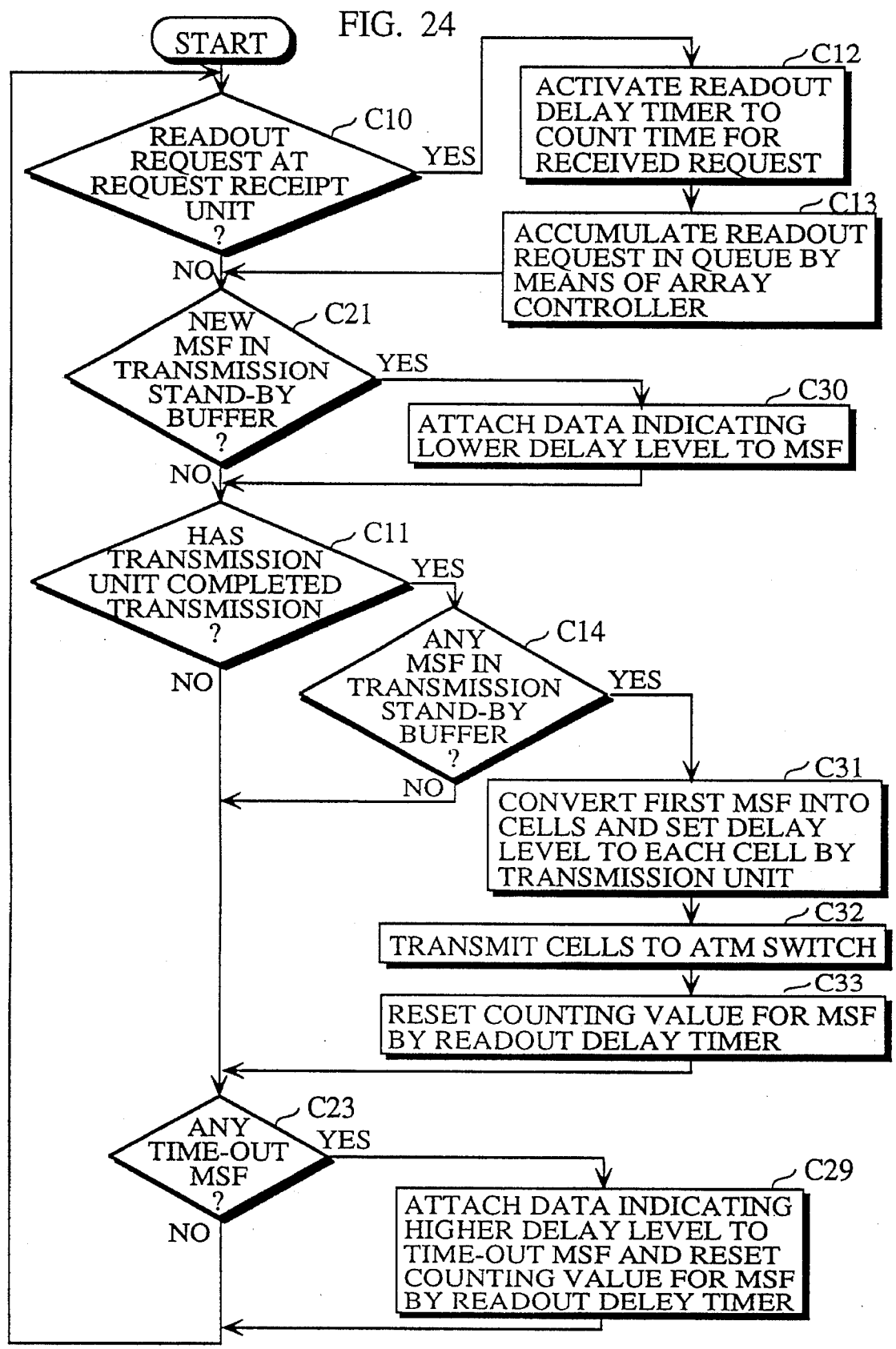
FIG. 24 is a flowchart detailing the operation of a communication control unit in accordance with a fifth embodiment of the present invention.

The operation of the communication control unit 65 will be explained while referring to the flowchart in FIG. 24. The flowchart in FIG. 24 is partly identical with the flowcharts in FIGS. 13 and 23, and only the different steps will be explained.

The communication control unit 65 monitors the receipt of a readout request at the request receipt unit 31 (C10), a new MSF in the transmission stand-by buffer 62 (C21), the completion of the MSF transmission by the transmission unit 61 (C11), and time-out MSFs (C23).

When the request receipt unit 31 receives a readout request in C10, the communication control unit 65 activates the readout delay timer 64 to start to count the waiting time for the readout request (C12), and has the array controller 60 accumulate the readout request in the corresponding queue (C13). Upon detection of a new MSF in the transmission stand-by buffer 62 in C21, the communication control unit 65 attaches data indicating a lower delay level to the new MSF (C30). When the transmission unit 61 completes the transmission of one MSF in C61, the communication control unit 65 checks whether there exists any MSF in the transmission stand-by buffer 62 (C14), and has the transmission unit 61 convert the first-in MSF therein into the cells and sets the delay level of the first MSF to each (C31). Subsequently, the communication control unit 65 has the transmission unit 61 transmit the resulting cells to the ATM switch 4000 (C32), while resetting the counting value of the first MSF by the request delay timer 64 (C33).

Upon detection of a time-out MSF in the transmission stand-by buffer 62 in C23, a communication control unit 65 attaches the data indicating a higher delay level (C29).

Figure 25:
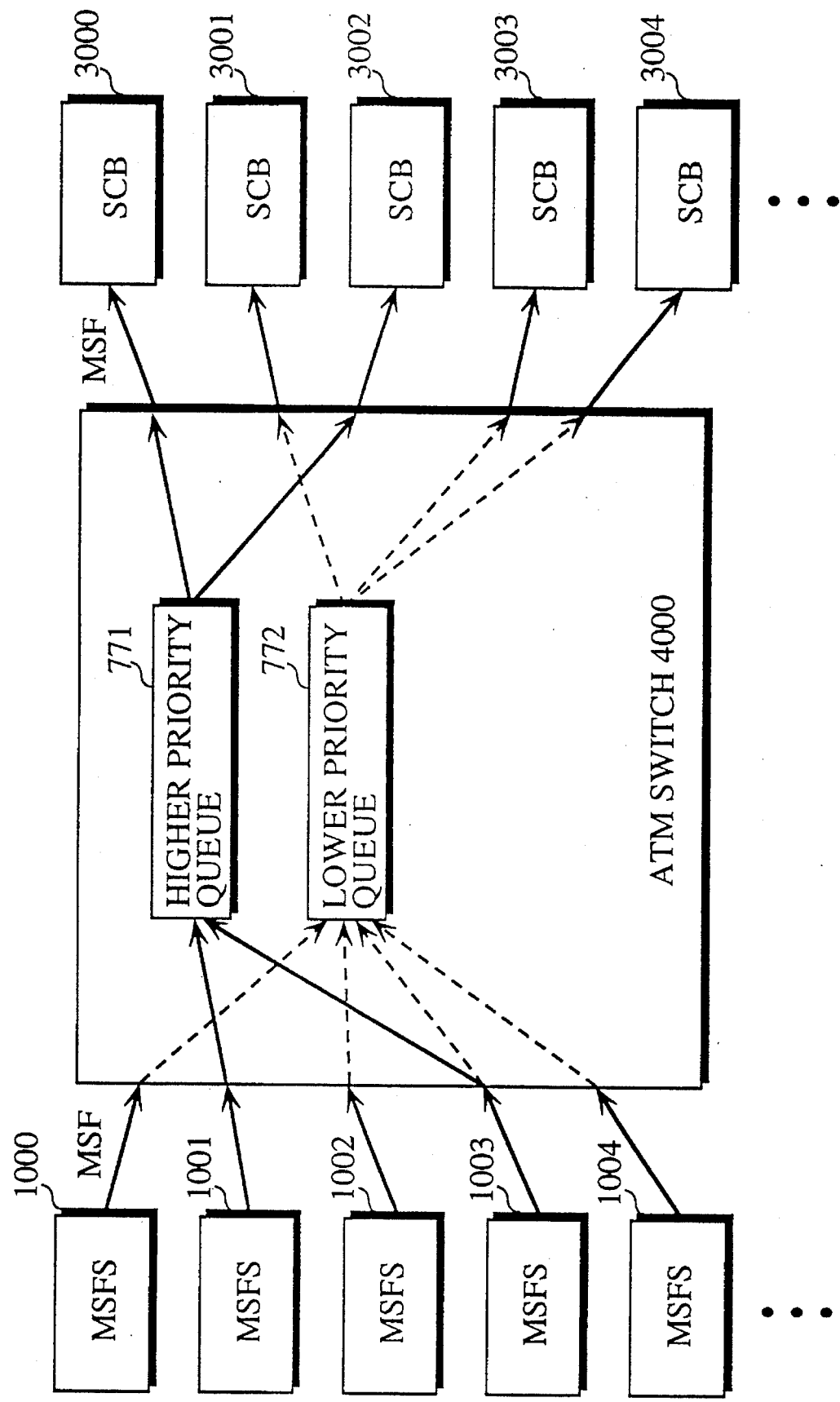
FIG. 25 is a view depicting the structure of an ATM switch in accordance with the fifth embodiment.

The structure of the ATM switch 4000 in the fifth embodiment will be explained while referring to FIG. 25. The ATM switch 4000 is of the same structure as the ATM switch 4000 in the first embodiment except that it additionally includes a higher priority queue 771 and a lower priority queue 772. In the drawing, a solid line represents a route of the higher-delay-level cells, and a dashed line represents a route of the lower-delay-level cells.

The higher priority queue 771 accumulates the higher-delay-level cells in the order of arrival, and the accumulated cells are exchanged to be transmitted to their respective destination SCBs in the same order.

The lower priority queue 772 accumulates the lower-delay-level cells in the order of arrival, and the accumulated cells are exchanged to be transmitted to their respective destination SCBs in th same order when no cells are accumulated in the higher priority queue 771.

Figure 26:
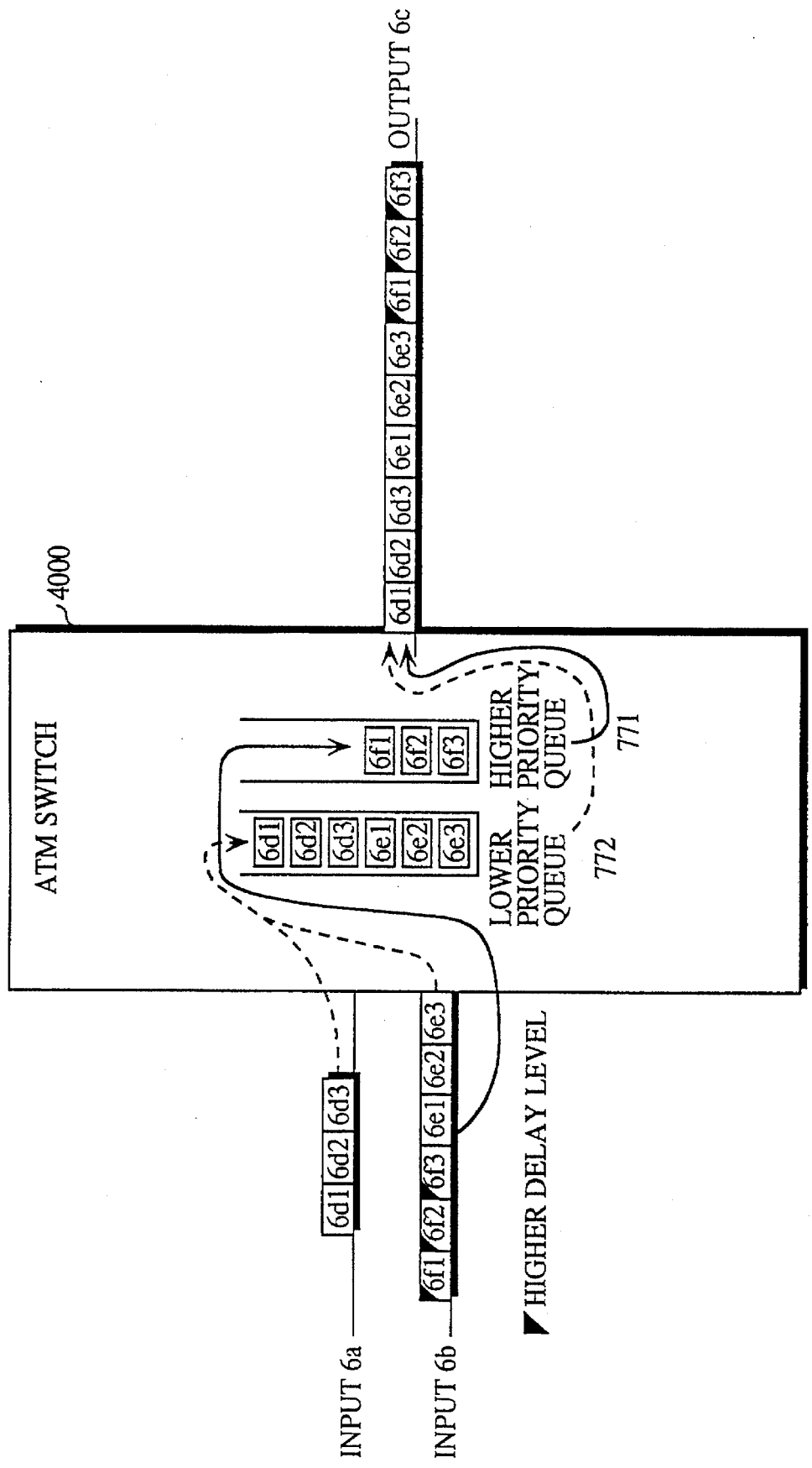
FIG. 26 is a view explaining how the cells are exchanged by the ATM switch in the fifth embodiment.

The operation of the ATM switch 4000 when transmitting the cells to their destination SCBs (herein SCB 3000) will be explained while referring to FIG. 26. In the drawing, INPUT 6a is an input signal to the ATM switch 4000 from the MSFS 1000, and INPUT 6b is the input signal to the ATM switch 4000 from the MSFS 1001, while OUTPUT 6c being an output signal from the ATM switch 4000 to the SCB 3000.

Cells 6d1, 6d2, and 6d3 are the lower-delay-level cells stored in the lower priority queue 772 as indicated by the dashed line.

Cells 6e1, 6e2, and 6e3 are also the lower-delay-level cells stored in the lower priority queue 772 as are with the Cells 6d1, 6d2, and 6d3.

Cells 6f1, 6f2, and 6f3 are the high-delay-level cells stored in the higher priority queue 771 as indicated by the solid line.

In this way, the cells from the transmission unit 61 are stored selectively into either the higher priority queue 771 or lower priority queue 772 depending on their delay level, and transmitted to the SCB 3000 in the order of priority. Thus, the cells 6f1, 6f2, and 6f3 are transmitted before the other cells 6d1, 6d2, 6d3, 6e1, 6e2, and 6e3 are transmitted.

By controlling the priority at the ATM switch 4000, the time between the MSF transmission from the MSFSs and the receipt of the MSF by the SCBs can be shortened even when it takes a long time for the transmission unit 61 to transmit the cells (MSFs) to the ATM switch 4000. As a consequence, the MSFs are received by the SCB at regular intervals even when they are transmitted at different timing from the MSFSs.

The readout delay timer 64 may be activated upon receipt of the readout request to count the delay time, and the priority may be determined based on the delay time.

Sixth Embodiment

Figure 27:
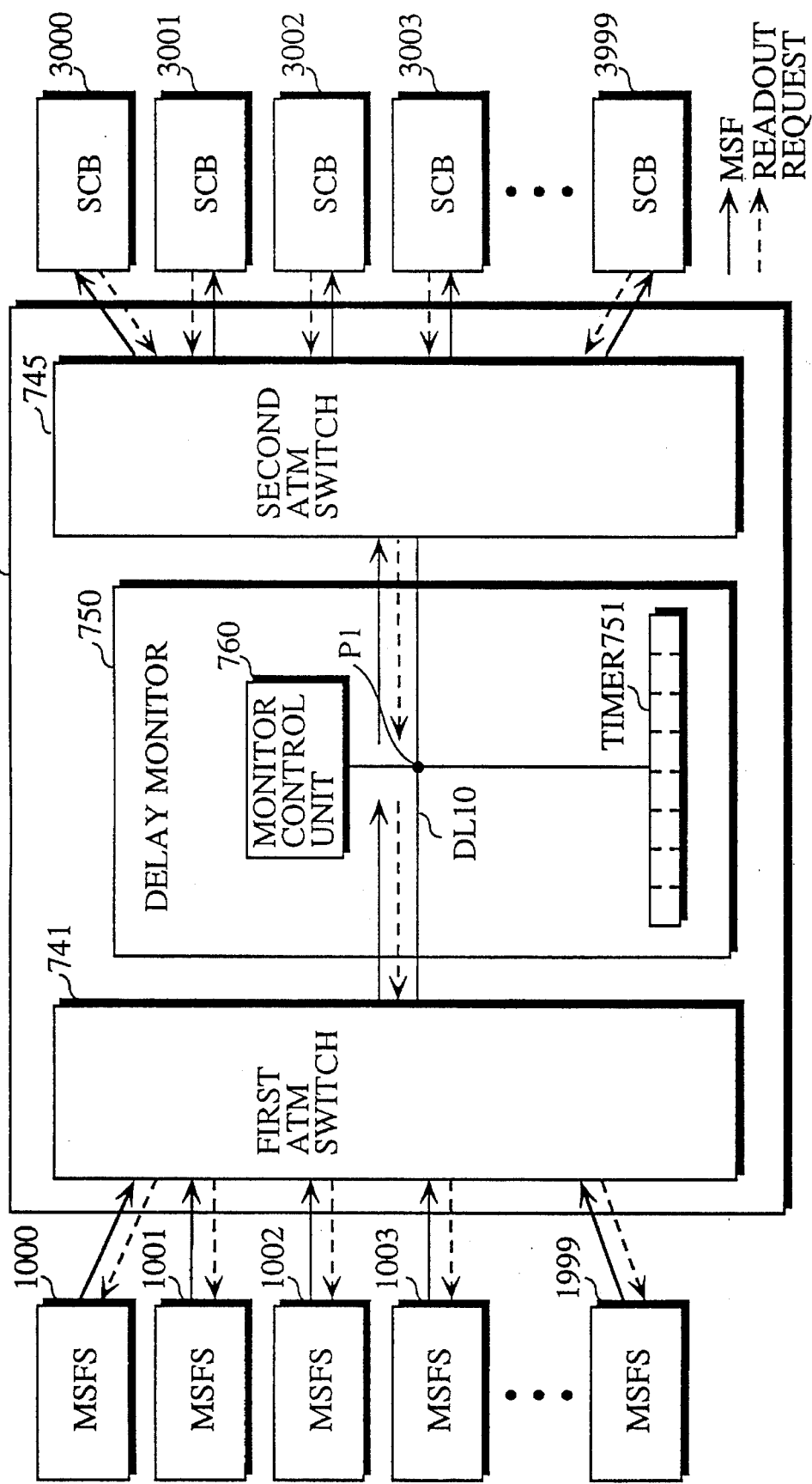
FIG. 27 is a view depicting the structure of a network in accordance with a sixth embodiment of the present invention.

In the sixth embodiment, the ATM switch 4000 is replaced with a network 740 consisting of a first ATM switch 741, a second ATM switch 745, and a delay monitor 750 as shown in FIG. 27. The first ATM switch 741 and second ATM switch 745 are connected to each other by a data line 10 (DL10), and the delay monitor 750 monitors the cells transmitted via the DL10. Note that like in the fourth embodiment, the cells are also discarded by the SCBs in this embodiment.

The delay monitor 750 includes a timer 751 and a monitor control unit 760.

The timer 751 is of the same structure as the readout delay timer 64 shown in FIG. 10; however, the timer 751 counts a time between the passing of a readout request sent from the SCB and the passing of the requested MSF; the counted time is referred to as the return time. Also, a time out Tm2 for the timer 751 is determined using Equation 7 as follows in advance.

$$Tm2 = Td1 - Tf1 - Tg1 \qquad (7)$$

where

Tf1 is the minimum delay time between the transmission of the readout request by the SCB and the receipt of the same by the delay monitor 750; and Tg1 is the minimum delay time between receipt of the readout request by the delay monitor 750 and the receipt of the requested MSF by the SCB.

The monitor control unit 760 controls the delay monitor 750, and the operation thereof will be explained while referring to the flowchart in FIG. 28.

The monitor control unit 760 monitors the cells traveling between the first ATM switch 741 and second ATM switch 745 and a point P1 on the DL10.

When a readout request from the SCB 3000 passes the point P1 (C41, C42), the monitor control unit 760 activates the timer 751 to start to count the return time for the readout request (C43). Further, upon detection of the requested MSF at the point P1 (C42), the monitor control unit 760 checks whether the timer 751 has counted up the time-out (C44). If so, the monitor control unit 760 discards the MSF (C47); otherwise it passes the MSF to the destination SCB, resetting the counting value for the MSF (C46).

Since the delay monitor 750 discards the MSFs that are likely to be discarded by the SCBs, the load to the ATM switch 4000 can be reduced.

The network 740 may be comprised of more than two ATM switches.

Seventh Embodiment

The video server 100 of the seventh embodiment is of the same structure as the video server 100 of the sixth embodiment except that it discards all the MSFs in the network 740 when the MSF requested by the readout request is judged to be discarded.

For this reason, the monitor control unit 760 detects the sequence number M of the latest MSF and the sequence number M+N of the latest readout request passing through the delay monitor 750. Also, the monitor control unit 760 counts a time Tm3 between the passing of the latest readout request (M+N) and the passing of the latest MSF (M), and stores a transmission interval Ts between the readout requests.

Thus, the monitor control unit 760 estimates a delay time Tm4 between the passing of the readout request (M) and the passing of the corresponding MSF (M) using Equation 8 as below.

$$Tm4 = Tm3 + N \cdot Ts - D \qquad (8)$$

where

D is the maximum balance between the readout-request time interval from one subscriber and Ts.

Note that Tm4 thus calculated is the minimum delay time, meaning that there always occurs a least delay of Tm4.

Given Tm4, the monitor control unit 760 discards the MSF (M) when Equation 9 as below is satisfied.

$$Tm4 > Td1 - Ti1 - Tj1 \qquad (9)$$

where

Ti1 is the minimum delay time between the transmission of the readout request from the SCB 3000 and the passing of the same through the delay monitor 750; and Tj1 is the minimum delay time between the passing of the MSF through the delay monitor 750 and the receipt of the same by the SCB 3000.

Figure 28:
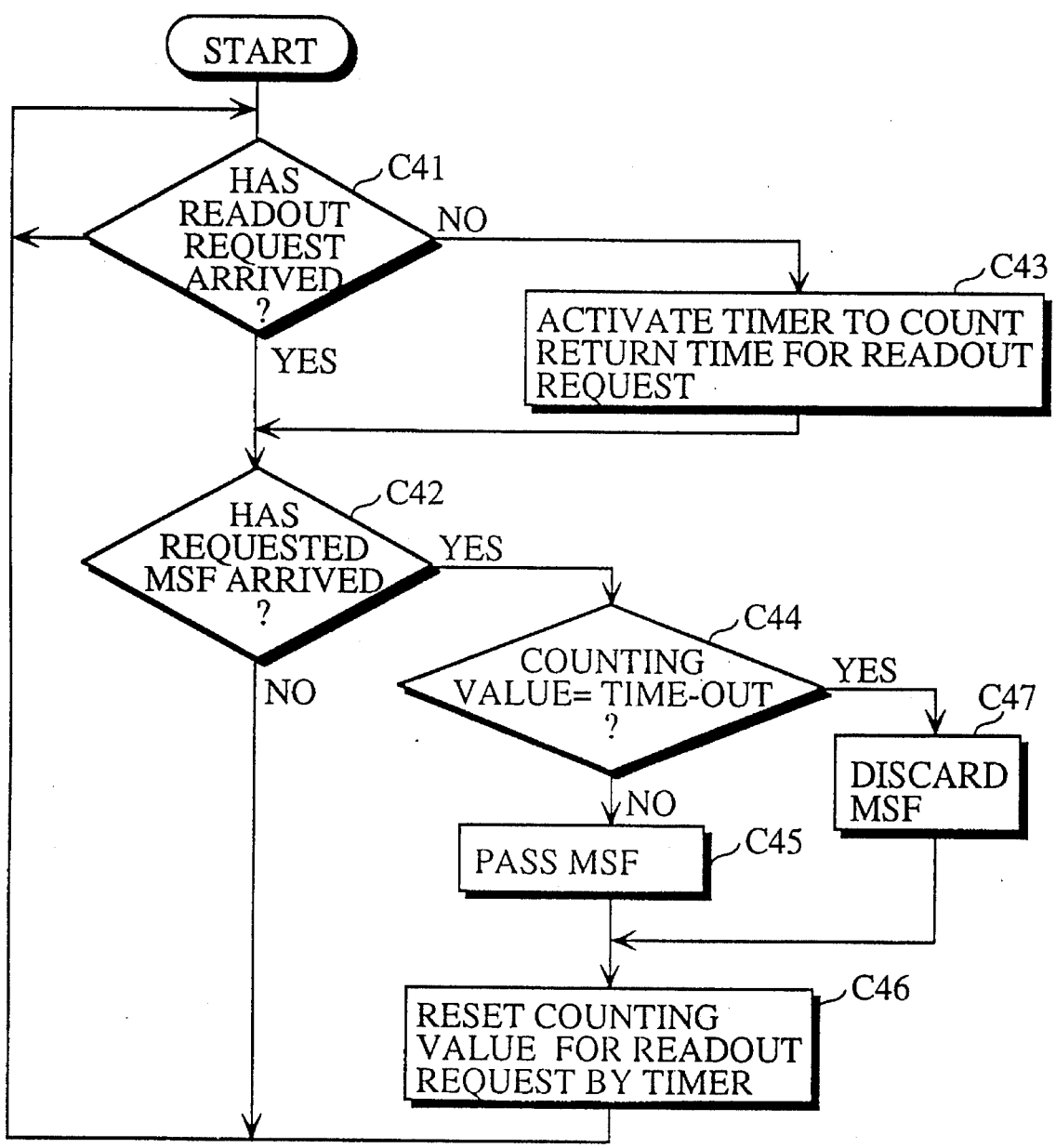
FIG. 28 is a flowchart detailing the operation of a monitor control unit shown in FIG. 27.
Figure 29:
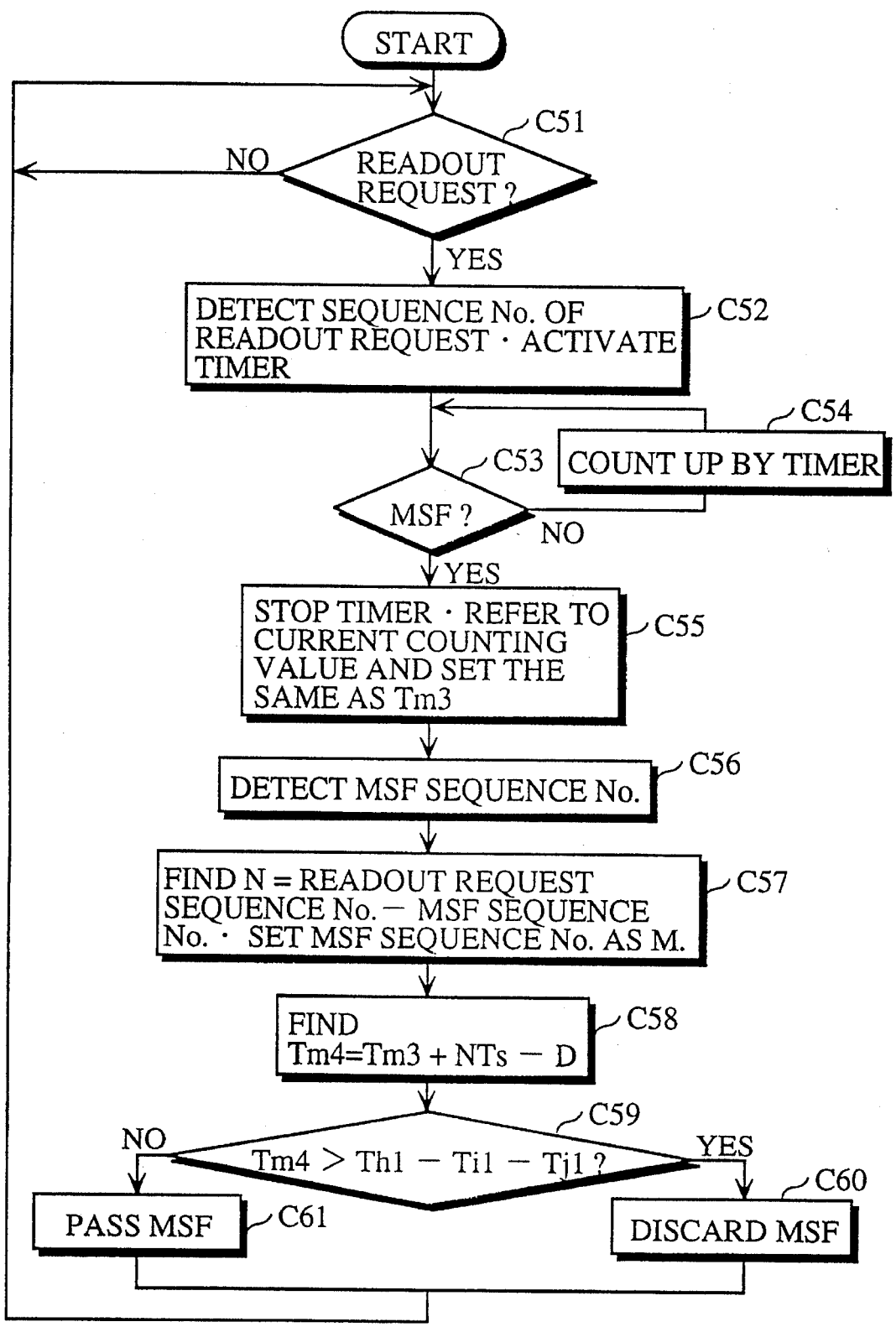
FIG. 29 is a flowchart detailing the operation of a monitor control unit in accordance with a seventh embodiment of the present invention.

Thus, the monitor control unit 760 operates as the flowchart in FIG. 29 instead of the flowchart in FIG. 28.

The monitor control unit 760 monitors the arrival of a readout request from the SCB 3000 at the point P1 (C51). Upon detection of the arrival, the monitor control unit 760 detects the sequence number thereof and activates the timer 751 (C52), and waits for the requested MSF to arrive (C53, C54). Upon receipt of the MSF, the monitor control unit 760 de-activates the timer 751 and obtains the current counting value as Tm3 (C55). Accordingly, the monitor control unit 760 detects the sequence number of the received MSF (C56) to find N by subtracting the MSF sequence number from the readout request sequence number while setting (M) as the MSF sequence number. Further, the monitor control 760 finds Tm4 using Equation 8 (C58), and checks whether Equation 9 is satisfied or not. If Equation 9 is satisfied, the monitor control 760 discards the MSF (C61); otherwise, the monitor control 760 passes the MSF (C60).

By discarding MSFs in estimation, the load to the ATM switch 4000 can be reduced. Also, the MSFs are received at regular intervals even when they are transmitted at different timing.

Eighth Embodiment

In the eighth embodiment, the video server 100 operates depending on a capacity of each queue.

Figure 30:
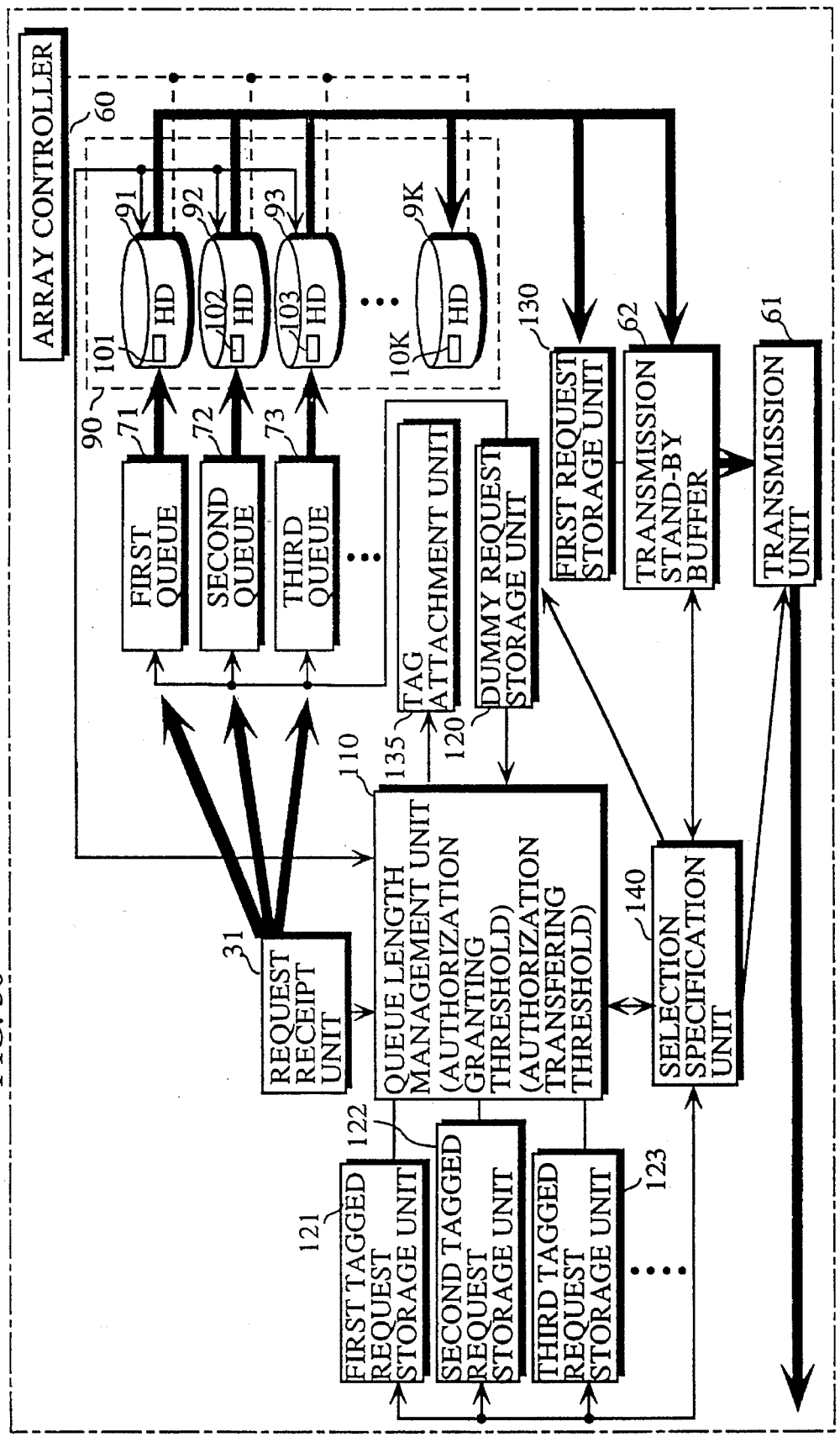
FIG. 30 is a view depicting the structure of an MSFS in accordance with an eighth embodiment of the present invention.

Each MSFS in this embodiment is of the structure shown in FIG. 30, and let the MSFS 1000 be an example. The MSFS 1000 comprises first through K'th queues 71 . . . 7K, a disk array 90 including first through K'th hard disk drives 91 . . . 9K interconnected via a SCSI and readout units 101 . . . 10K, a queue length management unit 110, a dummy request storage unit 120, first through K'th tagged request number storage units 121 . . . 12K, a first-request storage unit 130, a tag attachment unit 135, a selection specification unit 140, an array controller 60, a transmission stand-by buffer 62, and a transmission unit 61. Like components are labeled with like reference numerals with respect to the first embodiment, and the description of these components is not repeated.

The first through K'th queues 71 . . . 7K are of the same structure as the queues 41 . . . 4K in the first embodiment; however, each queue has two predetermined queue lengths (capacities) as an authorization granting threshold and an authorization transferring threshold and stores a dummy request besides the readout requests.

Hereinafter, the readout requests stored in the first queue 71 are referred to as the queue 71's readout requests, and the MSFs readout as per the queue 71's readout requests are referred to as the queue 71's MSFs. Similarly, the readout requests stored in the second and third queues 72•73 are referred to as the queue 72's readout requests and queue 73's readout requests respectively.

Figure 31A:
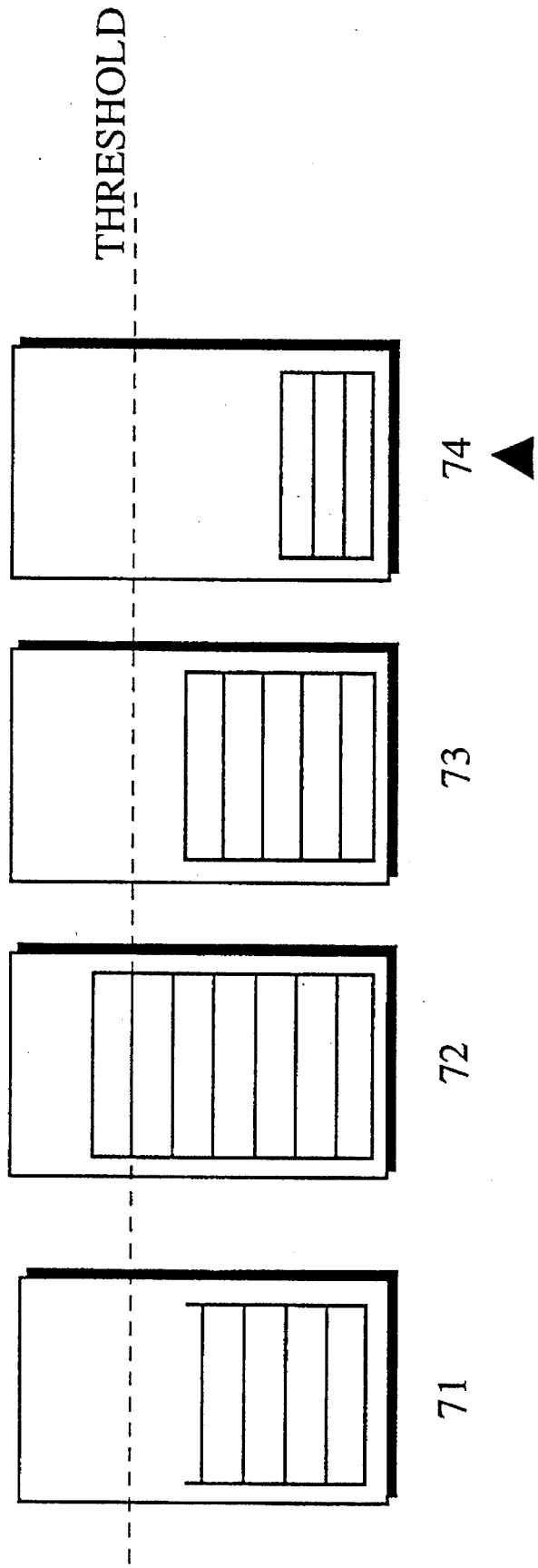
FIGS. 31A and 31B are the views explaining how authorization is granted.
Figure 31B:
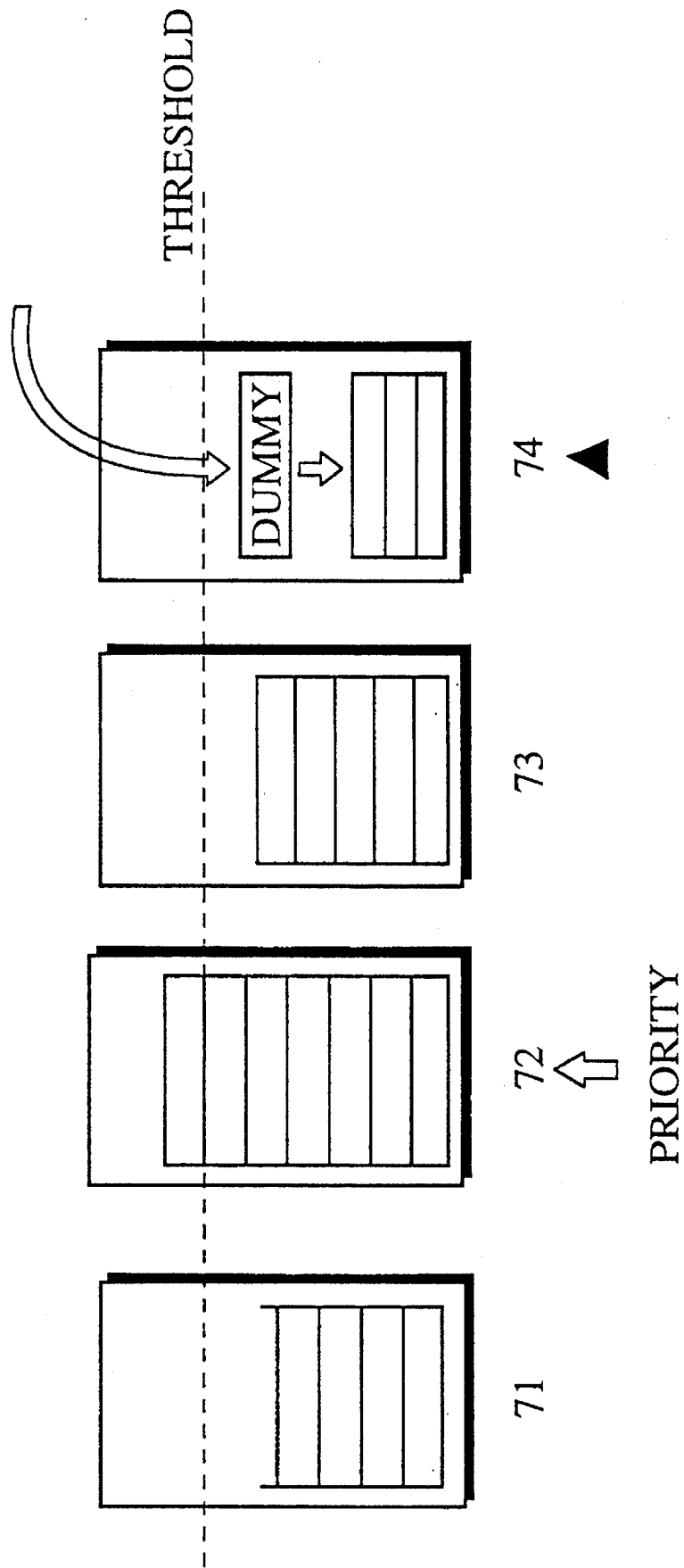

The authorization granting threshold is a threshold used to judge whether authorization should be granted to a particular queue, which will be described more in detail while referring to FIGS. 31A and 31B. As was described in the first embodiment, the accumulated readout requests are retrieved from each queue in a predetermined sequence; however, there is a case where it is desirable to give a priority to a specific queue (herein the second queue 72) when it accumulates a large number of readout requests. For this reason, the authorization granting threshold is set in this embodiment in the queue length, so that the authorization will be given to a queue when its queue length exceeds the threshold. In case of FIG. 31A, although a readout request is to be retrieved from the fourth queue 74, the second queue 72 grants the authorization from the forth queue 74; for the second queue 72 accumulates a considerable number of readout request exceeding the threshold.

The authorization transferring threshold is another threshold used to judge whether the authorization should be transferred to a queue having longer queue length. Note that the authorization transferring threshold is set lower than the authorization granting threshold.

The dummy request is the data of the same size as the readout request; it is not used to read out the MSFs but to adjust the length of a queue that has given the authorization to another queue. In case of FIG. 31B, since the fourth queue 74 gives the authorization to the second queue 72, the dummy request is stored in the fourth queue 74 to adjust the length thereof.

The disk array 90 is under the control of the control command in the readout request as was with the disk array 50 of the first embodiment. However, the structure of the hard disk drives 91 . . . 9k forming the disk array 90 is different, and let the hard disk drive 91 be an example. The hard disk drive 91 comprises a disk whose memory area is divided into a set of sectors each storing 1024-byte data of the MSF, a disk driving system, a readout head for reading out the data form the sectors, a seek system for seeking the head, a readout unit 101 responsible for the data readout within the hard disk drive 91, a command execution unit for reading out the data from the sectors by controlling the disk driving system and seek driving system, and a cache for temporarily storing the data readout from the sectors.

Figure 32:
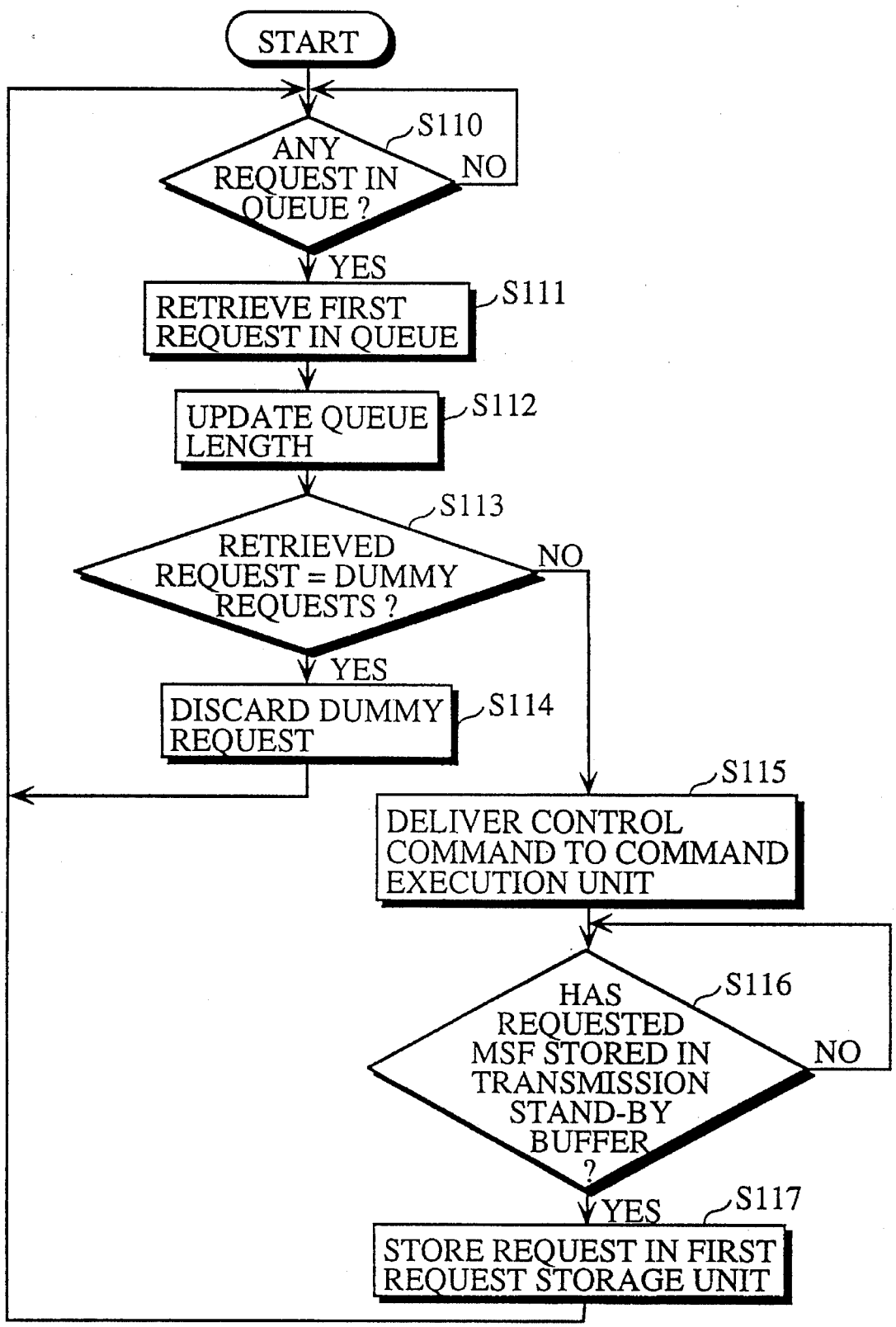
FIG. 32 is a flowchart detailing the operation of a readout unit shown in FIG. 30.
Figure 33:
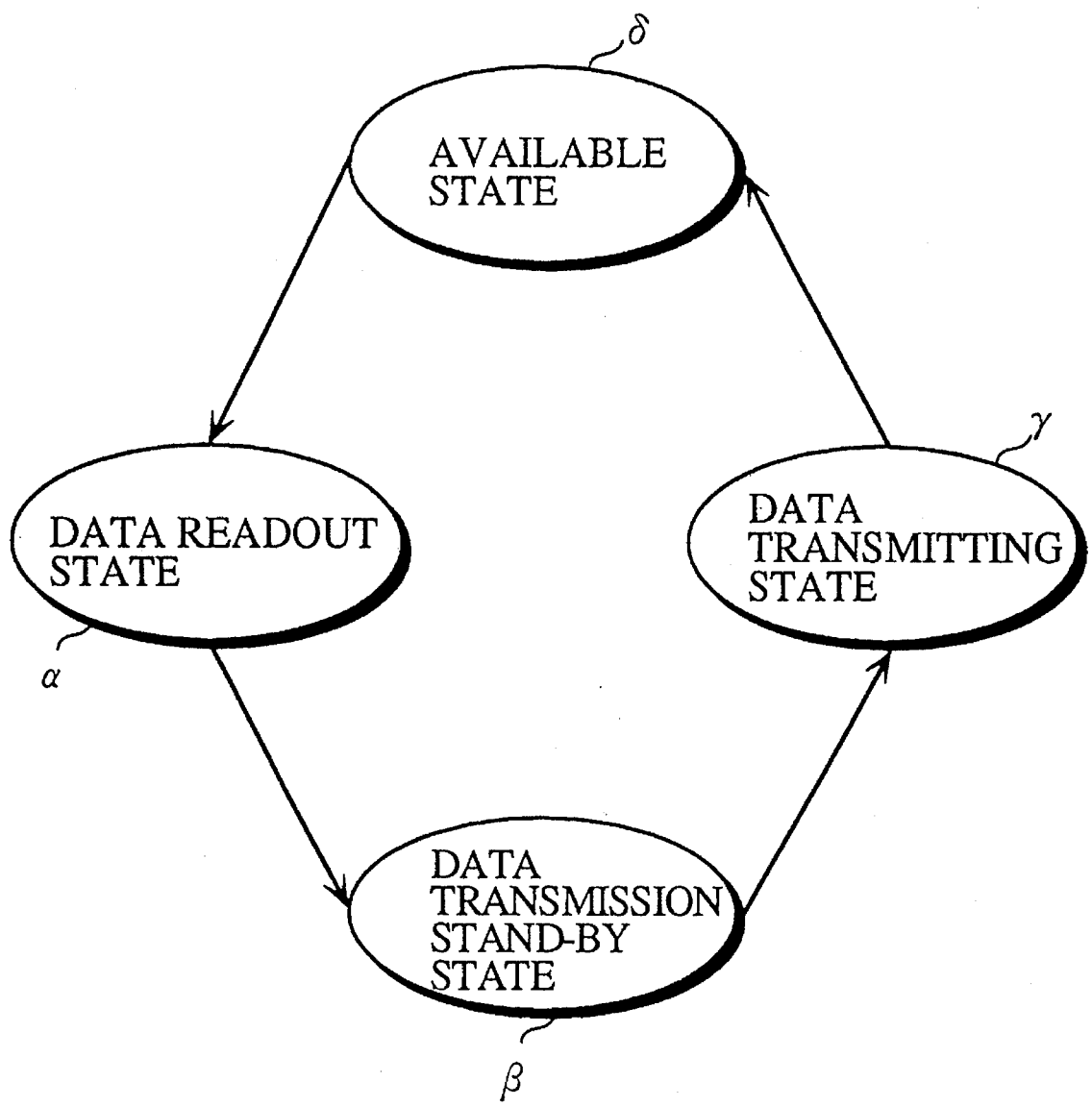
FIG. 33 is a state diagram of a hard disk drive.

The operation of the hard disk drive 91 and readout unit 101 will be explained with referring to the flowchart in FIG. 32 detailing the operation of the readout unit 101 and FIG. 33 showing the state diagram of the hard disk drive 91.

The readout unit 101 regularly checks whether the first queue 71 has accumulated a readout request or not (S110). When the queue 71 has accumulated the readout request, the readout unit 101 retrieves the first-accumulated readout request from the first queue 71 (S111), and the queue length management unit 110 decrements the queue length by one to update the length thereof (S112); this will be described more in detail below. Subsequently, the readout unit 101 judges whether the retrieved readout request is dummy or not (S113). In case of a dummy request, the readout unit 101 discards the same (S114) to return to S110, otherwise, the queue length management unit 110 gives a readout direction to the readout unit 101, which delivers the control command contained in the retrieved readout request to the command execution unit (S115), and waits for the requested MSF to be stored in the transmission stand-by buffer 62 (S116).

The MSFs read out from the disk per sector are stored in the cache each time the command execution unit executes the control command (this corresponds to "data readout state α" in FIG. 33). Once the cache receives the requested MSF ("data transmission stand-by state β"), the requested MSF is transmitted to the transmission stand-by buffer 62 ("data transmitting state γ"). When the transmission completes ("available state σ"), the readout unit 101 delivers the retrieved readout request to the first-request storage unit 130 (S117), and waits for the following readout request (S110).

Figure 34:
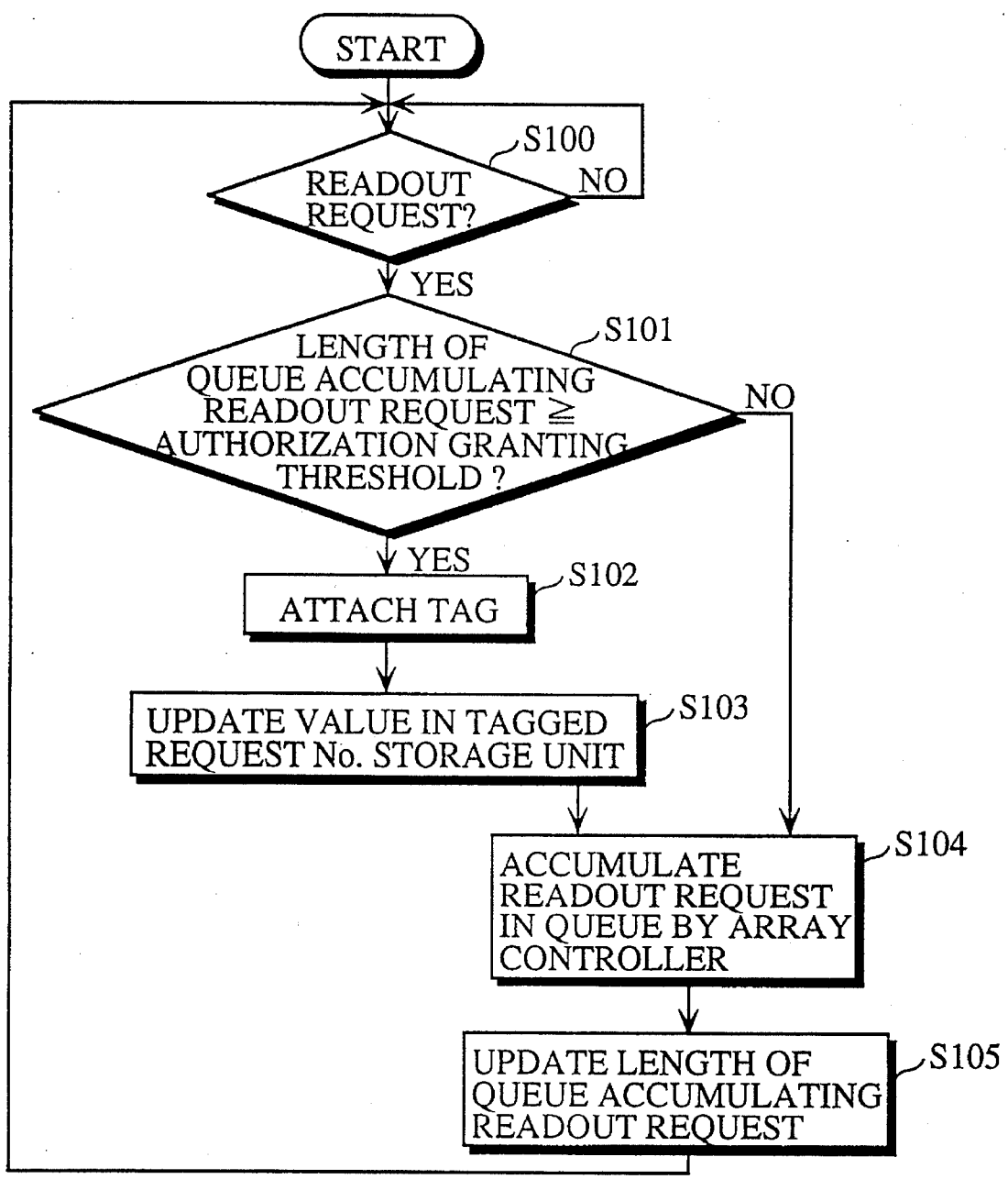
FIG. 34 is a flowchart detailing the operation of a queue length management unit shown in FIG. 30.

The queue management unit 110 manages the queue length, which will be explained while referring to the flowchart in FIG. 34 using the first queue 71 and hard disk drive 91 as an example.

The queue length management unit 110 monitors the receipt of a readout request for the MSF stored in the hard disk drive 91 (S100). When the receipt is detected, the queue length management 110 refers to the queue length of the first queue 71, where the readout request is to be accumulated, to judge whether the queue length exceeds the authorization granting threshold (S101).

When the queue length has not reached the authorization granting threshold, the queue length management unit 110 has the array controller 60 accumulate the readout request in the first queue 71 (S104); otherwise it directs the tag attachment unit 135 to attach the tag to the readout request (S102). Subsequently, the queue length management unit 110 updates the value in the first tagged-request number storage unit 121 by incrementing the value by one (S103), and has the array controller 60 accumulate the readout request in the first queue 71 (S104). Then, the queue length management unit 110 updates the length of the first queue 71 by incrementing the queue length by one (S105), and waits for the following readout request (S100).

The tag attachment unit 135 attaches the tag to the readout request by establishing an identification area in the readout request to set a distinguishable value therein.

The dummy request storage unit 120 stores the dummy request into the first through K'th queues 71 . . . 7K under the control the selection specification unit 140.

Each of the first through 12K'th tagged-request number storage units 121 . . . 12K holds the number of tagged readout requests.

The first-request storage unit 130 is a memory whose memory area is divided into K sections, K matches with the number of the hard disk drives and queues within one MSFS, and each section includes an identification area. The readout requests processed by the readout units 101, 102, . . . , 10K are written into the K sections respectively, and the state of each hard disk drive is written into the identification area by the corresponding readouts units 101, 102, . . . , 10K.

The selection specification unit 140 refers to the readout request stored in the first-request storage unit 130, and determines which MSF should be transmitted out of the MSFs stored in the transmission stand-by buffer 62 based on the queue length managed by the queue length management unit 110 and the values held in the first through 12K'th tagged-request number storage unit 121 . . . 12K, and directs the transmission unit 61 to transmit the determined MSF. The operation of the selection specification unit 140 will be explained while referring to the flowchart in FIG. 35. In the drawing, k and j (k is not equal to j) are the variables that specify the queues and tagged-request number storage units within one MSFS.

The selection specification unit 140 retrieves a readout request identified by a predetermined sequence number from the first-request storage unit 130, and specifies the queue (k'th queue) that had stored the readout request (S120). Further, the selection specification unit 140 checks whether the k'th queue stores any tagged readout request using the value in the k'th tagged-request number storage unit 12k (S200). When the k'th queue stores the tagged readout request, the selection specification unit 140 has the transmission stand-by buffer 62 transmit the MSF corresponding to the k'th queue to the transmission unit 61 (S201). Accordingly, the transmission unit 61 judges whether the readout request is attached with a tag or not (S202). In case of a tagged readout request, the selection specification unit 140 decrements the value in the k'th tagged-request number storage unit 12k by one; for the number of the readout requests requiring a transmission process time has decreased (S203). Then, the selection specification unit 140 waits until the transmission unit 61 completes the transmission (S204), and retrieves the following readout request (S120).

As a result, the MSF read out as per the readout request arriving at the request receipt unit 31 first is transmitted to the request sender SCB (herein 3000) from the hard disk drive 91. But transmitting the MSF corresponding to the k'th queue first, the delay time caused in reading out the requested MSF can be compensated.

When the value in the k'th tagged-request number storage unit 12k exhibits "0", or the k'th queue stores no tagged request in S200, the selection specification unit 140 checks whether the k'th queue's length exceeds the authorization transferring threshold or not (S205). When the queue length exceeds the authorization transferring threshold, the selection specification unit 140 judges that the k'th queue still stores a number of requests, and accordingly has the transmission stand-by buffer 62 transmit the MSF corresponding to the k'th queue to the transmission unit 61 (S201). Then, the selection specification unit 140 judges whether the readout request that has readout the MSF corresponding to the k'th queue is attached with the tag or not (S202). In case of a tagged readout request, the selection specification unit 140 decrements the value in the k'th tagged-request number storage unit 12k by one (S203); for the number of the readout requests has decreased. Otherwise, the selection specification unit 140 leaves the value in the k'th tagged-request number storage unit 12k intact. When the queue length has not reached the authorization transferring threshold in S205, the selection specification unit 140 checks whether the first-request storage unit 130 stores the request of the other queues (S206). When the first-request storage unit 130 stores the request of the other queues, the selection specification unit 140 refers to such request (the j'th queue's request) (S213), and checks whether the value in the j'th tagged-request number storage unit 12j exhibits "0" (S207). When the value does not exhibits "0", the selection specification unit 140 has the transmission stand-by buffer 62 transmit the MSF corresponding to the j'th queue to the transmission unit 61 (S209).

In this way, the MSF corresponding to the j'th queue is transmitted before the MSF corresponding to the k'th queue, and thus the selection specification unit 140 has the k'th queue accumulate the dummy request to prolong the length thereof (S210). Then, the selection specification unit 140 judges whether the readout request that has read out the MSF corresponding to the j'th queue is attached with the tag or not (S211). In case of a tagged readout request, the selection specification unit 140 decrements the value in the j'th tagged-request number storage unit 12j by one (S212); for the number of the readout requests has decreased. Otherwise, the selection specification unit 140 leaves the value in the j'th tagged-request number storage unit 12j intact.

Subsequently, the selection specification unit 140 waits for the transmission unit 61 to complete the transmission (S204), and retrieves the following readout request from the first-request storage unit 130, and repeats the above-described operation (S120).

By giving a higher priority to a queue storing a larger number of readout requests, the delay times between the receipt of the readout requests and the transmission of the requested MSFs vary in a small range. In addition, since the hard disk drives with a low transmission rate can be used, the manufacturing cost can be saved.

The dummy request storage unit 120 stores one dummy request under the direction of the selection specification unit 140, and the queue length is incremented by one in this embodiment; however, the dummy request storage unit 120 may store more than one dummy request and the queue length may be incremented by one fifth or five for one dummy request.

Ninth Embodiment

In the ninth embodiment, in addition the operation of the eighth embodiment, the time required to transmit the requested MSF is compared based on the queue length to determine from which queue the request should be transmitted.

Figure 36:
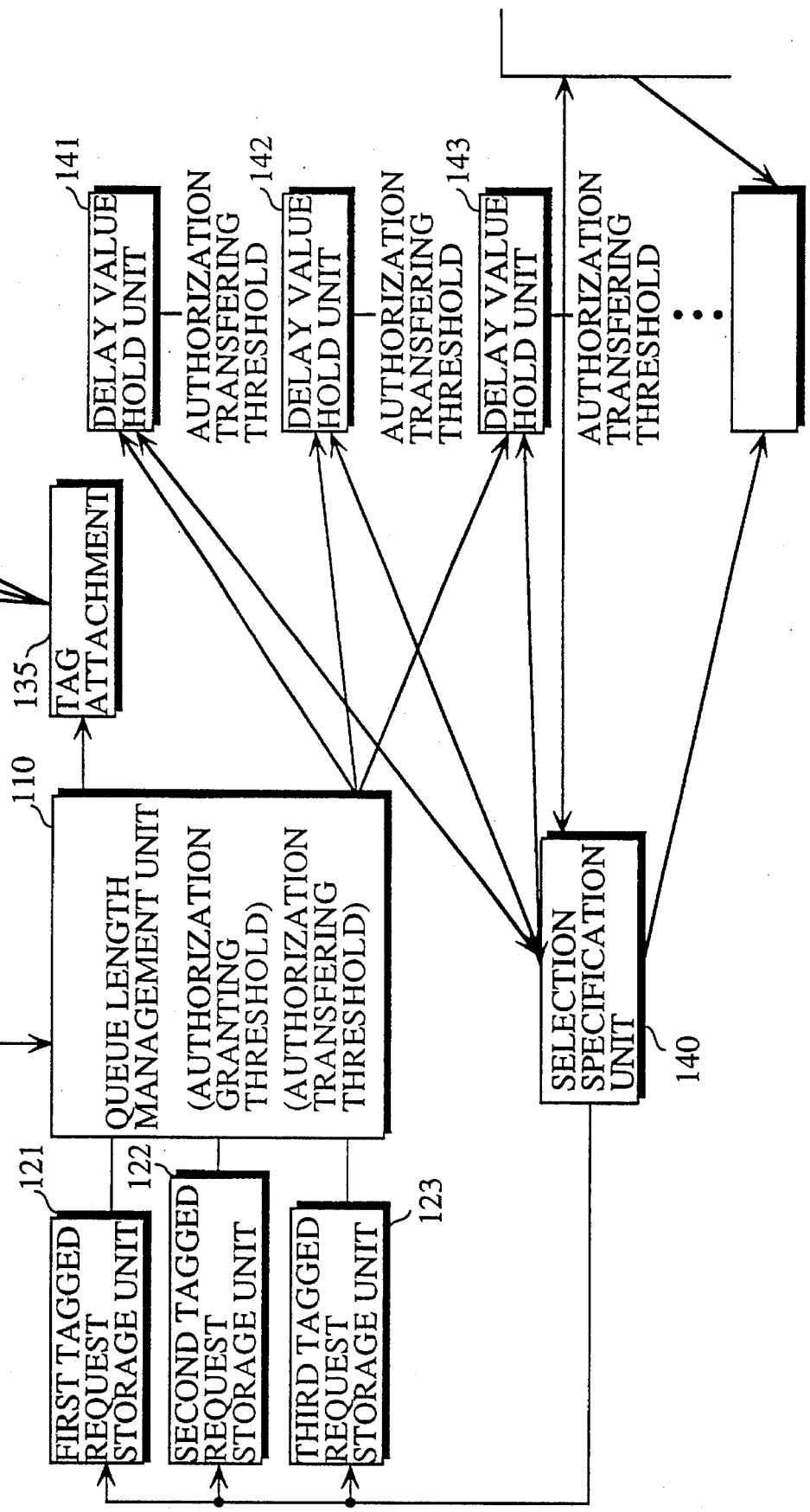
FIG. 36 is a view showing a major part of an MSFS in accordance with a ninth embodiment of the present invention.

Accordingly, each MSFS in the ninth embodiment additionally includes a plurality of delay value hold units 141 . . . 14K and excludes the dummy request storage unit 120 as shown in FIG. 36.

The delay value hold unit 141 . . . 14K correspond to the queues 71 . . . 7K respectively, and each hold the delay value of their respective queues and an authorization transferring threshold. The delay value referred herein is the sum of the process time required at each readout unit and the transmission time required at the transmission unit 61 multiplied by the number of the requests stored in the corresponding queue. The delay value is periodically computed and if the request is larger than the value held in the corresponding delay value hold unit, the latter is updated with the former.

Figure 38:
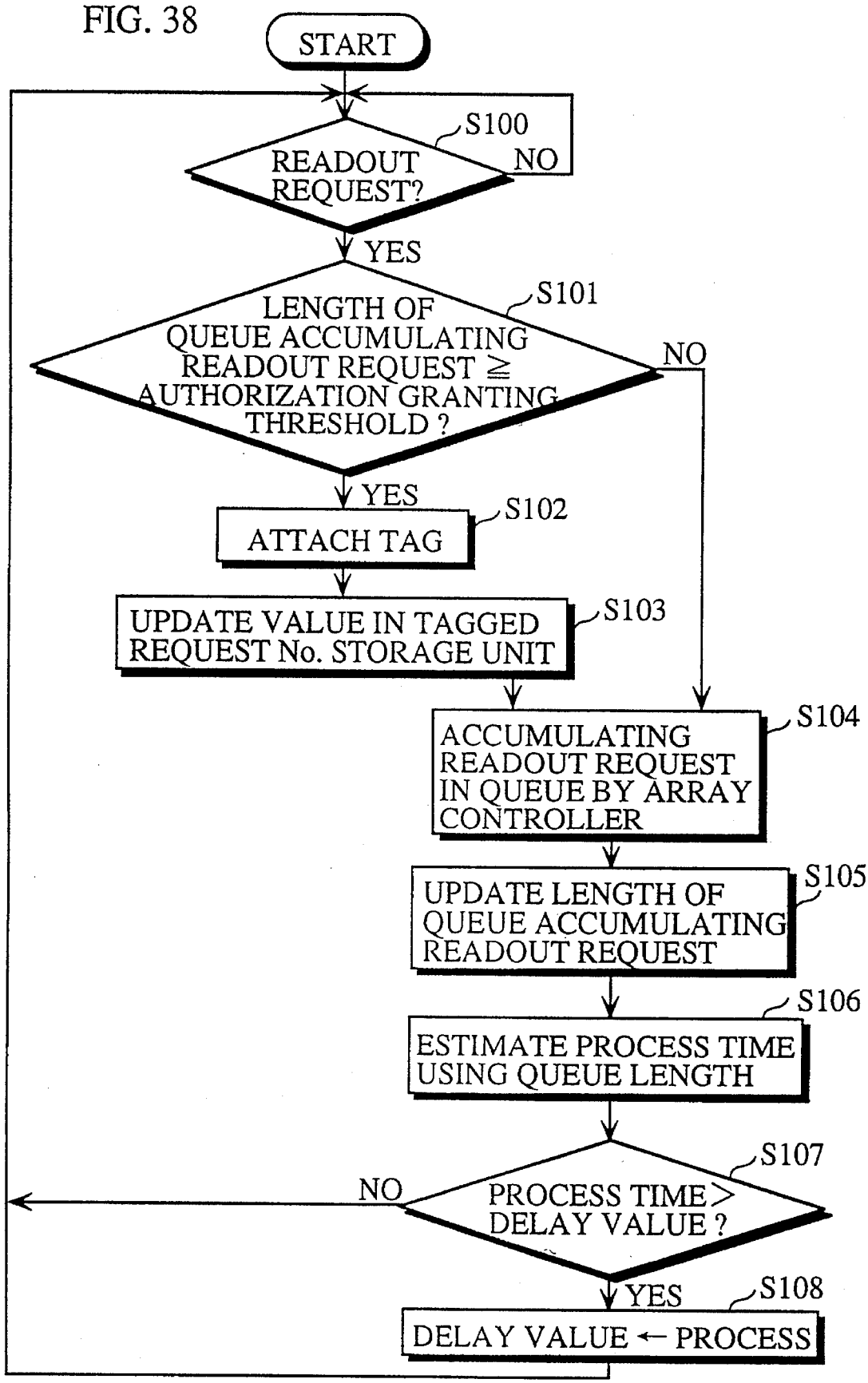
FIG. 38 is a flowchart detailing the operation of a queue length management unit in accordance with the ninth embodiment.

The operation of the queue length management unit 110 in this embodiment will be explained while referring to the flowchart in FIG. 38. Since the flowchart in FIG. 38 is partly identical with the flowchart in FIG. 34, only the different steps will be explained.

After S105, the queue length management unit 110 estimates the process time using the first queue 71's length (S106), and judges whether the estimated process time exceeds the value held in the corresponding delay value hold unit 141 (S107). When the former exceeds the latter, the queue length management unit 110 updates the latter with the former (S108). In this way, the delay value is updated each time the queue accumulates a readout request.

Figure 37:
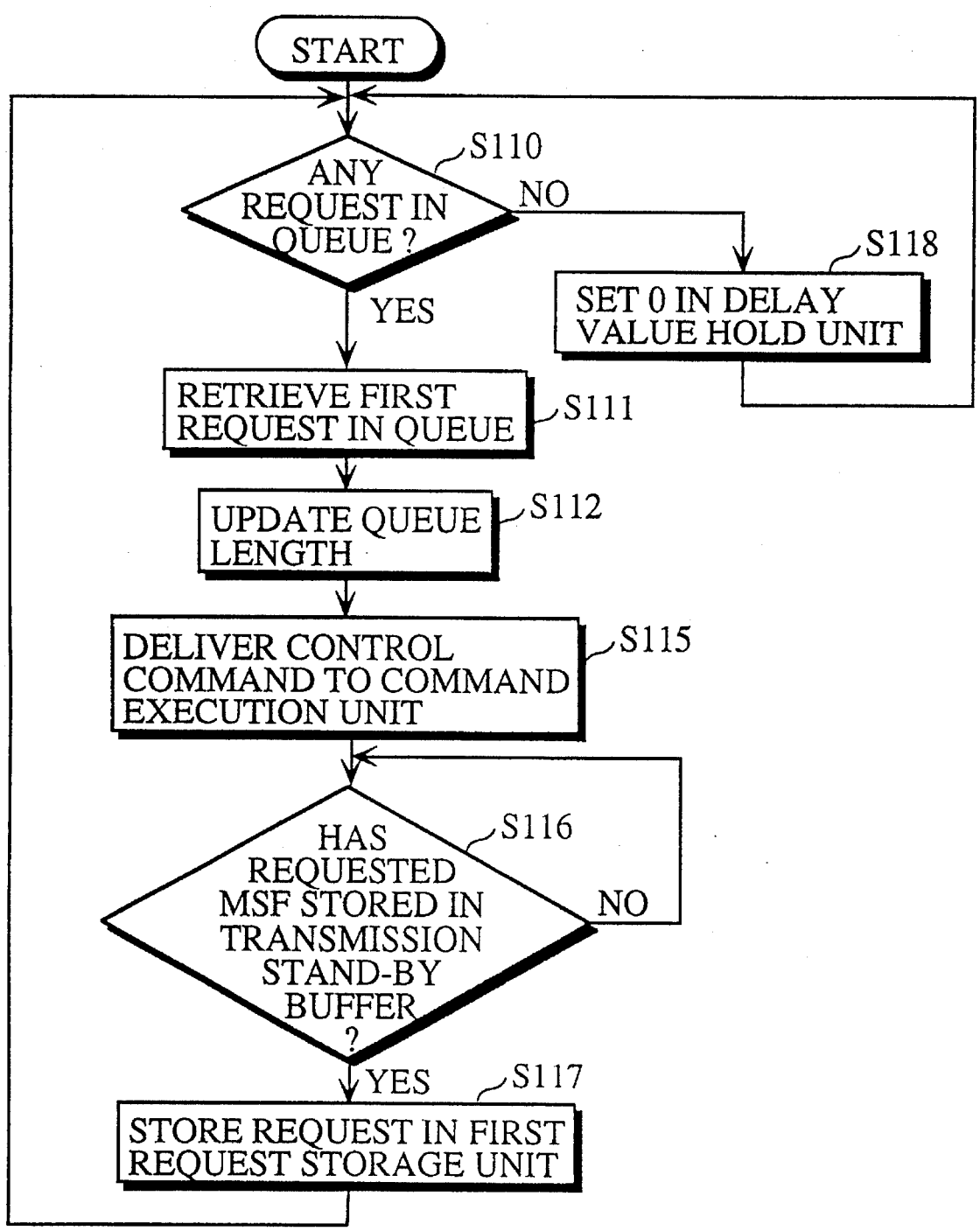
FIG. 37 is a flowchart detailing the operation of a readout unit in accordance with the ninth embodiment.

Because the dummy request storage unit 120 is excluded in this embodiment, each readout unit operates by following the flowchart in FIG. 37 instead of FIG. 32. Since two flowcharts are partly identical, only the different steps will be explained.

After S112, the readout unit 101 proceeds to S115 and onwards. When the first queue 71 does not accumulate any readout request in S110, the corresponding readout unit 101 resets the value in the delay value hold unit 141 to "0" (S118), and returns to S110.

Figure 35:
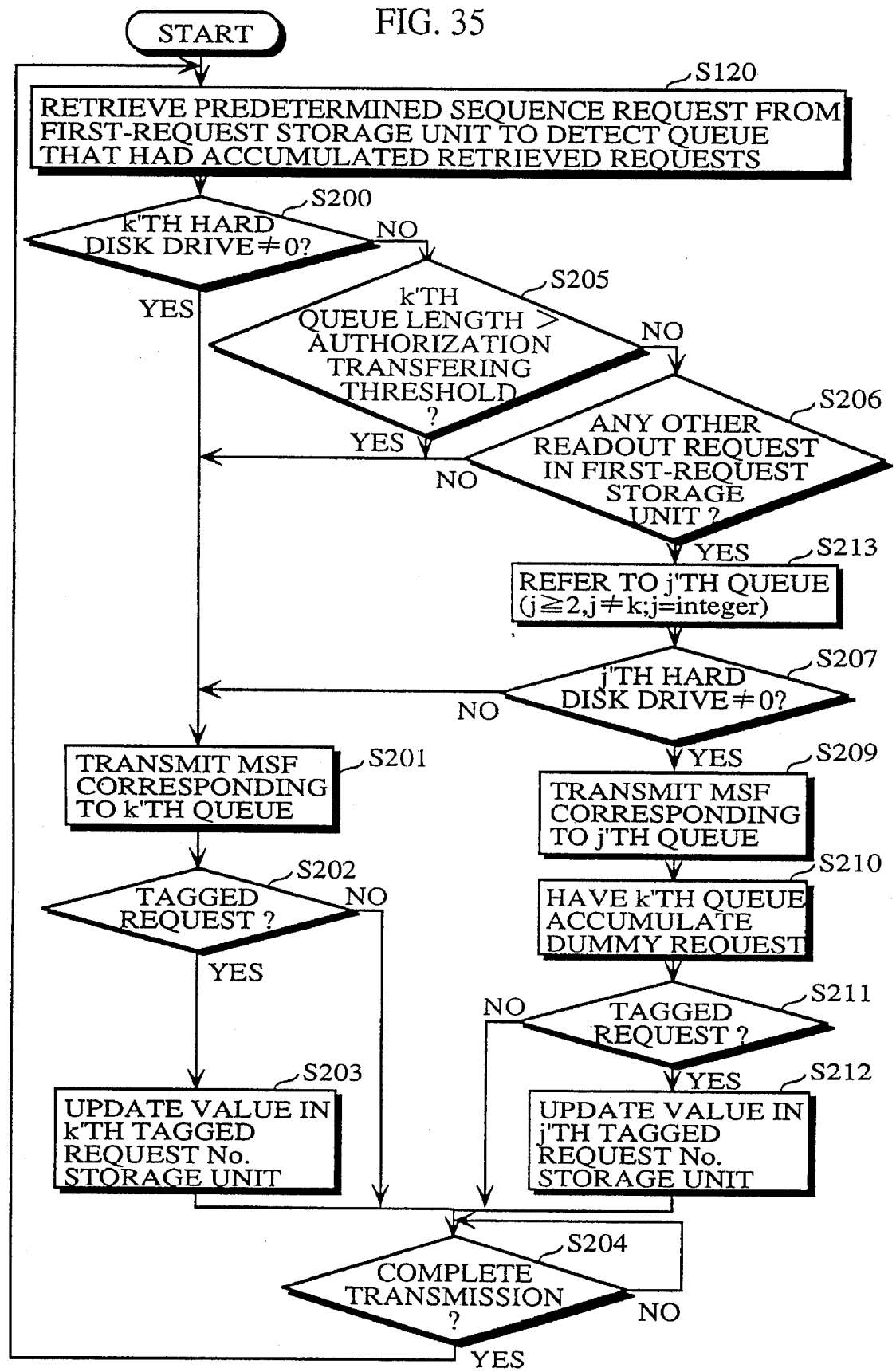
FIG. 35 is a flowchart detailing the operation of a selection specification unit shown in FIG. 30.
Figure 39:
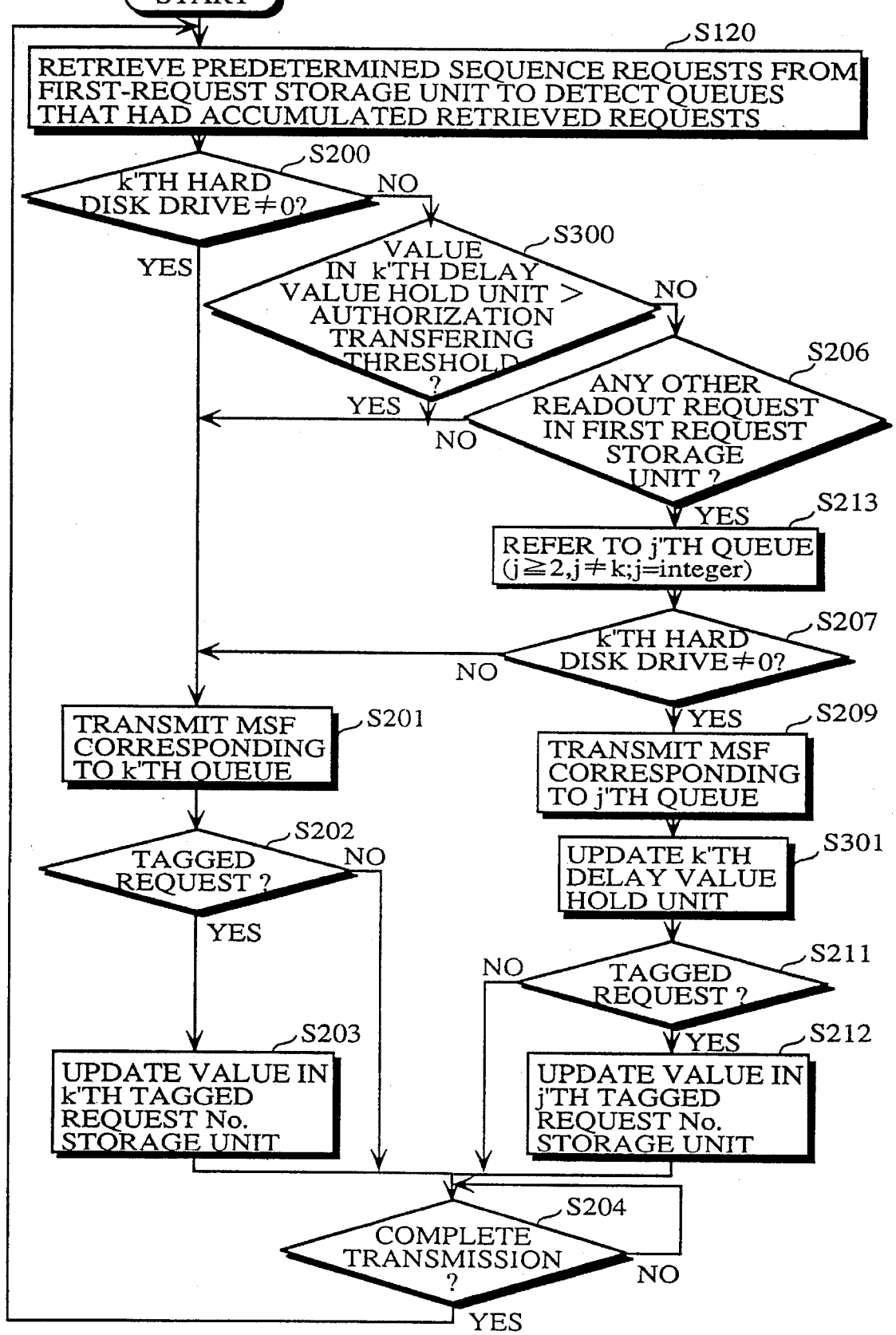
FIG. 39 is a flowchart detailing the operation of a selection specification unit in accordance with the ninth embodiment.

Also, the selection specification unit 140 operates by following the flowchart in FIG. 39 instead of the flowchart in FIG. 35. Since two flowcharts are partly identical, only the different steps will be explained.

When the number of tags in the k'th queue exhibits "0" in S200, the selection specification unit 140 checks whether the delay value exceeds the authorization transferring threshold or not (S300). When the former exceeds the latter, the selection specification unit 140 proceeds to S201 and transmits the MSFs corresponding to the k'th queue 7k until the former falls below the latter; otherwise it proceeds to S206.

When the selection specification unit 140 directs the transmission unit 61 to transmit the MSF corresponding to the j'th queue in S209, the selection specification unit 140 updates the value in the delay value hold unit 14k (S301), and proceeds to S211. The amount of update equals to the waiting time caused by giving the k'th queue a lower priority, making the delay value in the delay value hold unit 14k larger. Thus, it becomes easy for the delay value to exceed the authorization transferring threshold.

As a result, the delay times between the receipt of the readout requests and the transmission of the requested MSFs vary in a small range. In addition, since the hard disk drives with a low transmission rate can be used, the manufacturing cost can be saved.

The waiting time until the MSFs are transmitted by the transmission unit 61, or namely a waiting time between the completion of the MSF readout and the transmission of the same, may be added to the delay value.

The selection specification unit 140 selects the request in the first-request storage unit 130 in the order of arrival at the request receipt unit 31 in the eighth and ninth embodiments. However, a counter may be additionally included, so that the readout units 101, 102, 103 . . . may be referred to either cyclic or at random each time the counter counts one. Also, the readout units may be referred to in the order of the time from the last reference, or the corresponding queue's length.

The tags are attached by varying the value in the additionally established identification areas in the eight and ninth embodiments. However, when there is an available area in the readout request, the tags may be attached using such available area.

Tenth Embodiment

In the tenth embodiment, a plurality of terminals are connected to one SCB. Thus, each terminal sends a request signal (hereinafter referred to as second data request) As shown in FIG. 40, the second data request comprises identification data (USR) identifying individual terminal, program data (INF) for a desired program, the value (VAB) of a mean data receipt rate of the terminals. USR is attached to the readout requests and MSFs to identify the request-sender terminal.

Figure 41:
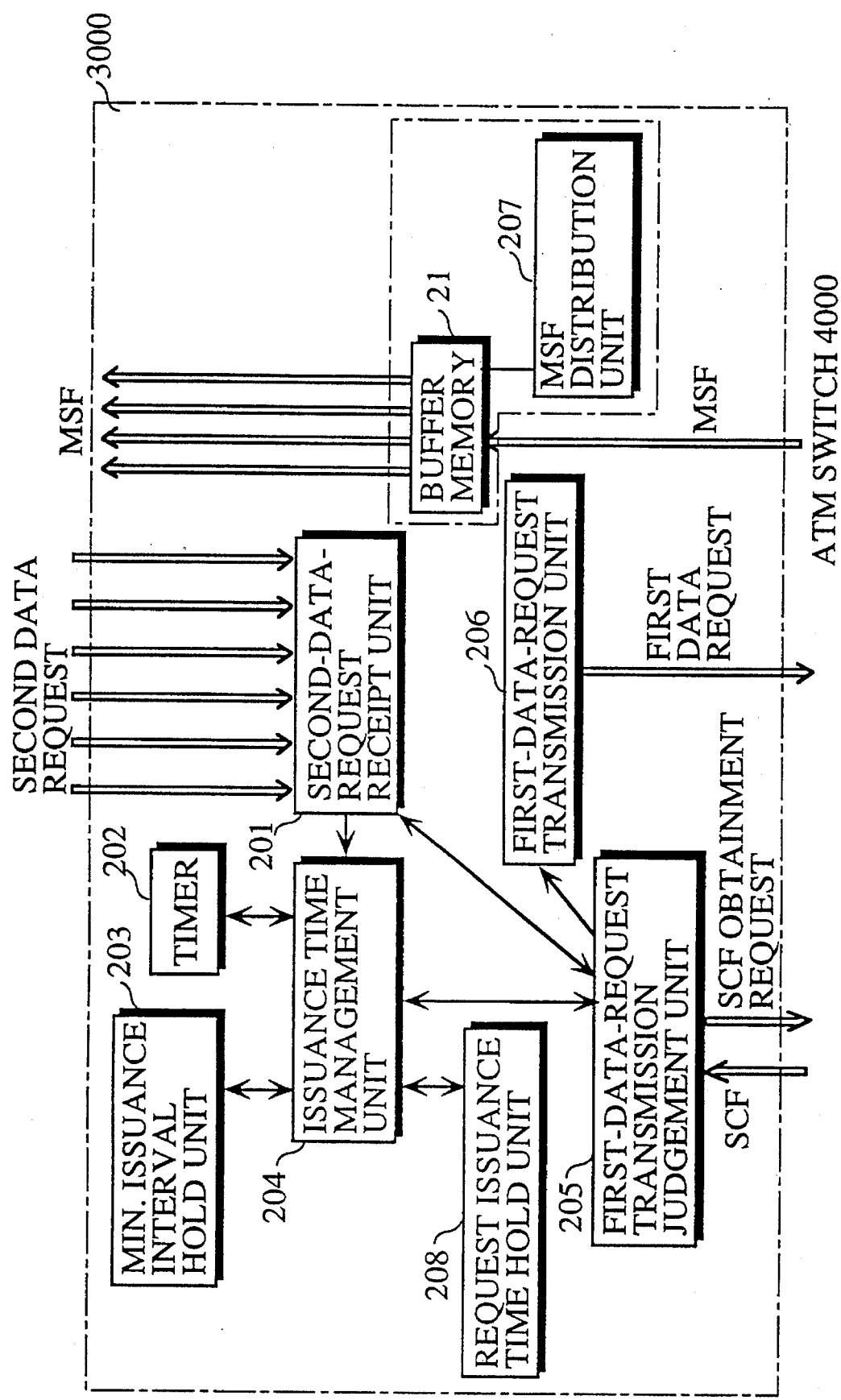
FIG. 41 is a view depicting the structure of an SCB in accordance with the tenth embodiment.
Figure 42:
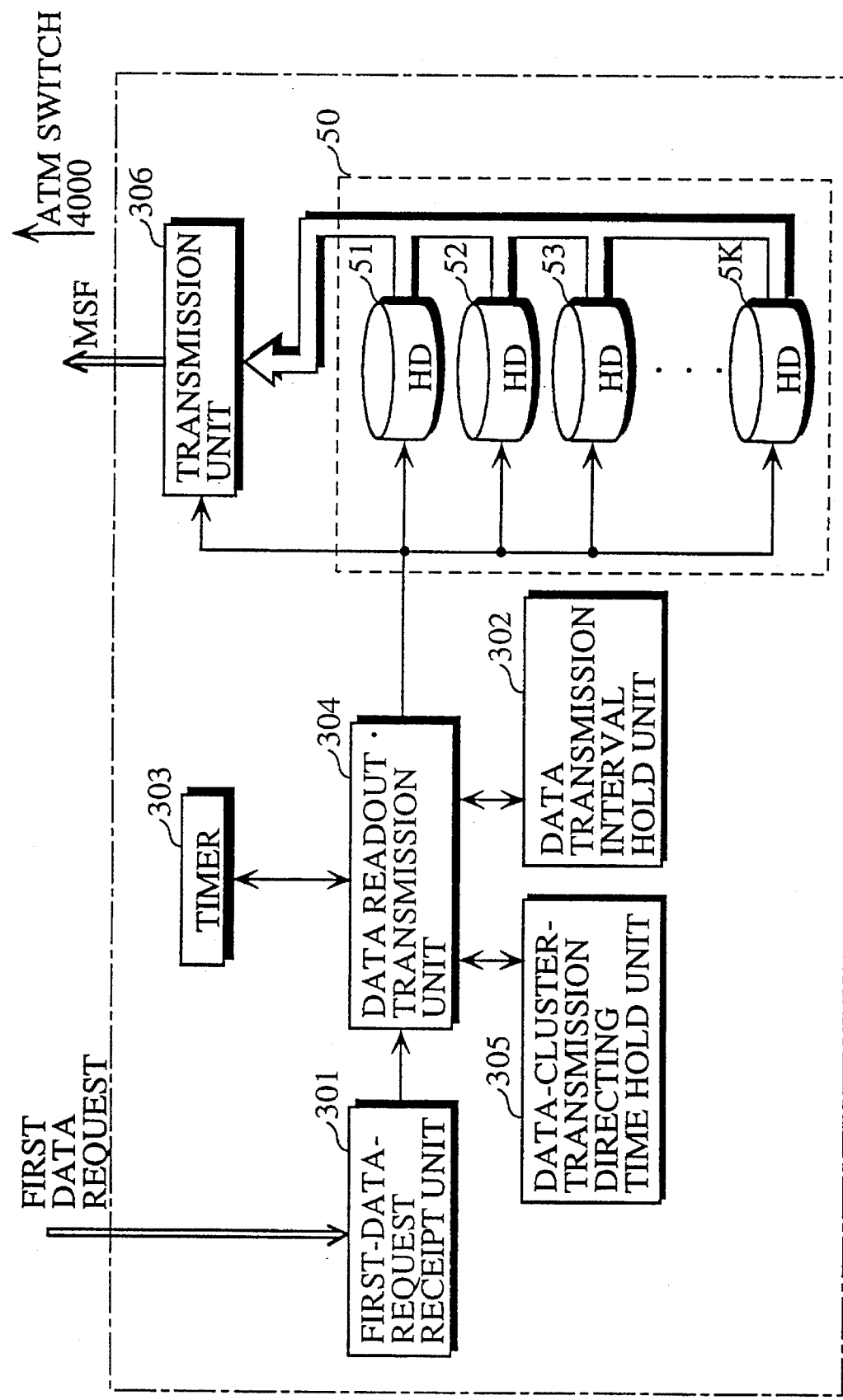
FIG. 42 is a view depicting the structure of an MSFS in accordance with the tenth embodiment.

FIGS. 41 and 42 are the views depicting the structures of the SCBs and MSFSs in this embodiment respectively, and let the SCB 3000 and MSF 1000 be examples.

The SCB 3000 comprises a second-data-request receipt unit 201, a timer 202, a minimum-issuance-interval hold unit 203, an issuance time management unit 204, a first-data-request transmission judgment unit 205, a first-data-request transmission unit 206, an MSF distribution unit 207, and a request issuance time hold unit 208.

The second-data-request receipt unit 201 receives the second data requests and notifies the receipt of the same, which will be explained while referring to the flowchart in FIG. 43.

The second-data-request receipt unit 201 regularly checks whether any second data request has arrived from the terminals (R11) to notify the values of USR and VAB to the issuance time management unit 204 upon the receipt thereof (R12), while notifying the values of INF and USR to the first-data-request transmission judgment unit 205 (R13), and waits for the following second data request (R11).

The timer 202 exhibits a current time.

The minimum issuance interval hold unit 203 computes and stores the minimum issuance interval of the first data requests sent from the SCB 3000. The minimum issuance interval is computed by multiplying VAB in the second data request by the number of the terminals connected to the SCB 3000 and dividing the result by the size of the data issued accompanying with the issuance of the first data request.

Figures 43, 44:
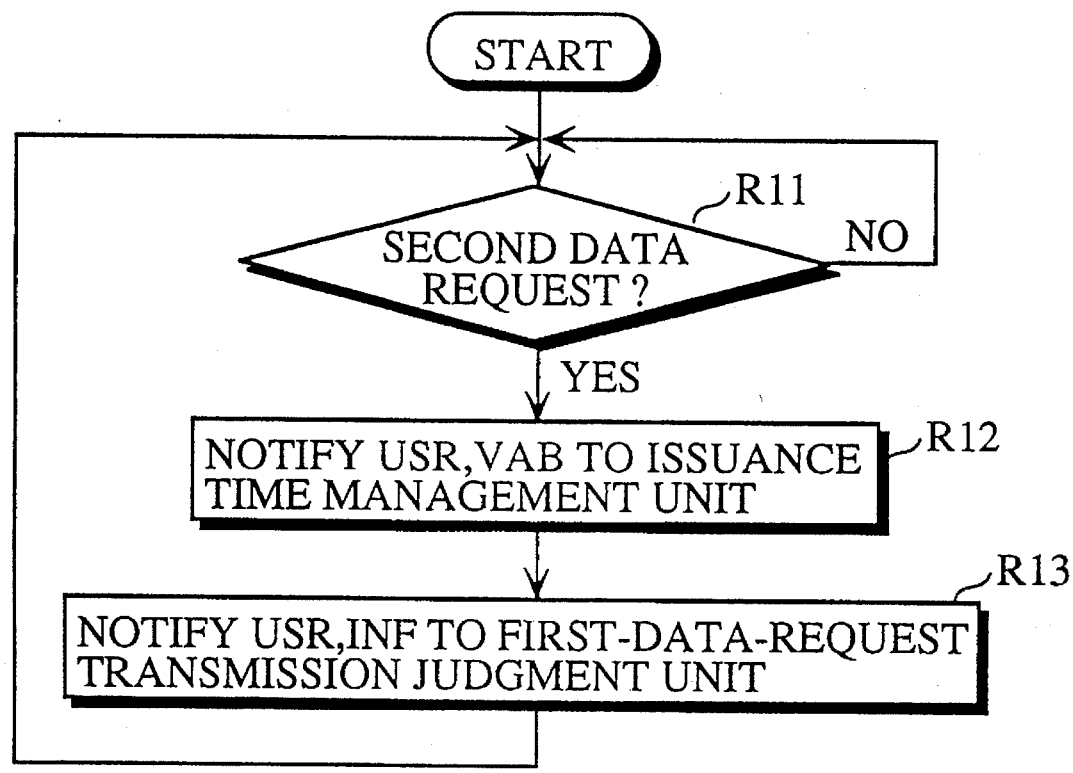
FIG. 43 is a flowchart detailing the operation of a second-data-request receipt unit shown in FIG. 41.
FIG. 44 is the data format of a first data request.

FIG. 44 is the format of the first data request. The first data request corresponds to the readout request in the first embodiment. For this reason, in the first data request, USR is attached to each MSFP which is referred to as ADD hereinafter.

The issuance time management unit 204 computes the issuance interval between the first data requests, and makes out a schedule for the issuance of the first data requests to all the connected terminals. The issuance time management unit 204 includes a buffer (not shown) to store one scheduled time coming next (next issuance time) from the current time.

The explanation of how the issuance time management unit 204 makes out the schedule will be explained while referring to FIGS. 45A, 45B, and 45C. In this example, let the issuance interval be 40, and minimum issuance interval be 5.

In FIG. 45A, "1", "41", "81", "121" and "161" in the scheduled time column are the scheduled times when the first data requests are issued from the terminal usr1. Although the column ends at "161", the issuance time management unit 204 adds "201", "241", "281", . . . as the time elapses.

When the terminal usr4 issues a second data request at "1", the issuance time management unit 204 makes out a schedule for the terminal usr4 at the minimum issuance intervals "5", that is to say "6", "46", "86", "126" as shown in FIG. 45B.

Similarly, when the terminals usr2, usr3, and usr5 issue the second data requests at "1", the issuance time management unit 204 makes out the schedules at the minimum issuance intervals "5" for each, that is to say, "1", "6", "11", "16", "21", . . . for the terminals usr1, urs4, usr2, usr3, usr5 respectively as shown in FIG. 45C.

Figure 46:
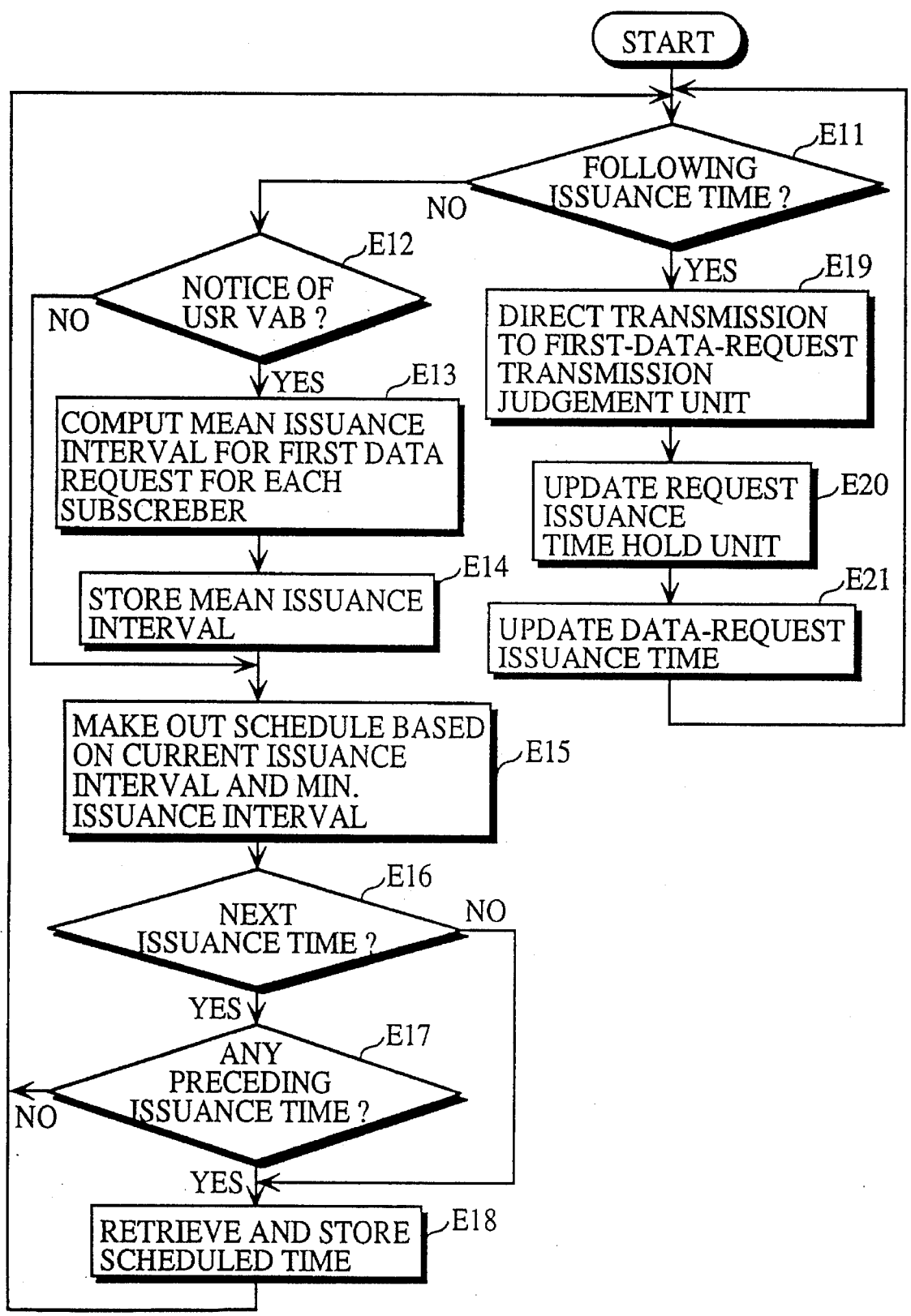
FIG. 46 is a flowchart detailing the operation of the issuance time management unit.

The operation of the issuance time management unit 204 will be explained while referring to the flowchart in FIG. 46.

The issuance time management unit 204 waits for the next issuance time with referring to the timer 202 (E11), during which it checks the receipt of the second data request (E12). Upon the detection of the receipt in E12, the issuance time management unit 204 computes the mean issuance interval between the first data requests for each user (E13), and store the same (E14). Accordingly, the issuance time management unit 204 makes out a schedule for the first data requests based on the mean interval and minimum issuance interval (E15). Note that when the balance between the mean issuance interval and actual issuance interval is larger than a predetermined value, the issuance interval is shortened.

When there is no second data request in E12, the schedule is updated by adding the following scheduled times as the time elapses (E15).

Having made out the schedule, the issuance time management unit 204 checks whether there is any scheduled time before the next issuance time in the buffer to retrieve and store the same in the buffer (E16, E17, and E18). When there is no next issuance time in the buffer, the issuance time management unit 204 stores the scheduled time in the buffer, and waits for another next issuance time (E11).

On the other hand, when the issuance time management unit 204 judges that it is the next issuance time in E11, it directs the first-data-request transmission judgement unit 205 to issue the first data request (E19), and has the issuance time hold unit 208 hold the issuance time (E20). Subsequently, the issuance time management unit 204 stores the following scheduled time in the buffer (E21), and waits for another next issuance time (E11).

The first-data-request transmission judgment unit 205 directs the first-data-request transmission unit 206 to transmit the first data request as per the direction by the issuance time management unit 204.

Figure 47:
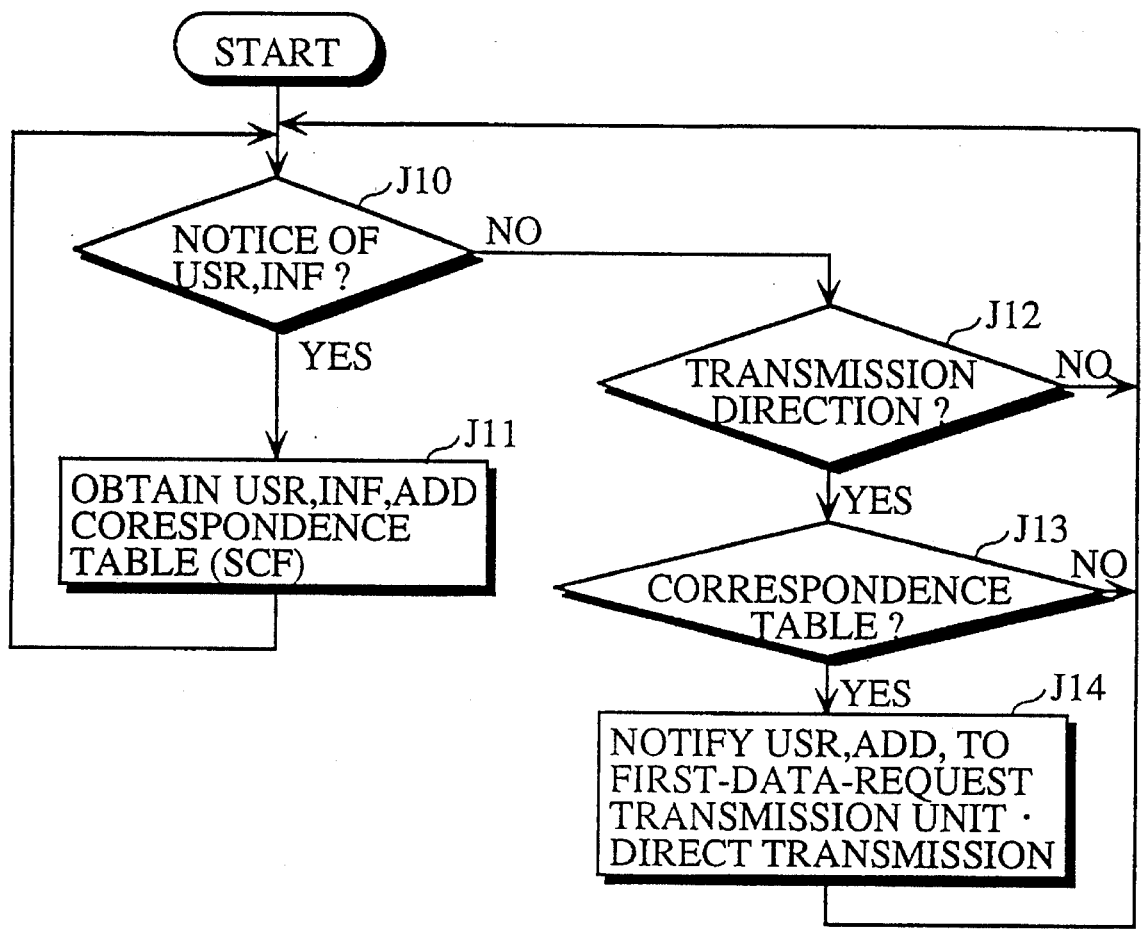
FIG. 47 is a flowchart detailing the operation of a first-data-request transmission judgment unit.

The operation of the first-data-request transmission judgment unit 205 will be explained while referring to the flowchart in FIG. 47.

Upon receipt of the values of USR and INF from the second-data-request receipt unit 201 (J10), the first-data-request transmission judgment unit 205 retrieves ADDs for the specified terminal from the SCF storage unit 10 in the SM 2000, and stores the retrieved MSFPs as ADDs with the corresponding USR in the form of a corresponding table (J11). In this way, the first-data-request transmission judgment unit 205 stores the values of USR, INF and ADD each time the receipt of the second data request is notified.

On the other hand, when the first-data-request transmission judgment unit 205 is notified that it is the next issuance time by the issuance time management unit 204 (J12), it judges whether the correspondence table has been obtained or not (J13).

When the correspondence table has not been obtained yet, the first-data-request transmission judgment unit 205 returns to J10; otherwise, it retrieves the values of USR and ADD corresponding to the next issuance time from the correspondence table to generate the first data request and directs the transmission of the same to the first-data-request transmission unit 206 (J14). Then, the first-data-request transmission judgment unit 205 waits for the notice of the following values of USR and INF and transmission direction (J10, J12).

The first-data-request transmission unit 206 transmits the first data requests to the MSFSs 1000, 1001, 1002, . . . under the direction of the first-data-request transmission judgment unit 205.

Figure 48:
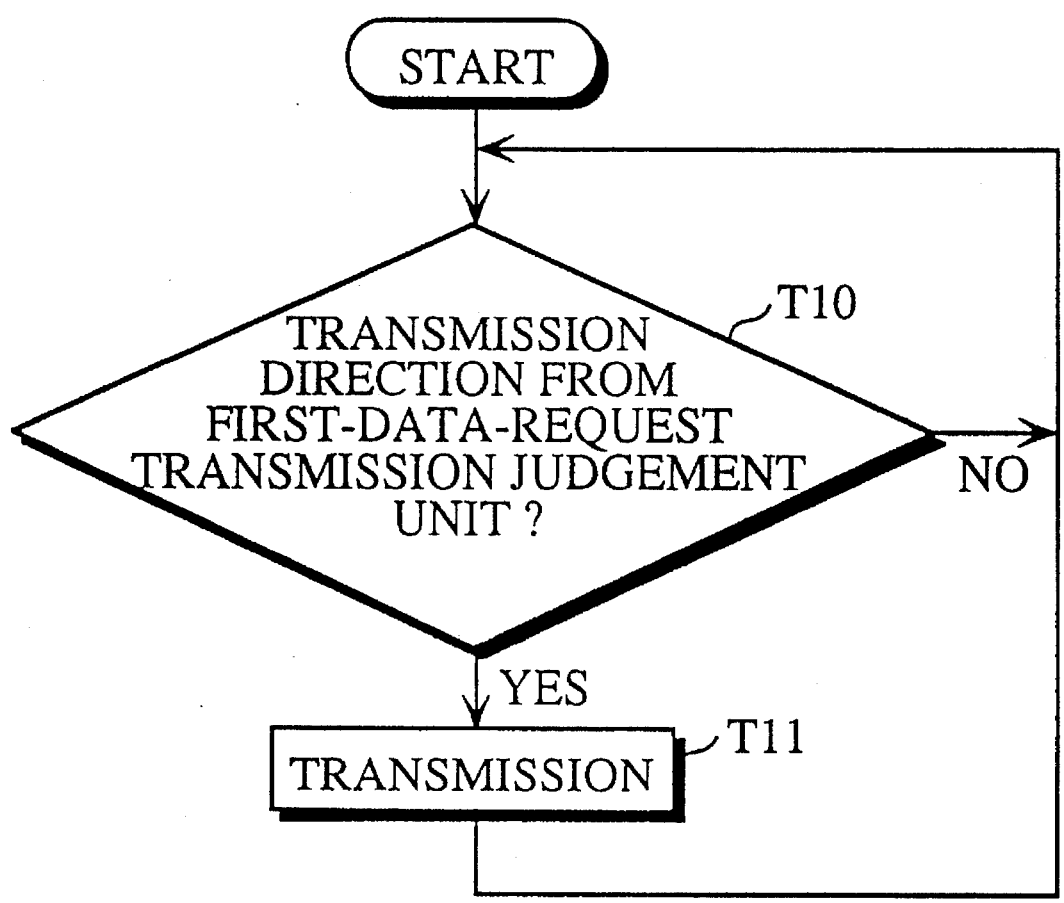
FIG. 48 is a flowchart detailing the operation of a first-data-request transmission unit.

The operation of the first-data-request transmission unit 206 and the second-data-request receipt unit 201 will be explained while referring to FIGS. 48, 49A, and 49B.

Figure 49A:
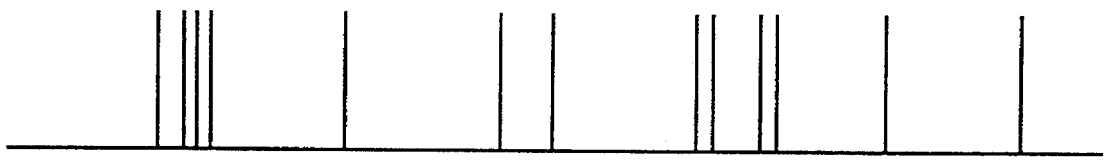
FIGS. 49A and 49B are the timing charts of the issuance of the first and second data requests.
Figure 49B:
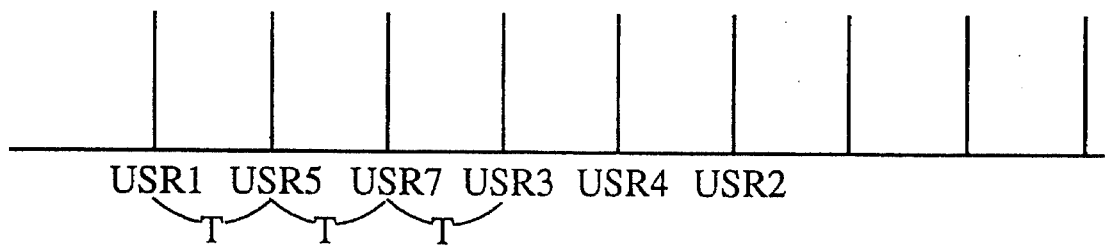

As shown in the timing chart in FIG. 49A, when the second-data-request receipt unit 201 receives the second data requests at irregular intervals, the issuance time management unit 204 transmits the same under the direction of the first-data-request transmission judgment unit 205, which receives the transmission direction for every transmission interval and minimum transmission interval (T10). Thus, the first-data-request transmission unit 206 transmits the first data requests for every minimum issuance interval T as shown in FIG. 49B. For this reason, when the second data requests are issued in burst, still the first data request can be transmitted at regular intervals (T11). After the first-data-request transmission, the issuance time management unit 204 waits for the following transmission direction (T10).

Figure 50:
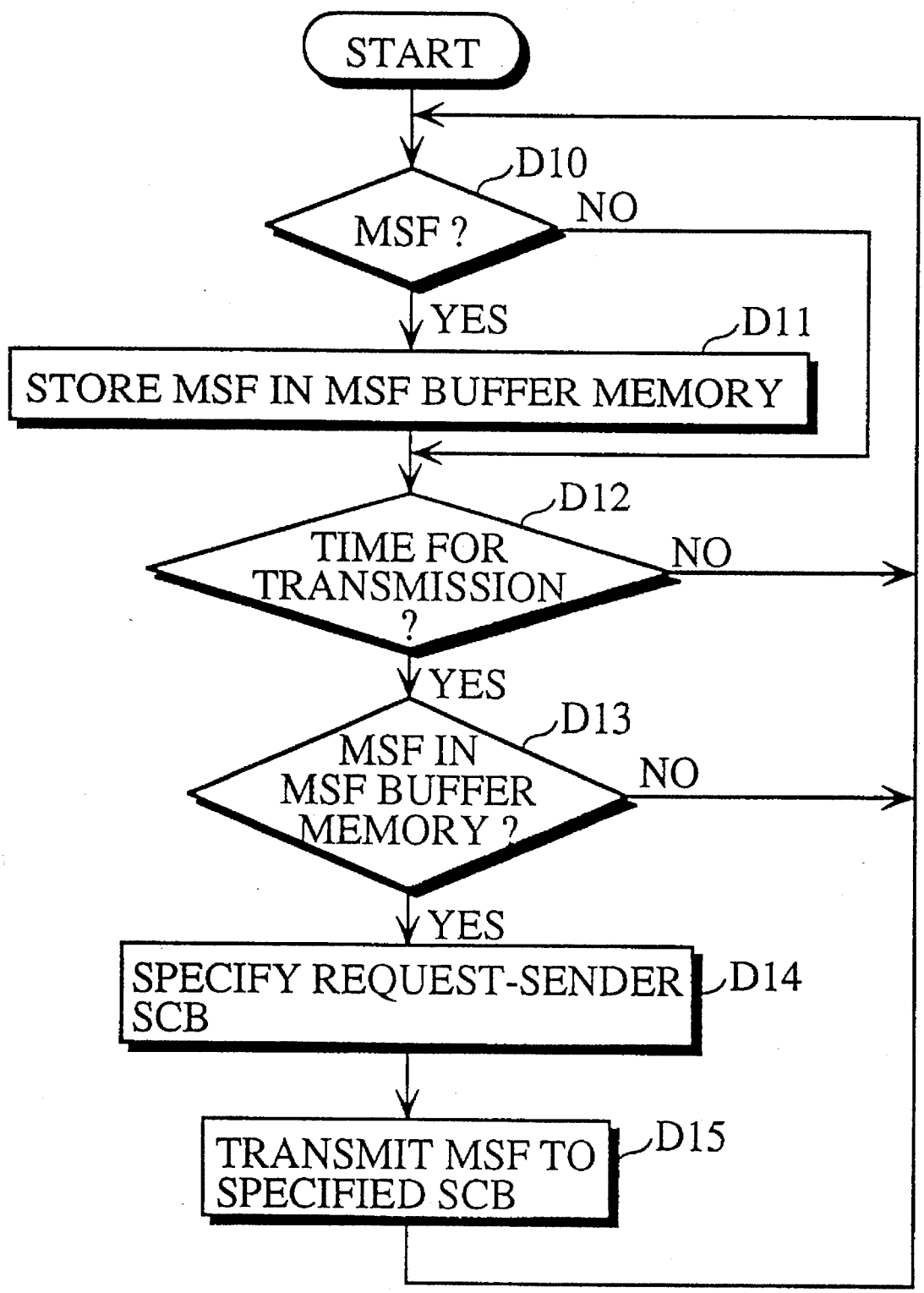
FIG. 50 is a flowchart detailing the operation of an MSF distribution unit.

The MSF distribution unit 207 includes a buffer memory 210 and receives the MSFs transmitted from the MSFSs 1000, 1001, 1002, . . . as per the first readout requests sent from the first-data-request transmission unit 206, stores the same into the buffer memory 210, and further transmits the MSFs in the buffer memory 210 to the request-sender terminal, which will be explained while referring to the flowchart in FIG. 50.

The MSF distribution unit 207 monitors the transmission of MSFs and arrival of the transmission time (D10, D12). Upon receipt of MSFs from any of the MSFSs 1000, 1001, 1002, . . . , the MSF distribution unit 207 receives the same (D10) and stores the same into the buffer memory 210 (D11); otherwise, it waits for the MSFs.

Subsequently, the MSF distribution unit 207 refers to the timer 202 to check whether it is the time to transmit the MSFs (D12). When it becomes the right time, the MSF distribution unit 207 judges whether the buffer memory 210 stores any MSF (D13), and identifies the request-sender terminal using the value of USR attached thereto (D14), sending the MSF to the identified request-sender terminal (D15). Subsequently, the MSF distribution unit 207 resumes the monitoring of MSFs and arrival of the transmission time (D10, D12).

The request issuance time hold unit 208 stores the time when the direction of the issuance of the first data request was given last.

Next, the MSFS 1000 in the tenth embodiment will be explained. As is shown in FIG. 42, the MSFS 1000 comprises a first-data-request receipt unit 301, a data transmission interval hold unit 302, a timer 303, a data readout.transmission control unit 304, data-cluster-transmission directing time hold unit 305, a transmission unit 306, the disk array 50 including the hard disk drives 51 . . . 5K.

The disk array 50 in this embodiment is of the same structure in the first embodiment; however, it stores the MSFs in the form of data clusters. The data cluster referred herein is a storage unit of the same data size as the MSF.

Each data cluster includes identification data called a PLS value. The hard disk drives 51 . . . 5K store the SCSI number of the disk storing the MSF, disk number, and the logical block number indicating the MSF storage location in the PLS value.

Figure 51:
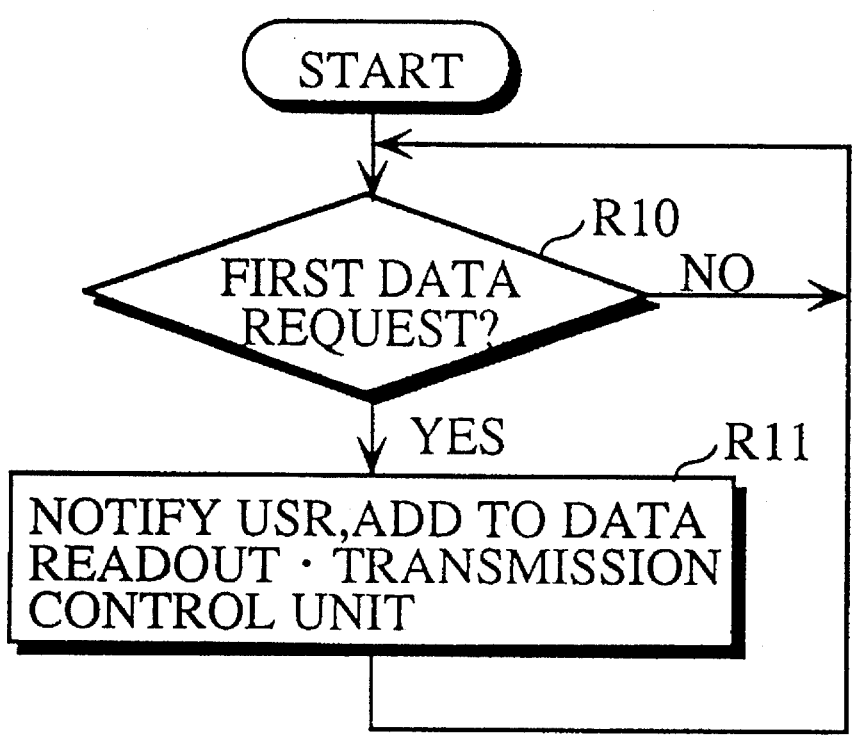
FIG. 51 is a flowchart detailing the operation of a first-data-request receipt unit.

The data request receipt unit 301 receives the first data requests sent from the SCB 3000, 3001, 3002, . . . , and notifies the values of USR and ADD contained therein to the data readout.transmission control unit 304, which will be described more in detail while referring to the flowchart in FIG. 51.

The data request receipt unit 301 checks regularly whether the first data request is received or not (R10). When the first data request is received, the first-data-request receipt unit 301 notifies the values of the USR and ADD contained therein to the data readout.transmission control unit 304 (R11, and waits for the following readout request (R10).

The data transmission interval hold unit 302 holds the interval between the data transmission within one data cluster. The data transmission interval in this embodiment is found by dividing the mean value of the arrival times of the first data readout requests addressed to one MSF by the number of the data clusters.

The transmission interval held in the data transmission interval hold unit 302 is referred to as data transmission time together with the transmission directing time held in the data-cluster-transmission directing time hold unit 305.

The timer 303 counts the time.

Figure 52:
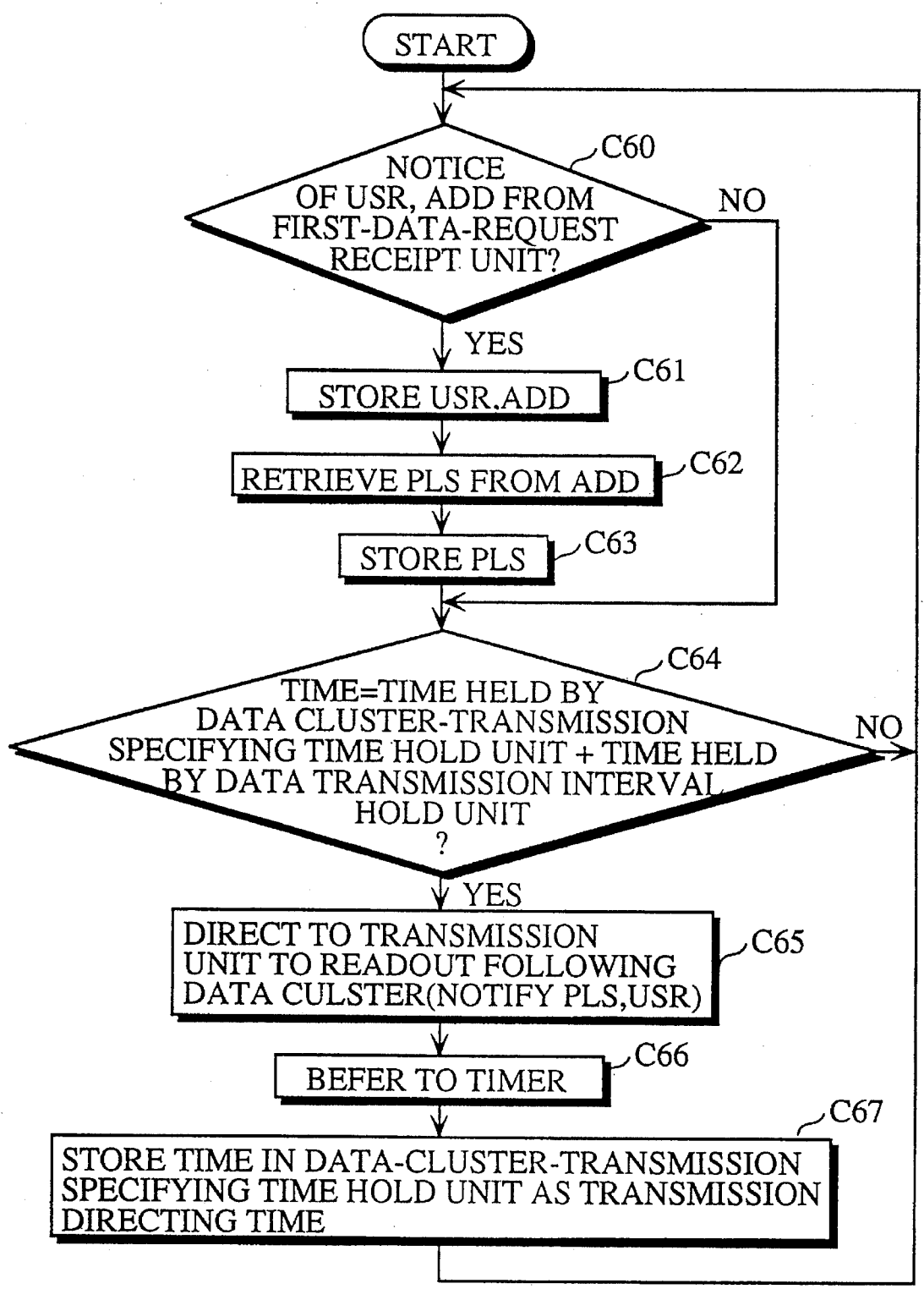
FIG. 52 is a flowchart detailing the operation of a data readout transmission control unit.

The data readout.transmission control unit 304 manages the data related to the data clusters of the readout requests, and controls the readout and transmission of the data based on the received first data requests, which will be explained more in detail while referring to the flowchart in FIG. 52.

The data readout.transmission control unit 304 checks whether the values of USR and ADD are notified from the first-data-request receipt unit 301, or it is the data transmission time (C60, C64). When the values of USR and ADD are notified from the first-data-request receipt unit 301, the data readout.transmission control unit 304 stores the same (C60, C61), and retrieves the PLS value in the data cluster from the ADD value to store the same (C62, C63). The hard disk drives 51 . . . 5K store the SCSI number for the disk storing the MSF, and the disk number, and the logical block number in relation with the value of PLS. The SCSI, disk, logical block numbers are included in the ADD value (MSFP), and thus, when the data transmission time comes (C64), the data readout.transmission control unit 304 successively reads out the MSFs as per the data clusters corresponding to the readout requests, and directs the transmission unit 306 to transmit the MSFs. In so doing, the data readout-transmission control unit 304 notifies the values of the data clusters and USR specifying the destination to the transmission unit 306 (C65). Subsequently, the data readout.transmission control unit 304 refers to the timer 303 (C66), and has the data-cluster-transmission directing time hold unit 305 store the transmission time when the readout and transmission of the MSFs are directed (C67), and waits for the following notice of the values of USR and ADD, and the arrival of the following transmission time (C60, C64).

Figure 53:
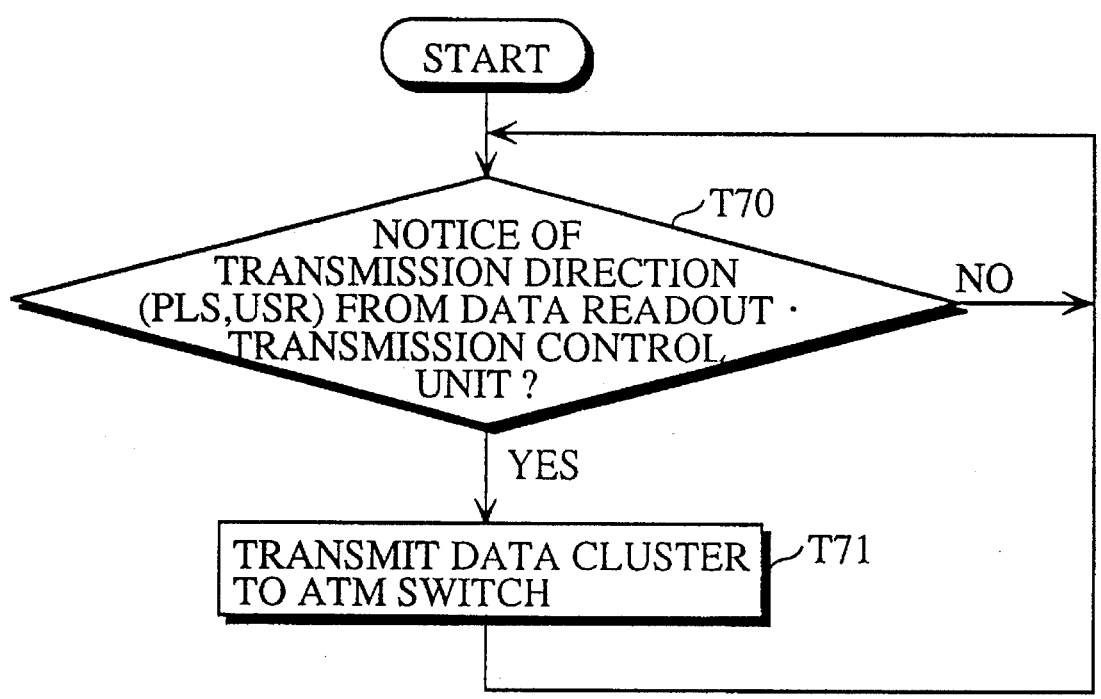
FIG. 53 is a flowchart detailing the operation of a data transmission unit.

The transmission unit 306 retrieves the data from the respective hard disk drive under the direction of the data readout.transmission control unit 304 to transmit the same to the SCB (herein 3000), which will be detailed by the flowchart in FIG. 53.

The transmission unit 306 waits for the transmission direction from the data readout-transmission control unit 304 (T70). When the transmission direction arrives, the transmission unit 306 receives the MSFs read out by the data readout-transmission control unit 304 to transmit the same to the ATM switch 4000 (T71).

By transmitting the first data requests at regular intervals longer than the minimum issuance interval, the requests and MSFs will not be transmitted intensively. As a result, the traffic jam within the ATM switch 4000 will be mitigated, upgrading the efficiency of the ATM switch 4000.

The minimum issuance interval may be shortened when the number of the first data requests waiting to be transmitted exceeds a predetermined threshold.

The second data request may be formatted differently from the example in this embodiment as long as the identification data identifying the request data, and the destination of the MSFs are included.

Also, the first data request may be formatted differently form the example in this embodiment as long as the identification data identifying the request-sender SCB and the logical address specifying the storage location of the requested MSF are included.

The order of the arrival of the second data requests may be stored to issue the corresponding first data requests at minimum issuance intervals.

Although the data cluster is used as a memory unit of the MSF, other units can be used as long as the MSF's storage location can be specified.

The buffer memory monitor unit 22 in the first embodiment may be installed between the buffer memory 210 and first-data-request transmission unit 206 to transmit the first data requests depending on the available capacity of the buffer memory 210.

Eleventh Embodiment

In the eleventh embodiment, when a plurality of SCBs sends out the readout request to one MSF, the MSF are copied in the matching number.

Figure 54:
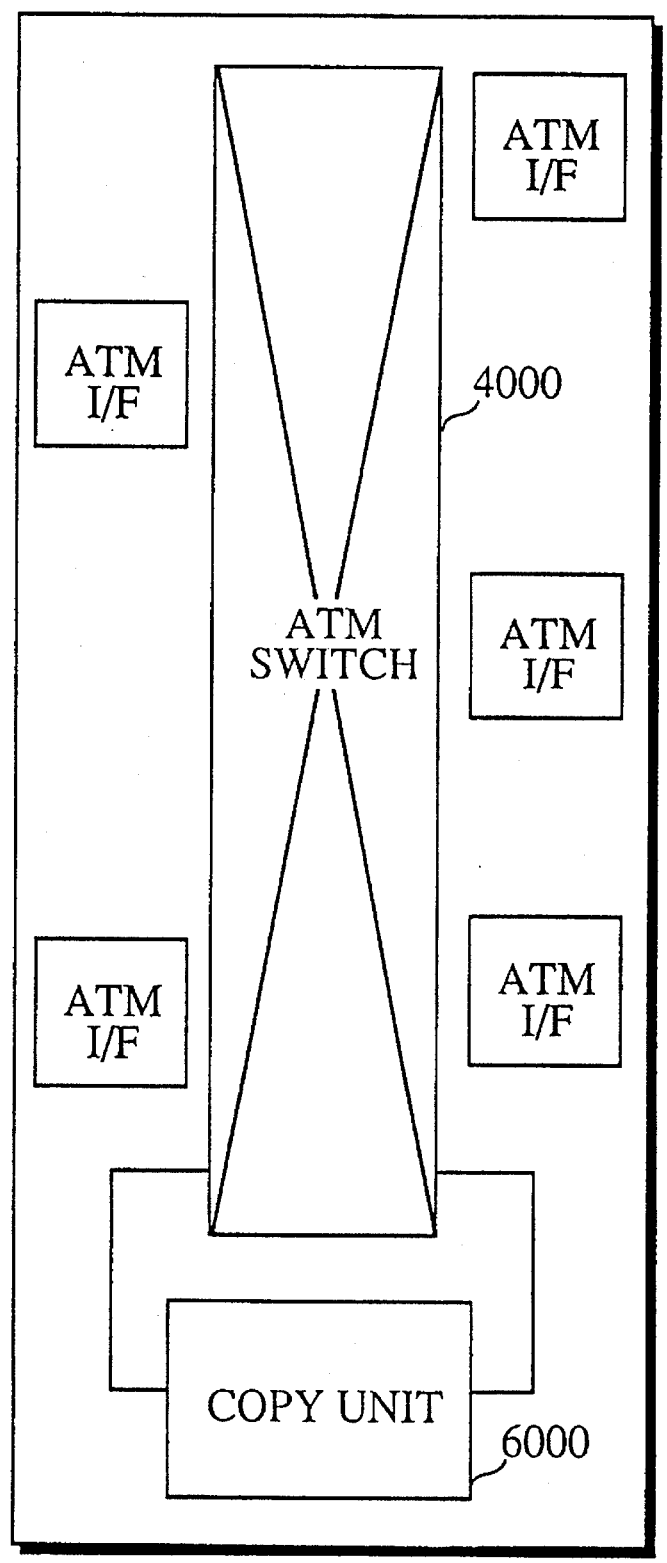
FIG. 54 is a view depicting the structure of a copy unit in accordance with an eleventh embodiment of the present invention.

Thus, ATM switch 4000 is connected to a copy unit 6000 as shown in FIG. 54.

The copy unit 6000 copies the data in the cells in accordance with a copy list to transmit the resulting cell copies to their respective destinations. The copy list referred herein is a list of the destinations for each cell copy, and generated by the MSFs. The cell-copy technique is detailed in U.S. Pat. No. 5,287,530 issued on Feb. 15, 1994, and the further explanation is omitted herein.

Figure 11B:
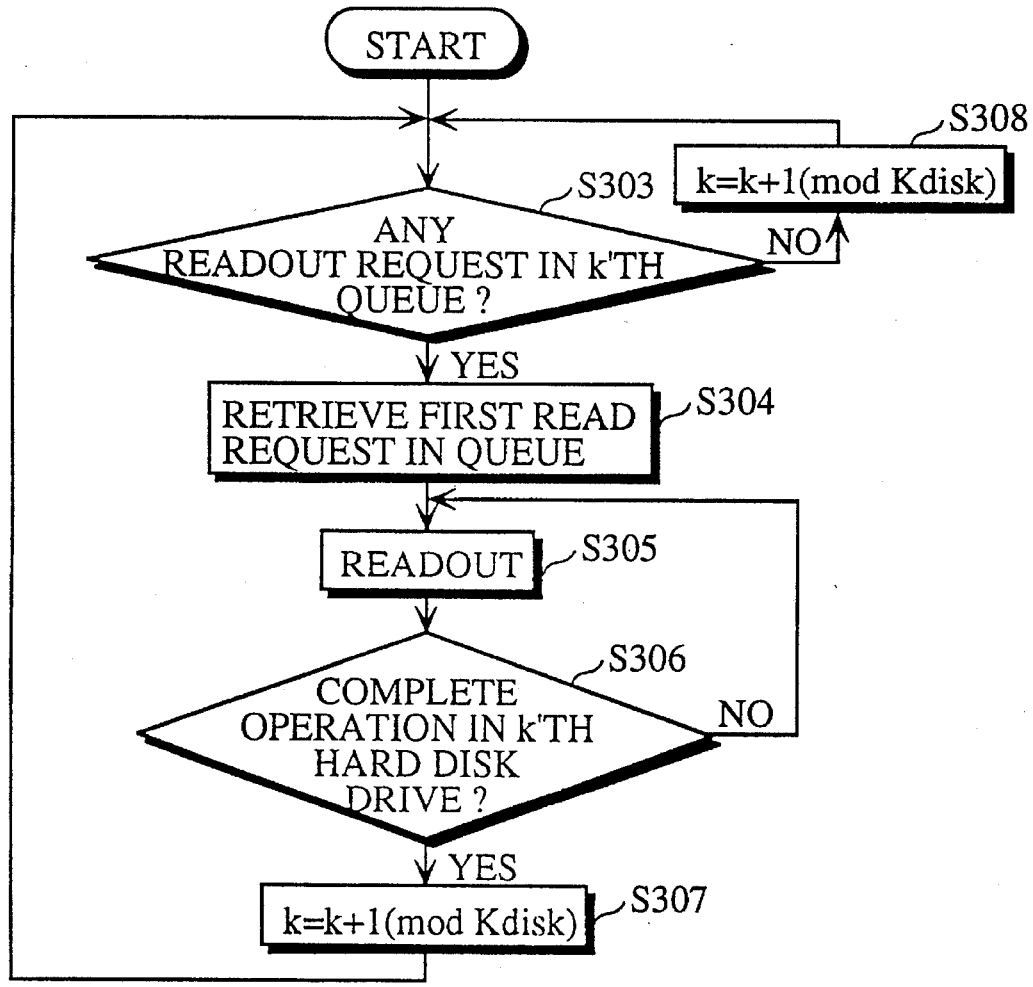
Figure 55:
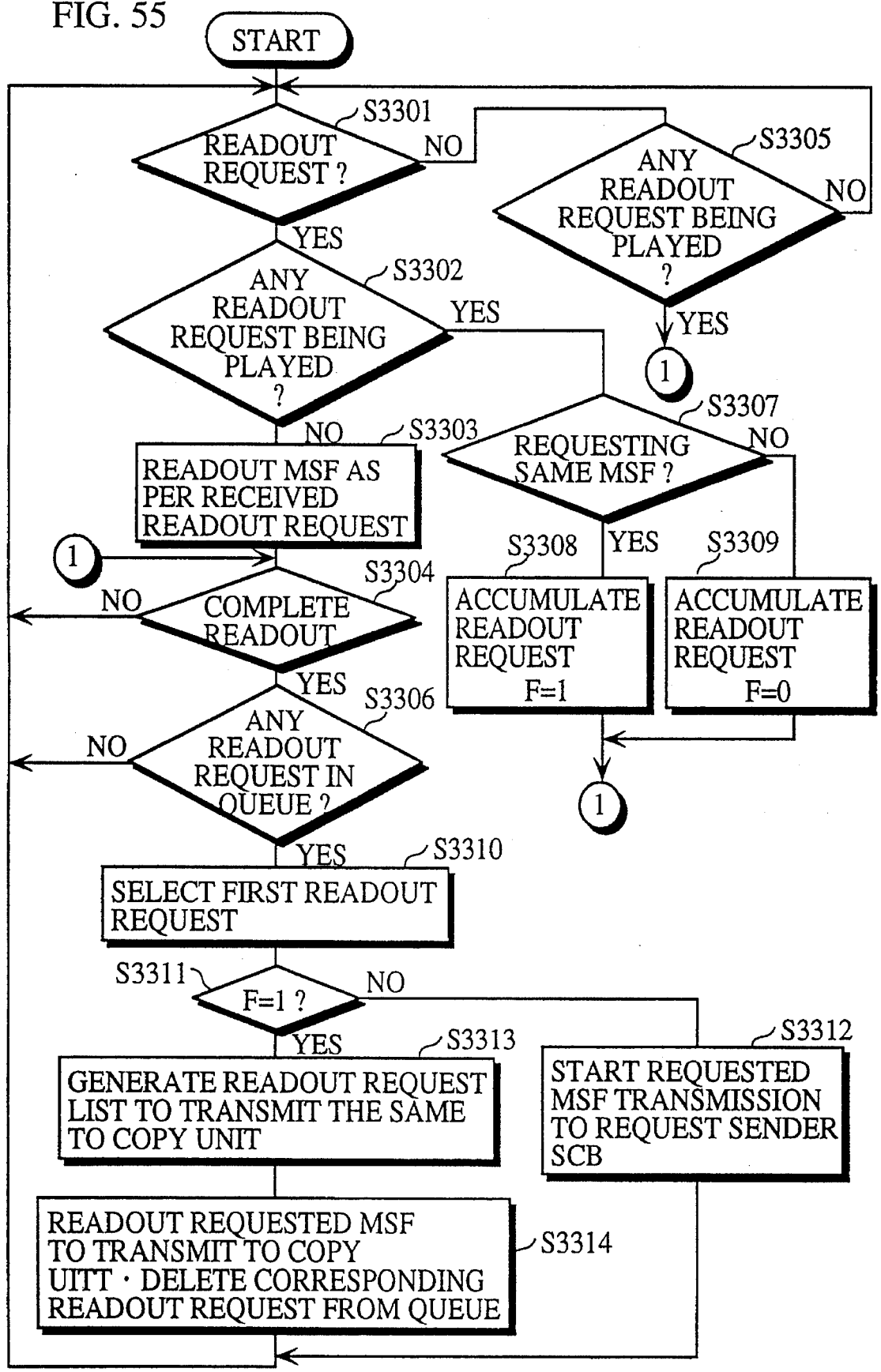
FIG. 55 is a flowchart detailing the operation of an array controller in accordance with the eleventh embodiment.

To make the cell copies, the array controller 60 operates by following the flowchart in FIG. 55 instead of FIG. 11B; for the array controller 60 in this embodiment includes a flag register, and sets a flag F in accordance with each readout request accumulated in the queues.

The array controller 60 monitors the arrival of a readout request regularly (S3301). Upon detection of the readout request, the array controller 60 judges whether the corresponding hard disk drive is reading out the MSFs (S3302). When the hard disk drive is not reading out the MSFs, the array controller 60 outputs the readout request to the hard disk drive (S3303). While the hard disk is reading out MSFs, the array controller 60 monitors the arrival of the following readout request (S3301). When the following readout request arrives, the array controller 60 inquires the corresponding hard disk drive whether it has completed the MSF readout (S3302). When the hard disks is still reading out the MSFs, the array controller 60 discriminates the MSF corresponding to the readout request, and judges whether any readout request for the same MSF has been accumulated in the corresponding queue (S3307). When such readout request has been accumulated in the queue, the array controller 60 sets the flag F of the readout request to "1" and accumulates the readout request in the queue (S3308).

On the other hand, when there is no readout request for the same MSF, the array controller 60 accumulates the readout request in the queue, setting the flag F of the readout request "0" (S3309).

Having set the flag F, the array controller 60 resumes the monitoring of the arrival of another readout request (S3301), and waits the hard disk drive to complete the MSF readout (S3305, S3304).

When the hard disk drive completes the MSF readout, the array controller 60 checks whether there is any readout request accumulated in the queue (S3306) to retrieve the first-accumulated readout request therein, and judges whether the flag F of the retrieved readout request is set to "1". When the flag F is set to "1", the array controller 60 retrieves the readout requests requesting the same MSF from the queue to generate the copy list (S3313). Then, the array controller 60 transmits the copy list thus generated to the copy unit 6000, and deletes the readout requests on the list from the queue, cutting the queue length shorter. Having deleted the retrieved readout requests, the array controller 60 reads out the MSF as per the readout request from the hard disk drive, transmitting the same to the copy unit 6000 (S3314).

The copy unit 6000 receives the copy list and MSF converted into the cells, and copies the MSF in a matching number with the number of the readout requests on the copy list. Having copied the cells (MSF), the copy unit 6000 varies the addresses on the copy list into the cells separately, and outputs the same to the ATM switch 4000. The cell copies (MSF copies) outputted to the ATM switch 4000 are delivered to their respective request-sender SCBs.

By copying the cells (MSF) and sending the same when a plurality of readout requests are sent to one particular MSF at a time, the requested MSF can be transmitted to their respective request sender SCBs simultaneously, speeding up the MSFS's operation.

TwelftH Embodiment

In the twelfth embodiment, the MSFSs also serve as the copy unit 6000.

Thus, the communication control unit 65 includes an MSF transmission management table as shown in FIG. 56.

The MSF transmission management table is used to dived the received readout requests into groups for each MSF, and consists of entries including three columns: a requested MSF identification number, a destination, and a list of other destinations.

The requested MSF identification number column exhibits the MSP sequence numbers identifying the individual MSFs requested by the readout requests, which was mentioned in the first embodiment. The destination column exhibits the address of the SCB which has sent the readout request to one particular MSF first. The other destination list column exhibits the addresses of the other SDBs that have sent the readout request to the same MSF second and onwards.

For example, from left to right in the top of the MSF transmission management table, "2130" is the identification number of one MSF, "1" is the address of the SCB that has sent the readout request to the MSF identified as "2130", and "10" is the address of the SCB that has also sent the readout request to the same MSF following the SCB "10".

Figure 57:
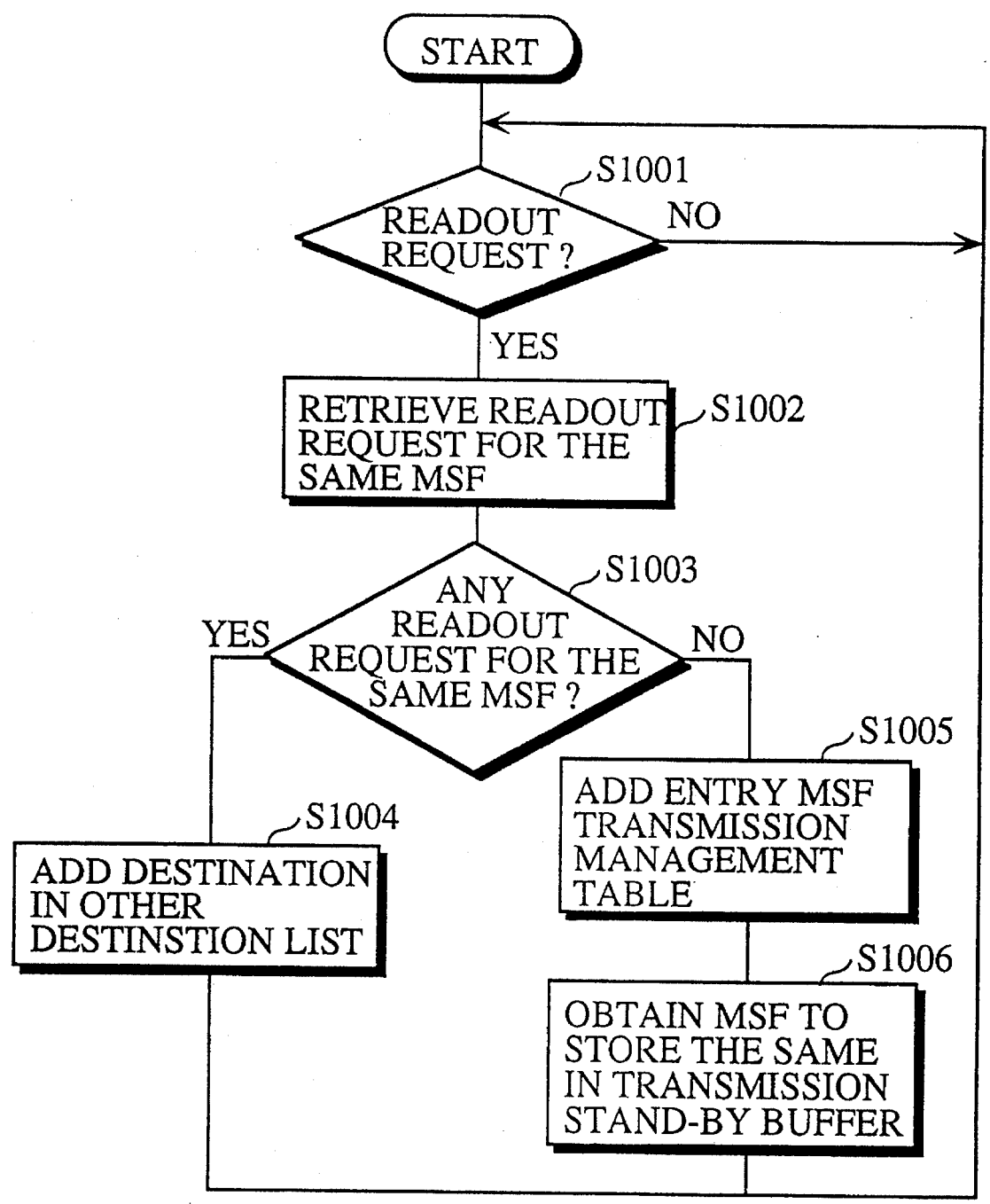
FIG. 57 is a flowchart detailing the process upon receipt of a readout request in the twelfth embodiment.
Figure 58:
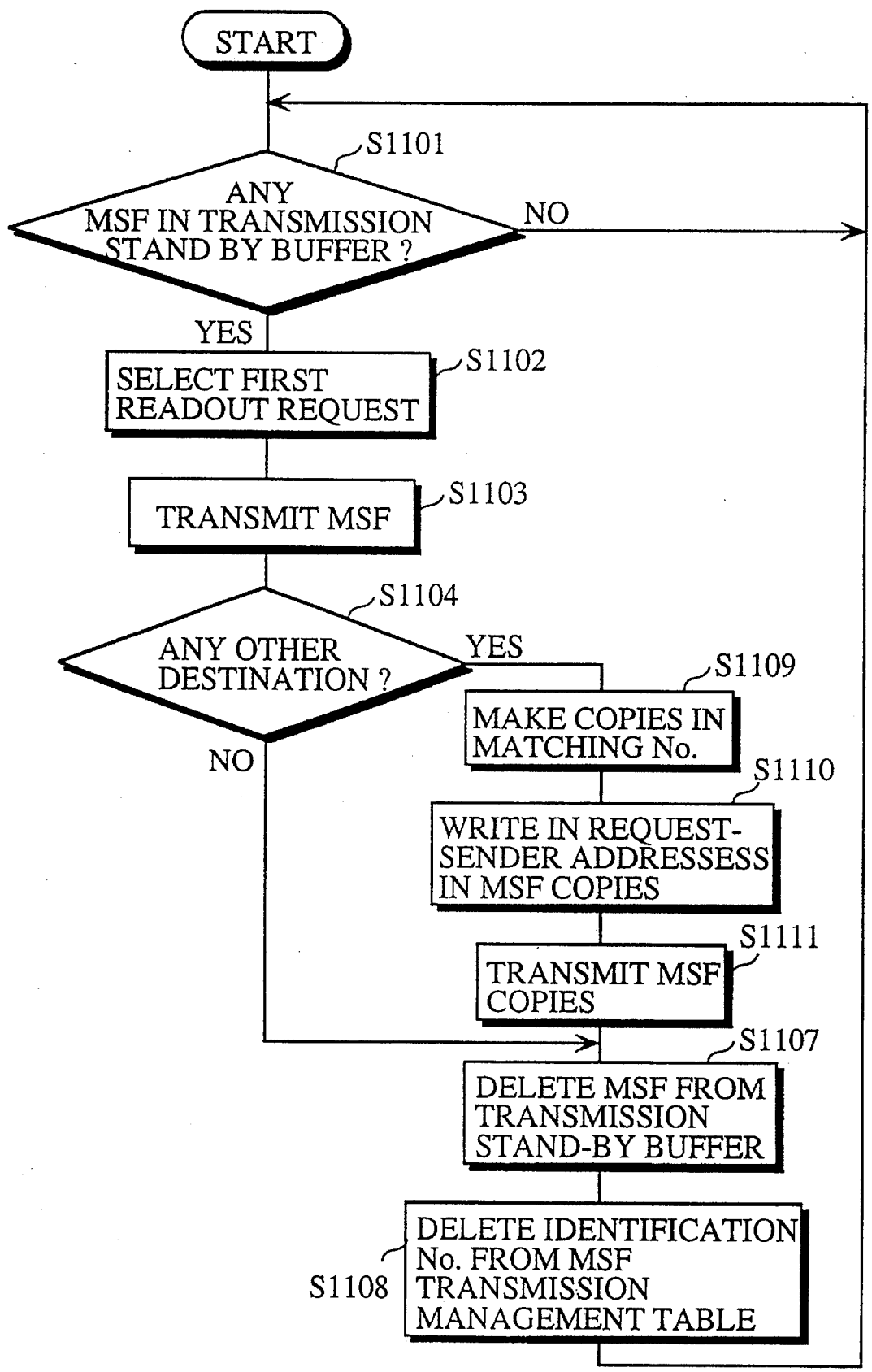
FIG. 58 is a flowchart detailing the MSF transmission process in the twelfth embodiment.

In addition to the function described in the first embodiment, the communication control unit 65 operates by following the flowcharts in FIGS. 57 and 58, which will be explained in the following with referring to FIG. 56 as well.

When the request receipt unit 31 receives a readout request (S1001), the communication control unit 65 checks whether the identification number of the MSF requested by the readout request is listed on the MSF transmission management table (S1002). Assume that the SCB 3004, whose address is "5", has requested the MSF identified by "2130" (S1003), then the communication control unit 65 writes the address "5" in the other destination list of the MSF "2130" in the MSF transmission management table. (S1004).

When there is no corresponding MSF in the MSF transmission management table in S1003, the communication control unit 65 adds a new entry by writing the address of the requested MSF and its destination (S1005, S1006).

When there is any MSF in the transmission stand-by buffer 62 (S1102 in FIG. 58), the communication control unit 65 selects the first-in MSF therein (S1102) to send the same to the request-sender SCB (S1103). Having transmitted the first-in MSF, the communication control unit 65 checks whether the identification of the transmitted MSF is listed on the MSF transmission management table (S1104). If so, the communication control unit 65 retrieves all the addresses in the other destinations list column to copy the transmitted MSF for the number of the retrieved addresses (S1109), writing the retrieved addresses into the MSF copies separately (S1110).

In case of FIG. 56, the transmission stand-by buffer 62 stores the MSF identified by "6521". Then, the communication control unit 65 retrieves the addresses "1" and "3" from the MSF transmission management table, makes two copies of the MSF, writes the addresses "1" and "3" in the MSF copies respectively, and has the transmission unit 61 transmit the MSF copies (S1111). Subsequently, the communication control unit 65 deletes the transmitted MSF from the transmission stand-by buffer 62, and the entry thereof in the MSF transmission management table as well (S1107, S1108).

By copying the MSF and sending the same, the requested MSF can be transmitted to their respective request sender SCBs when a plurality of readout requests are sent to one particular MSF, upgrading the operating speed of the MSFS.

Thirteenth Embodiment

In the thirteenth embodiment, the SCF of the requested video are obtained partially.

Thus, the MSFP transmission control 23 includes a partial-SCF buffer (not shown) instead of the SCB buffer, and an SCF obtainment control unit (not shown) instead of the selection signal separation unit 20 for monitoring an available capacity of the partial-SCF buffer to retrieve SCF from the SM 2000 according to the available capacity.

Figure 59:
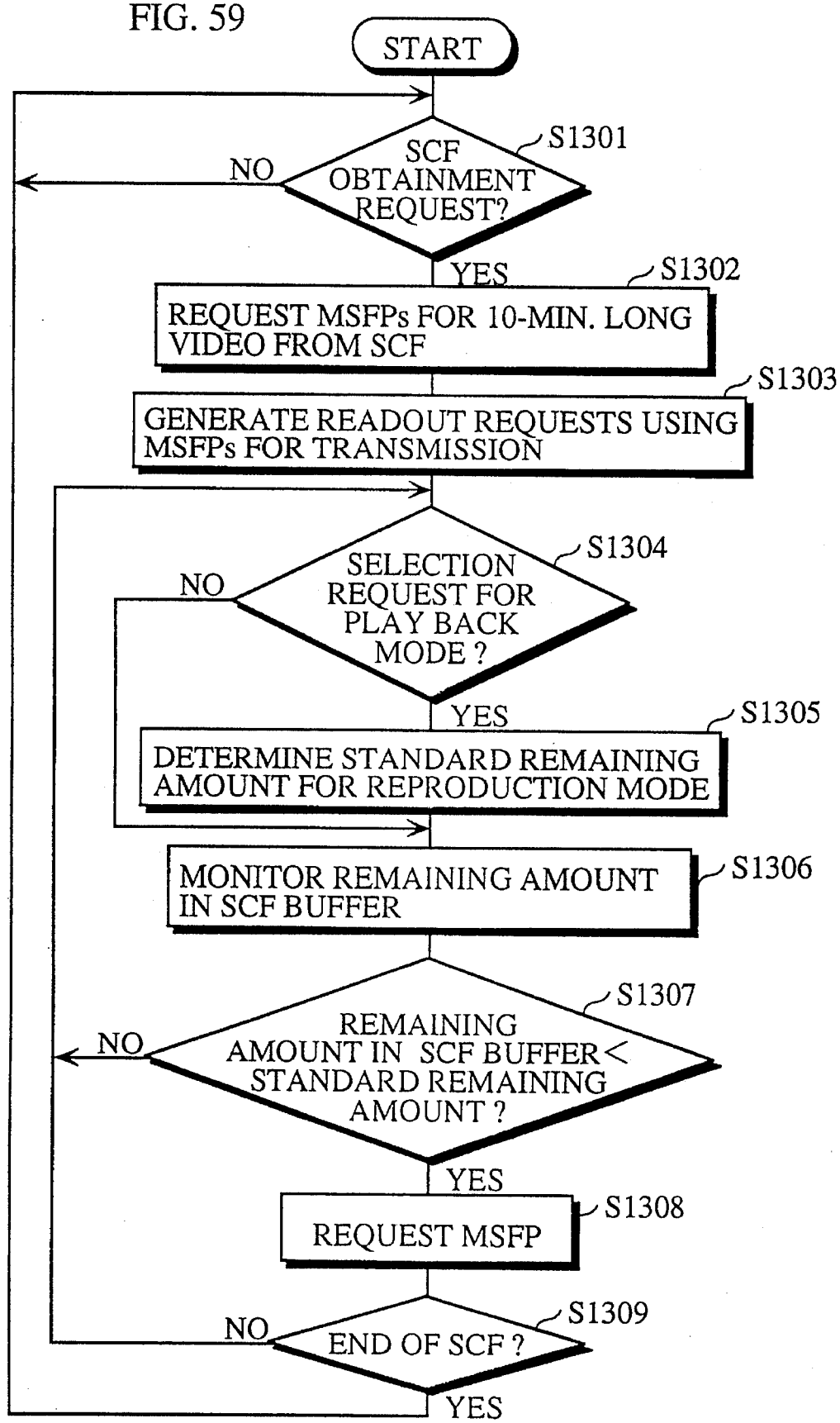
FIG. 59 is a flowchart detailing the operation of an SCF obtainment control unit in accordance with a thirteenth embodiment of the present invention.

The operation of the SCF obtainment control unit will be explained while referring to the flowchart in FIG. 59.

The SCF obtainment control unit regularly monitors whether the MSFP transmission control unit 23 transmits an SCB obtainment request (S1301). Upon detection of the SCF obtainment request, the SCF obtainment control unit requests the transmission of 10-minute long MSFPs out of the corresponding SCF to the SM 2000 (S1302). Upon receipt of the MSFPs, the MSFP transmission control unit 23 generates the readout request using the MSFPs, and transmits the same to the corresponding MSFSs (S1303).

Also, the SCF obtainment control unit regularly monitors a playback mode request (S1304). Upon detection of the playback mode request, the SCF obtainment control unit determines the remaining level to the playback mode (S1305); otherwise, the SCF obtainment control unit continues the monitoring, leaving the current remaining level intact (S1306).

The remaining level referred herein is a threshold used to determine whether the following partial SCF should be requested by judging the amount of the partial-SCF buffer. Assume that 10% is the remaining level for the normal playback mode, then the SCF obtainment control unit requests the following partial SCF when the remaining MSFPs in the partial-SCF buffer becomes 10% of the capacity thereof. Similarly, assume that 30% is the remaining level for the fast playback mode, then the SCF obtainment control unit requests the following partial SCF when the remaining level of the MSFPs in the partial-SCF buffer becomes 30%, and assume that 3% is the remaining level for the slow playback mode, then the SCF obtainment control unit requests the following partial SFC when the remaining level of the MSFPs in the partial-SCF buffer becomes 3%.

Having set the remaining level, the SCF obtainment control unit checks whether the remaining MSFPs is less or more than the remaining level (S1307). When the former is less than the latter, the SCF obtainment control unit requests the transmission of the following partial SCF (S1308).

Further, the SCF obtainment control unit checks the last MSFP in the SCF (S1309). If the last MSFP is not included, the SCF obtainment control unit resumes the monitoring on the playback mode (S1304); otherwise, it waits for another SCF obtainment request (S1301).

Since the SCB stores the SCF partially, a considerably long SCF can be stored in the SCF buffer with a small capacity.

The charge management unit 13 may detect how many MSFPs in one SCF are retrieved, so that the charges become directly proportional the length of the video transmitted to the terminal.

Fourteenth Embodiment

In the fourteenth embodiment, the video stored in the MSFSs, 1000, 1001, 1002 are re-written. Thus, the video server 100 in this embodiment is installed at the CATV station, and connected to the video players within the station.

Figure 15:
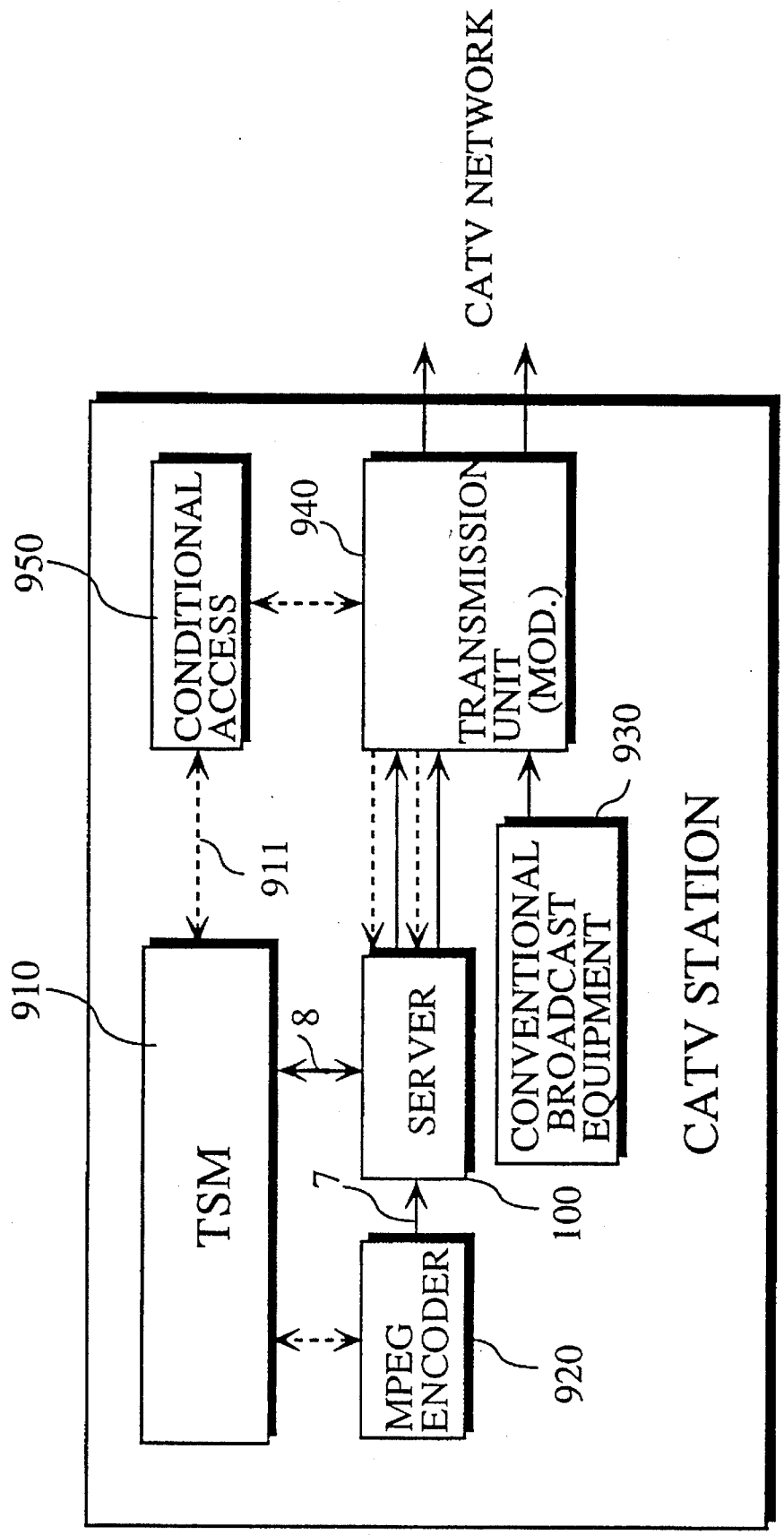
FIG. 15 is a view depicting the structure of a video server installed in a CATV station.

The structure of a system using the video server 100 in the fourteenth embodiment is shown in FIG. 15.

The system controls all the units in the station, and comprises a total system manager (TSM) 910 responsible for the control of the transmission route between the terminals and video server 100 as well as the management of the charges and programs, an encoder 920 for converting a video signal into the MPEG 2 format, and a transmission unit 940 for converting an analog signal from a conventional analog broadcast unit 930 into a digital signal to multiplex the same.

Figure 60:
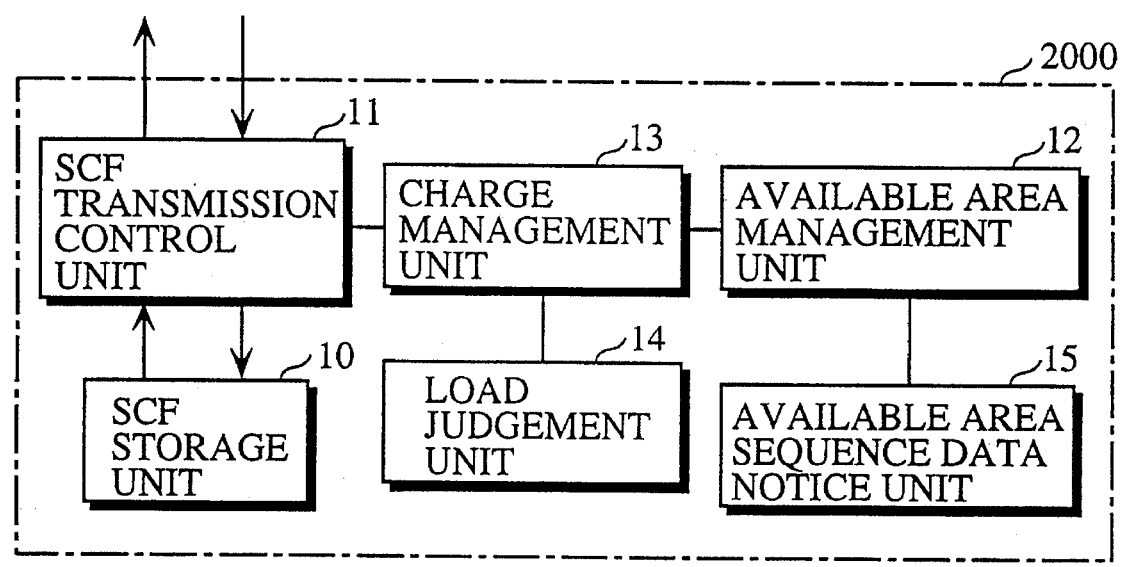
FIG. 60 is a view depicting the structure of an SM in accordance with a fourteenth embodiment of the present invention.

FIG. 60 depicts the structure of the SM 2000 in this embodiment. The SM 2000 includes an available area management unit 12 and an available area sequence data notice unit 15 in addition to the structure shown in FIG. 5.

The available area management unit 12 manages overwritable areas within the memory area of the MSFSs 1000, 1001, 1002, . . . as recordable areas. The data related to the available areas are used for such management; the data related to the available areas are used as a pointer for the overwritable area, and contain an area identifier, the address of the corresponding MSF, and location of the available area in the disk array 50 in the MSFS. Thus, the available area data are of a similar structure as the MSFP shown in FIG. 4 except that they additionally include the area identifier and that a "write" command is assigned. The available area data include the parameters for the write command to the disk array, and thus they also serve as a disk control command to write the data by accessing to the disk array.

The available area sequence data notice unit 15 accepts a record request, edits a write control file (WCF) for the video to be recorded in the available area, sending the WCF to the request-sender SCB. To be more specific, upon receipt of the record request, the available area sequence data notice unit 15 align the available area data for each MSFS in a predetermined sequence: the available area data related to the MSFS 1000 is placed first, and the available area data related to the MSFSs 1001 and 1002 are placed second and third respectively. Having aligned the available area data, or edited the WCF, the available area sequence data notice unit 15 transmits the WCF to the FD 5000, so that it converts the WCF into an SCF to have the SCF storage unit 10 store the same for the recorded video.

Figure 16:
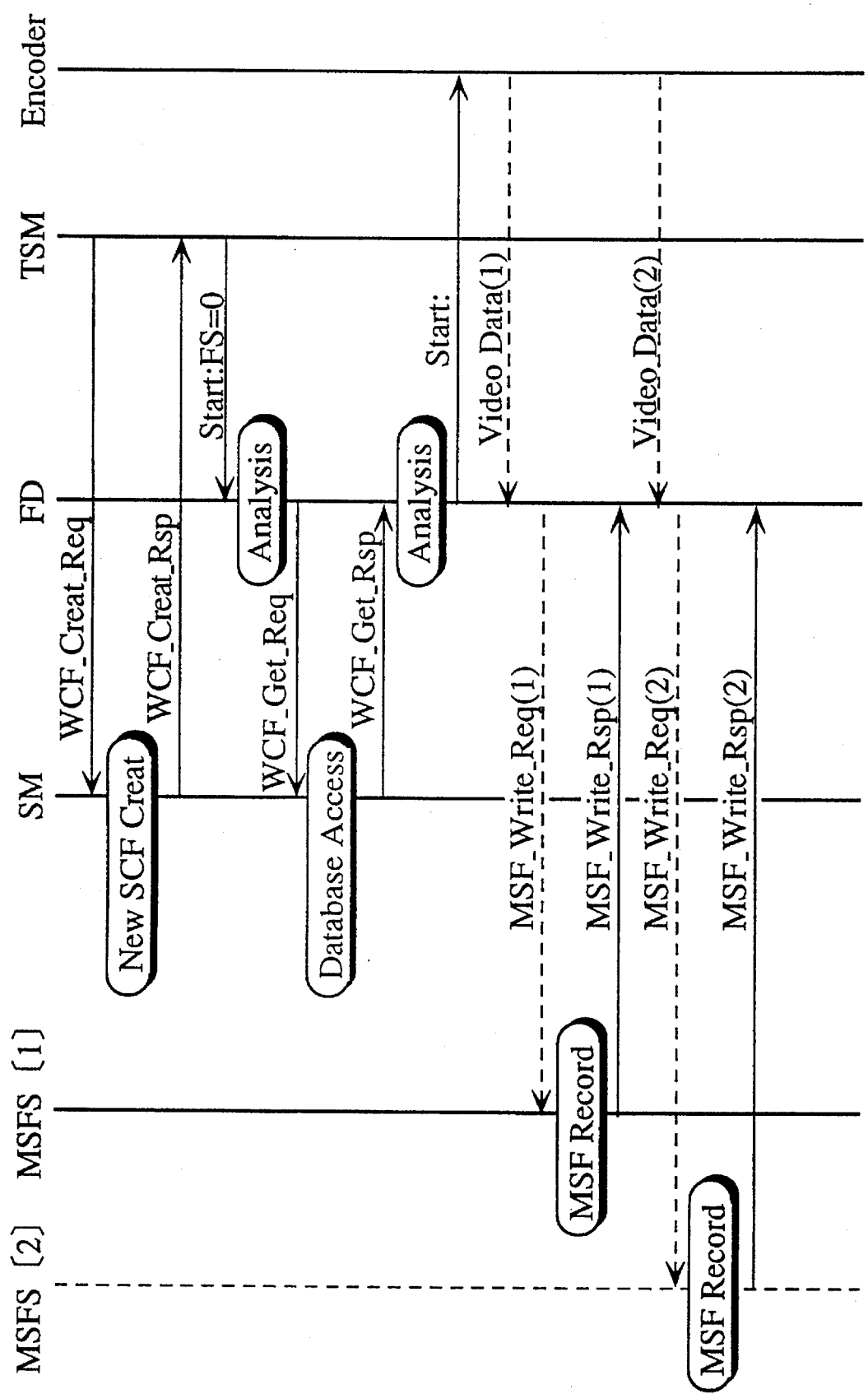
FIG. 16 is the control sequence of the video server when recording the MSFs.

The recording operation will be explained while referring to the timing chart in FIG. 16.

Prior to the video writing, the TSM 910 has the available area sequence data notice unit 15 in the SM 2000 generate the WCF for the video by outputting a WCF generation request (WCF_Create_Req) to the SM 2000.

When the SM 2000 receives the generation request, the available area sequence data notice unit 15 edits the WCF in the period indicated by (New_WCF_Create), transmitting the WCF to the TSM 910 as a request response (WCF_Create_Rsp). Upon receipt of the WCF, the TSM 910 outputs a record start request (Start) to the FD 5000, which in turn outputs a WCF obtain request (WCF_Get_Req) to the available area sequence data notice unit 15, and the available area sequence data notice unit 15 transmits the WCF to the FD 5000 as a request response (WCF_Get_

Rsp). Accordingly, the FD 5000 outputs a record start request (Start) to the encoder 920 by means of the TSM 910. The encoder 920 then outputs the 64-byte image data to the FD 5000, which converts the same into the MSF. Further, the FD 5000 generates a record request (MSF_Write_Req(1)) to write the first MSF using the available area data placed first in the WCF, outputting the same to the request-sender MSFS 1000 (MSFS[1]) together with the corresponding MSF. Since the record request also serves as the write control command to the disk array 50, the MSF is written into the disk array 50 within the period indicated as (MSF Record). Subsequently, the MSFS 1000 transmits a record completion notice (MSF_Write_Rsp(1)) to the FD 5000, which in turn receives the following 64-Kbyte image data from the encoder 920 and generates another record request (MSF_Write_Req(2)) to write the second MSF using the second available area data, and sends the same to the request-sender MSFS 1001 (MSFS[2]) together with the corresponding MSF.

Figure 61:
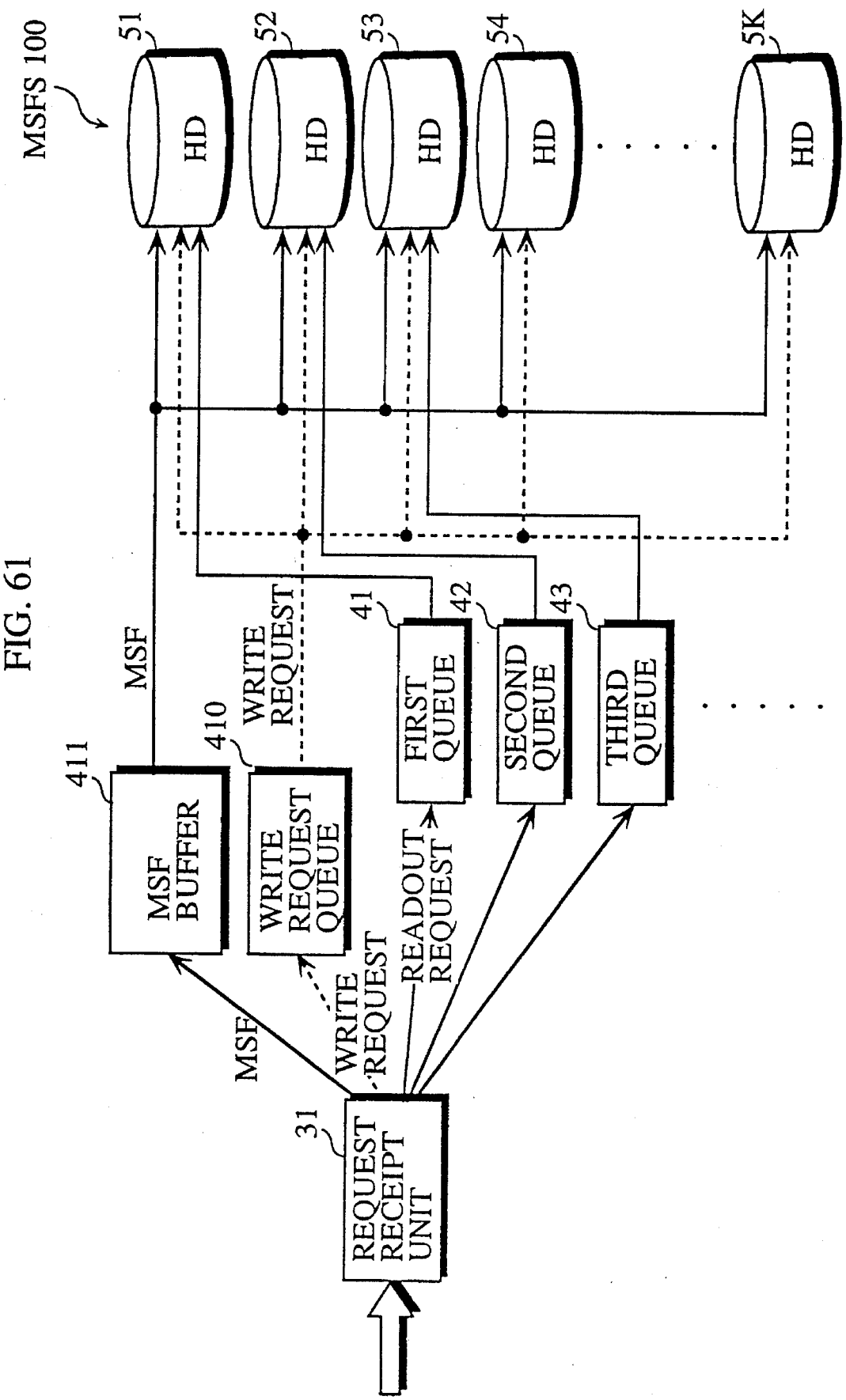
FIG. 61 is a view depicting the structure of an MSFS in accordance with the fourteenth embodiment.

FIG. 61 depicts the structure of each MSFS of the fourteen the embodiment, which additionally includes a write request queue 410 and an MSF buffer 411 compared with the MSFSs in the first embodiment.

The write request queue 410 holds the write requests sent to its MSFS, and the write requests are processed in the order of arrival when all the readout requests in the queues 41, 42, 43, . . . have been processed.

The MSF buffer 411 holds the MSFs transmitted to its MSFS and the MSFs are retrieved by the array controller 60 to be stored in the disk array 50.

Figure 62:
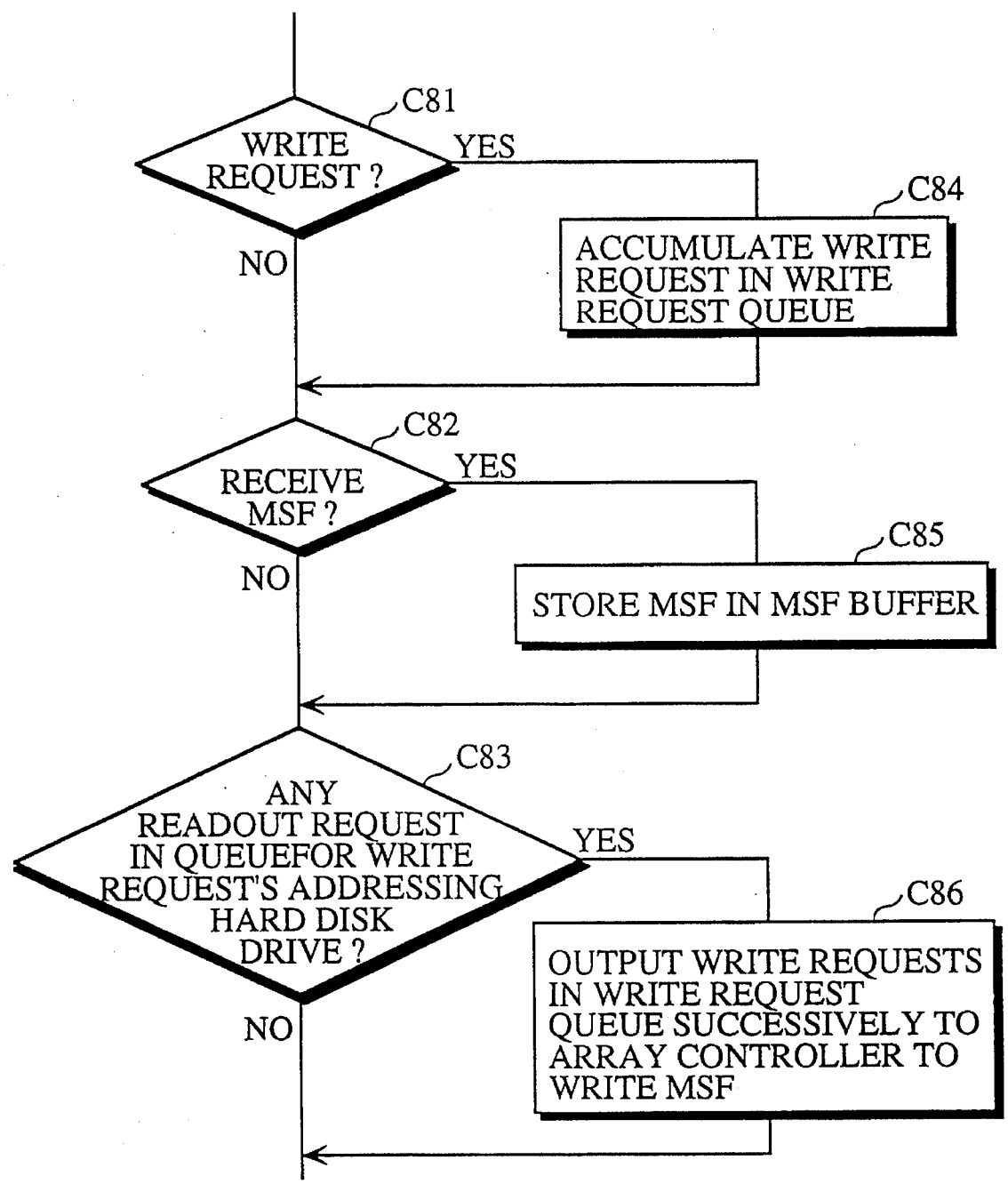
FIG. 62 is a flowchart detailing the operation of a communication control unit in accordance with the fourteenth embodiment.

The communication control unit 65 in this embodiment operates by following the flowcharts in FIGS. 13 and 62.

The communication control unit 65 checks the receipt of a readout request, a write request, and cells (MSF), and whether there is any readout request in the queue furnished for the hard disk drive to which the write request is addressed (C10 in FIG. 13, C81, C82, and C83 in FIG. 62). Upon receipt of the write request in C81, the communication control unit 65 accumulates the same in the write request queue 410 (C84). Upon receipt of the cells (MSF) in C82, the communication control unit 65 stores the same into the MSF buffer 411 (C85).

When all the readout requests in the queue furnished for the write request's addressing hard disk drive have been processed in C83, the communication control unit 65 successively outputs the write requests in the write request queue 410 to the array controller 60, and has the array controller 60 retrieve and store the MSF in the MSF buffer 411 into the disk array 50.

As has been stated, each MSFS in this embodiment can rewrite the video stored therein when there is no readout requests. For this reason, the video can be written while reading out the video at real time.

Only a single write request queue is furnished in this embodiment; however, it may be furnished for each hard disk drive.

In the first through fourteenth embodiments, MSFs are stored in the hard disk drives; however, they may be stored other storing media such as memory, optical disks, and video tapes.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A video server which transmits digital video data comprising frame blocks having a predetermined sequence and stored therein to subscriber terminals as per video requests comprising:

a plurality of frame block servers, each including a computer interface unit, an image memory and a readout control unit for the image memory, each image memory storing a plurality of said frame blocks nonconsecutive with respect to said predetermined display sequence, the readout control unit receiving readout requests and in response reading out requested frame blocks from the image memory;

management means for storing management data specifying which frame block server stores which frame block in the image memory;

a plurality of subscriber interfaces for receiving the video requests from the subscriber terminals, and in response sending readout requests to the frame block servers to readout the frame blocks forming requested digital image data in the predetermined sequence while referring to the management data, and for transmitting the frame blocks transmitted from the frame block servers to the subscriber terminals at such timing that ensures continuous play; and exchange means for interconnecting each block server and each subscriber interface to transfer the frame block servers as per the readout requests to the request-sender interfaces.

2. The video server of claim 1, wherein the management data comprise a plurality of block pointers, each identifying a location of each frame block respectively, and including an address of each frame block server that stores each frame block respectively, and wherein each subscriber interface includes:

a management data obtainment unit for receiving the video request from the subscriber terminal, and in response retrieving block pointers for the requested piece of digital video data from the management means;

a readout request generation unit for generating a readout request for each retrieved block pointer addressing to the frame block server specified by the address included therein;

a readout request transmission unit for transmitting the readout requests to the specified frame block servers, one readout request being transmitted at a time; and a frame block output unit for receiving the frame blocks read out as per the readout requests, and in response outputting the frame blocks to the request-sender subscriber terminal at predetermined timing.

3. The video server of claim 2, wherein each subscriber interface further includes an estimated return time storage unit for storing an estimated time between a transmission of the readout request and a receipt of the requested frame block as an estimated return time, the estimated return time varying depending on a frame-block readout rate of the frame block server, an exchange ability of the exchange means, and a transmission rate of the subscriber interface in transmitting the requested frame block to the subscriber terminal, and wherein the readout request transmission unit transmits the readout requests at an interval equal to the estimated return time before the frame block output unit outputs the requested frame blocks at the predetermined timing.

4. The video server of claim 3, wherein each subscriber interface further includes:

a return time counter for counting an actual time required to transmit the readout request and receive the requested frame block; and a balance computation unit for computing a balance between the actual time and the estimated return time, and wherein the readout request transmission unit includes a transmission control unit for controlling a readout-request transmission in such a way that the readout requests are transmitted at an interval equal to the balance before the predetermined timing.

5. The video server of claim 4, wherein the estimated return time storage unit stores the estimated return times for each frame block server, and wherein the return time counter counts the actual times for each frame block server, and wherein the balance computation unit computes the balances for each frame block server, and wherein the transmission control unit controls a readout-request transmission in such a way that the readout requests are transmitted to their respective specified frame block servers before the predetermined timing while referring to the balance for the frame block servers.

6. The video server of claim 3, wherein each subscriber interface further includes:

a return time counter for counting an actual time required to transmit the readout request and receive the requested frame block; and a return time update unit for updating the estimated return time stored in the estimated return time storage unit with the actual time counted by the return time counter, and wherein the readout request transmission unit transmits the readout requests at an interval before the frame block output unit outputs the requested frame block at the predetermined timing, the interval being equal to the updated estimated return time.

7. The video server of claim 6, wherein the estimated return time storage unit stores the estimated return times for each frame block server, and wherein the return time counter counts the actual times for each block server, and wherein the return time update unit updates the estimated return times stored in the estimated return time storage unit with the actual times counted by the return time counter for each frame block server.

8. The video server of claim 2, wherein the frame block output unit includes:

a frame block receipt unit for receiving the frame blocks addresses to the self's subscriber interface;

a block buffer for accumulating a certain number of frame blocks received by the frame block receipt unit;

an accumulated amount judgment unit for judging whether the block buffer stores more than a predetermined number of frame blocks; and an output unit for outputting the certain number of the frame blocks accumulated in the block buffer when the accumulated amount judgment unit judges that the block buffer stores more than the predetermined number of frame blocks, one frame block being outputted at a time to the request-sender subscriber terminal.

9. The video server of claim 8, wherein the frame block output unit further includes a check unit for checking an overflow and an underflow occurring at the block buffer, and wherein the readout request transmission unit includes a transmission control unit for controlling a readout-request transmission in such a way that the readout request are transmitted after the predetermined timing upon detection of the overflow by the check unit, and before the predetermined timing upon detection of the underflow by the check unit.

10. The video server of claim 8, wherein each subscriber interface further includes a detection unit for detecting an amount of remaining frame blocks in the block buffer, and wherein the readout request transmission unit includes a transmission control unit for controlling a readout-request transmission in such a way that the readout requests are transmitted when the amount of remaining frame blocks falls below a predetermined threshold.

11. The video server of claim 8, wherein the output unit outputs the certain number of the frame blocks in the block buffer at predetermined intervals, one frame block being outputted to the request-sender subscriber terminal at a time, the predetermined interval varying depending on a length of a video played with digital image data for one frame block.

12. The video server of claim 2, wherein each subscriber interface is connected to a plurality of subscriber terminals, each subscriber terminal outputting a video request including a terminal identifier, and wherein the management data obtainment unit further includes an identifier detection unit for detecting the terminal identifiers contained in the video requests sent from the subscriber terminals upon receipt thereof, and wherein the readout request transmission unit further includes an identifier attachment unit for attaching the terminal identifiers detected by the identifier detection unit to each readout request generated by the readout request generation unit, and wherein the readout control unit in each frame block server includes:

a readout request receipt unit for detecting the terminal identifiers when receiving the readout requests from the readout request transmission unit; and a frame block transmission unit for attaching the terminal identifiers detected by the readout request receipt unit to each request frame block read out as per the readout requests before the transmission thereof to the request-sender subscriber interface, and wherein the frame block output unit further includes a distribution output control unit for receiving the terminal-identifier-attached frame blocks and in response outputting the same to the request-sender subscriber terminal identified by the terminal identifier.

13. The video server of claim 12, wherein the readout request transmission unit includes:

a most recent transmission time storage unit for storing a transmission time when a readout request is transmitted most recently;

a transmission judgment unit for judging whether a readout request is being transmitted for another subscriber when the management data obtainment unit receives a video request from one subscriber;

a time control unit for controlling a readout-request transmission for one subscriber while the readout request for another subscriber is being transmitted in such a way that a first readout request for the video request from the former subscriber is transmitted after a certain interval from the most recent transmission time, and that a second and subsequent readout requests are transmitted at predetermined issuance intervals from the transmission of the first readout request, the certain interval being found by multiplying a mean frame-block transmission rate of the plurality of subscriber interfaces in transmitting the frame blocks to the request-sender subscriber terminals by the number of the connected subscriber terminals, and dividing an amount of data of one frame block by the resulting value, the predetermined issuance interval being found by dividing the frame-block data amount by the transmission rate of one frame block.

14. The video server of claim 12, wherein the readout request transmission unit includes:

a transmission schedule generation unit for making out a transmission schedule of each readout request for a video requests upon receipt thereof by the management data obtainment unit;

a clock unit for showing a current time;

a transmission time buffer for storing a next scheduled time, the next scheduled time being a scheduled time nearest to the current time;

a transmission control unit for controlling a readout-request transmission in such a way that a readout request scheduled for the next scheduled time is transmitted when the clock unit shows the next scheduled time;

a transmission scheduled time determination unit for determining the transmission schedule, when the management data obtainment unit receives a video request from another subscriber, by setting the transmission scheduled time for a first readout request after a predetermined interval from the next scheduled time, and by setting scheduled times for second and subsequent readout requests at predetermined issuance intervals from the scheduled time for the first readout request;

a schedule write unit for writing the transmission scheduled times determined by the transmission scheduled time determination unit into the transmission schedule, the certain interval being found by multiplying a mean frame-block transmission rate of the plurality of subscriber interfaces in transmitting the frame-blocks to the request-sender subscriber terminals by the number of the connected subscriber terminals, and dividing an amount of data of one frame block by the resulting value, the predetermined issuance interval being found by dividing the frame-block data amount by the transmission rate of one frame.

15. The video server of claim 2, wherein the management data are a sequential file where the block pointers are aligned in a same sequence as a frame-block transmission sequence, and wherein the readout request transmission unit includes:

a playback mode judgment unit for receiving a playback mode signal from the subscriber terminal and discriminating a playback mode contained therein;

a first transmission unit for transmitting the readout requests generated with the block pointers in the sequence in the management data when a normal playback mode is discriminated; and a second transmission unit for transmitting the readout requests generated with the block pointers in the sequence in the management data by skipping a number of block pointers when a fast playback mode is discriminated, the number of skipped bock pointers corresponding to a video-play speed.

16. The video server of claim 15, wherein each subscriber interface includes:

a block pointer retrieval unit for retrieving a predetermined number of block pointers from the management means in the sequence in the management data;

a pointer buffer for holding the predetermined number of block pointers retrieved by the block pointer retrieval unit; and a retrieval direction unit for directing a retrieval of the predetermined number of block pointers when the number of block pointers remaining in the pointer buffer falls below a predetermined threshold.

17. The video server of claim 16, wherein the management means further includes:

a retrieval amount detection unit for detecting the number of block pointers retrieved by the block pointer retrieval unit; and a charge unit for calculating charges for each request-sender subscriber based on the number of the retrieved block pointers.

18. The video server of claim 2, wherein the exchange means is an ATM cell switch for exchanging cells, and wherein each image memory is a disk array comprising K disk drives for storing the frame blocks, and wherein each block pointer includes an address of each frame block server storing each frame block, and an address of the frame block in the disk array, and wherein the readout request is of a cell structure, and the readout request transmission unit writes the address of frame block server in a header area of the cell structure while writing the address of the frame block in the disk array in a data area of the cell structure to generate a readout request for each block pointer, and wherein the readout control unit in the frame block server detects the address of the frame block in each readout request and reads out the requested frame block by accessing to the address of the disk array.

19. The video server of claim 18, wherein the disk array comprises K disk drives interconnected by a SCSI, and the address of the frame block is formatted for a readout command in a SCSI system.

20. The video server of claim 18, wherein the readout control unit in each frame block server includes:

K queues for holding the readout requests to read out the requested frame blocks from corresponding disk drives in an order of receipt, one queue being furnished for one disk drive;

a readout request receipt unit for receiving the readout requests addressed to the self's frame block server;

an address analysis unit for detecting the address of the request frame blocks contained in each readout request received the readout request receipt unit and in response specifying the disk drives to which each readout request is addressed using the detected address, and for having the queue furnished for the specified disk drive store the readout request;

a disk access unit for retrieving one readout request from the K queues, and in response accessing to a memory area in the specified disk drive at the address contained in the readout request to have the disk drive read out from the requested frame block;

a transmission stand-by buffer for holding the frame blocks read out from the K disk drives; and a frame block transmission unit for retrieving the frame blocks from the transmission stand-by buffer to transmit to the request-sender subscriber interface.

21. The video server of claim 20, wherein the frame block transmission unit includes:

a readout request storage unit for storing a readout request for which a requested frame block has been read out and stored in the transmission stand-by buffer together with a correlation with the frame block;

a frame block retrieval unit for retrieving the frame blocks from the transmission stand-by buffer;

a request-sender detection unit for detecting a request-sender subscriber interface of the readout request for the frame block retrieved from the transmission stand-by buffer;

a frame block division unit for dividing the retrieved frame block from the transmission stand-by buffer into a set of sub-blocks of an equal size;

a writing unit for writing each sub-block into the data area of the cell structure, and writing the request-sender detected by the request-sender detection unit into the header area of the cell structure; and a cell transmission unit for transmitting the cells written with the sub-block and the request sender subscriber interface to the request-sender subscriber interface.

22. The video server of claim 21, wherein the frame block transmission unit includes:

a monitor unit for monitoring an overflow occurring in the ATM cell switch; and a disallow unit for disallowing the cell transmission unit to transmit the cells in case of an overflow, and for allowing the cell transmission unit to transmit the cells when the overflow is eliminated.

23. The video server of claim 21, wherein the readout control unit in each frame block server includes:

a delay timer for counting a time for each readout request upon receipt thereof, a time-out occurring when the delay timer counts up a predetermined value; and a delayed data write unit for writing delay data indicating a delay into the cells of a frame block which has been read out by a time-out readout request, and wherein the ATM cell switch includes:

a higher priority queue for storing the cells which have delay priority in an order of arrival;

a lower priority queue for storing the cells which do not have the delay priority in an order of arrival; and an exchange control unit for controlling a cell exchange in such a way that the cells in the higher priority queue are transmitted first, and then the cells in the lower priority queue are transmitted.

24. The video server of claim 20, wherein the readout control unit in each same block server further includes:

a flat register, each bit therein corresponding to readout requests in the K queues respectively;

a disk monitor unit for monitoring whether one of the K disk drive which stores a frame block requested by a readout request is reading out any other frame block, a requested frame block judgment unit for specifying the frame block requested by the received readout request when the disk monitor unit judges that the disk drive is reading out the another frame block;

a readout request detection unit for detecting all readout requests requesting the from block specified by the requested frame block judgment unit from the K queues and setting the bits for each request;

a bit judgment unit for judging whether the bit in the flag register is set for a first-accumulated readout request in the queue when the disk monitor unit judges a completion of the readout of the another frame block by the queue;

a readout request detection unit for retrieving all the bit-set readout requests in the queue when the bit judgment unit judges the bit is set for the first-accumulated readout request; and a request-sender list generation unit for detecting the request-sender subscriber interface for each readout request retrieved by the readout signal request detection unit to generate a list of the request-senders, and for attaching the list to the corresponding frame blocks in the transmission stand-by buffer, and wherein the frame block transmission unit transmits a frame block with the request-sender list, and wherein the video server further comprises a copy server for receiving the frame block with the request-sender list, and in response making copies of the frame block in a matching number with the request-sender subscriber interfaces in the request-sender list, and for transmitting the copies to the request-sender subscriber interfaces in the request-sender list respectively.

25. The video server of claim 20, wherein the readout control unit in each frame block server further includes:

a table hold unit for holding a table comprising entries, each entry showing a correlation between the frame blocks and the request-sender subscriber interfaces of the readout requests for the frame blocks respectively;

a fill-out unit for receiving the readout requests and in response writing their respective request-sender subscriber interfaces in the entries;

a request sender detection unit for detecting any other request-sender subscriber interface for one frame block while referring to the table when the frame block transmission unit transmits the frame block; and a copy unit for making copies of the frame block, when the request sender detection unit detects other request sender subscriber interface, in a matching number of the other request-sender subscriber interfaces, and wherein the frame block transmission unit transmits the frame block copies to the other request-sender subscribers detected by the request sender detection unit respectively.

26. The video server of claim 20, wherein the readout control unit in each frame block server further includes:

a threshold judgment unit for judging whether an amount of accumulation of each queue has reached a first threshold each time the readout request receipt unit receives a readout request;

an excess amount counter for storing an amount exceeding the threshold for each queue by counting one for the excess amount when the threshold judgment unit judges that the amount of accumulation exceeds the first threshold;

a queue data storage unit for storing data related to the queues that had accumulated the readout requests for each frame block stored in the transmission stand-by buffer;

an excess amount judgment unit for specifying the queues corresponding to the frame blocks in the transmission stand-by buffer while referring to the queue data storage unit, and for judging whether the excess amount for the specified queue has counted more than once;

a higher priority queue judgment unit for detecting a queue whose excess amount has been counted once or more when the excess amount of the specified queues has not counted;

a transmission control unit for controlling a frame-block transmission in such a way that the frame blocks read out by the readout requests stored in the queue detected by the higher priority queue judgment are transmitted;

a dummy request storage unit for storing dummy requests when the excess amount judgment unit judges that no excess amount has been counted up, the dummy request being of a same size as the readout request, and wherein the disk drive discards a dummy request without reading out any frame block when the disk drive retrieves the dummy request.

27. The video server of claim 26, wherein the readout control unit in the frame block server further includes:

a second threshold judgment unit for judging whether an amount of accumulation of a queue whose excess amount is below a second threshold when the excess amount judgment unit judges that the excess amount of the queue has not been counted, the second threshold being smaller than the first threshold, and wherein the higher priority queue detection unit retrieves the data related to the queue whose amount of accumulation is judged to be below the second threshold by the second threshold judgment unit.

28. The video server of claim 26, wherein the readout control unit in the frame block server further includes:

an estimated process time storage unit for storing a time required to process all readout requests in each queue as an estimated process time;

an estimation process time computation unit for computing an estimated process time for each queue each time a readout request is stored in the queue, and for having the estimated process time storage unit store the estimated process time, the estimated process time being computed by adding the sum of a time required to read out the frame block as per readout request and a time required to transmit the frame block, and multiplying the sum by the number of the readout requests in the queue;

a threshold judgment unit for judging whether the estimated process time is below a predetermined threshold for the queue whose excess amount is judged as not having been counted by the excess amount judgment unit, and wherein the higher priority queue judgment unit specifies the queue whose amount of accumulation is judged to be below the threshold by the threshold judgment unit.

29. The video server of claim 28, wherein the readout control unit in each frame block server further includes an estimated process time transmission unit for transmitting the estimated process time computed by the estimated process time computation unit to the request-sender subscriber interface each time a readout request is stored in the queue, and wherein the readout request transmission unit includes a transmission control unit for receiving the estimated process time transmitted by the estimated process time transmission unit for controlling a readout-request transmission in such a way that the readout requests are transmitted before the predetermined timing based on the received estimated process time.

30. The video server of claim 20, wherein each frame block server includes:

a discard timer for counting a time for the readout request each time a readout request is received, a time-out occurring when the discard timer counts up a predetermined value; and a first discard unit for discarding a frame block read out as per a time-out readout request.

31. The video server of claim 30, wherein each subscriber interface includes:

a return time timer for counting a time between a transmission of the readout request and a receipt of the requested frame block, a time-out occurring when the return time counts up a predetermined value;

a second discard unit for discarding a frame block received after time-out occurs in the return time timer for the readout request, and wherein the time-out is found by a following equation:

$$Tm1 = Td1 - Ta1 - Tb1$$

where

Tm1 is the time-out for the discard timer;

Td1 is the time-out for the return time timer;

Ta1 is a minimum delay time between the transmission of the readout request by the readout request transmission unit and the transmission of the requested frame block by the frame block transmission unit; and Tb1 is a minimum delay time between the frame block transmission by the frame block transmission unit and the receipt of the frame block by the frame block output unit.

32. The video server of claim 20, wherein the frame block server includes:

a first discarded timer for counting a time for each frame block stored in the transmission stand-by buffer, a time-out occurs when the first discard timer counts up a redetermined value; and a frame block discard unit for discarding a time-out frame block.

33. The video server of claim 32, wherein each subscriber interface includes:

a return time timer for counting a time between a transmission of the readout request and a receipt of the requested frame block, a time-out occurring when the return time counts up a predetermined value;

a second discard unit for discarding a frame block received after time-out occurs in the return time timer for the readout request, and wherein the time-out is found by a following equation $$Tm1 = Td1 - Ta1 - Tb1$$

where

Tm1 is the time-out for the discard timer;

Td1 is the time-out for the return time timer;

Ta1 is a minimum delay time between the transmission of the readout request by the readout request transmission unit and the transmission of the requested frame block by the frame block transmission unit; and Tb1 is a minimum delay time between the frame block transmission by the frame block transmission unit and the receipt of the frame block by the frame block output unit.

34. The video server of claim 2, wherein the readout control unit includes:

a timer for counting a time for each readout request each time a readout request is received, a time-out occurring when the timer counts up a predetermined value; and a transmission control unit for controlling a frame-block transmission in such way that the frame blocks are transmitted when the time-out occurs for the corresponding readout request.

35. The video server of claim 2, wherein the ATM cell switch includes:

an exchange unit for exchange the frame blocks and the readout requests;

a passing timing detection unit for detecting timing at which the frame blocks and the readout requests pass by;

a passing time timer for counting a time between a passing of the readout request and a passing of the requested frame block; and a first discard unit for discarding a frame block for which the passing time timer has counted a value larger than a redetermined value.

36. The video server of claim 35, wherein the passing timing detection unit in the ATM cell switch includes:

a return time timer for counting a time between a transmission of the readout request and a receipt of the requested frame block, a time-out occurring when the return time timer counts up a predetermined value; and a second discard unit for discharging a frame block when the frame block is received after the time-out occurs in the return time timer, and wherein the predetermined time for the first discard unit is found by a following equation:

$$Tm2=Td1-Tf1-Tg1$$

where

Tm2 is the predetermined time for the first discard unit;

Td1 is the time-out for the return time timer;

Tf1 is a minimum delay time between the transmission of the readout request from a subscriber interface and a detection of the readout request by the passing timing detection unit, Tg1 is a minimum delay time between a transmission of the frame block by the passing timing detection unit and a receipt of the frame block by the subscriber interface.

37. The video server of claim 1, wherein the readout requests and the frame blocks are identified by identification numbers, and wherein the exchange means includes:

an exchange unit for exchanging the frame blocks and the readout requests;

a passing timing detection unit for detecting timing at which the frame block and the readout request pass;

a frame block identifier detection unit for detecting an identification number M of a frame block when the passing timing detection unit detects a passing of the frame block;

a readout request passing monitor unit for detecting an identification number M+N of a readout request when the passing timing detection unit detects a passing of the readout request;

a passing time timer for counting a time between a passing of the readout register identified by the identification number M+N and a passing of the frame block identified by the identification number M;

an estimated passing time computation unit for computing a delay time Tm3+N·Ts between a passing of a readout request identified by an identification number M and the frame block identified by the identification number M, where Tm3 is a counting value of the passing time timer, N is a balance between the identification number of the frame block and the readout request, and Ts is a transmission interval between the readout requests; and a first discard unit for discarding the frame block whose passing is detected by the frame block identifier detection unit when the estimated passing time computed by the estimated passing time consumption unit is longer than a predetermined time.

38. The video server of claim 37, wherein the passing timing detection unit in the ATM cell switch includes:

a return time timer for counting a time between a transmission of the readout request and a receipt of the requested frame block, a time-out occurring when the return time timers counts up a predetermined value; and a second discard unit for discarding a frame block when the frame block is received after the time-out occurs in the return time timer, and wherein the predetermined time for the first discard unit is found by a following equation:

$$Tm2=Td1-Tf1-Tg1$$

where

Tm2 is the predetermined time for the first discard unit;

Td1 is the time-out for the return time timer;

Tf1 is a minimum delay time between the transmission of the readout request from a subscriber interface and a detection of the readout request by the passing timing detection unit, Tg1 is a minimum delay time between a transmission of the frame block by the passing timing detection unit and a receipt of the frame block by the subscriber interface.

39. The video server of claim 1, wherein the management means includes:

a transmission rate storage unit for storing a transmission rate for each piece of digital video data;

a transmission rate retrieval unit for retrieving the transmission rate for the requested digital video data from the transmission rate storage unit when the management data obtainment unit receives the video request;

a traffic amount detection unit for detecting a traffic amount in the exchange means when the transmission rate retrieval unit retrieves the transmission rate; and a rejection unit for judging whether the video request received by the management data obtainment unit should be accepted or rejected based on the transmission rate retrieved by the transmission rate retrieval unit and the traffic amount detected by the traffic amount detection unit, and wherein each subscriber interface includes a notice unit for outputting a rejection notice to the request-sender subscriber terminal when the rejection unit judges to reject the video request.

40. The video server of claim 1, wherein the management means further includes a charge unit for charging each subscriber depending on a number of the block pointers corresponding to a requested piece of digital video data.

41. The video server of claim 1, wherein the exchange means is an ATM cell switch for exchange cells, and wherein the frame block server includes:

a transmission stand-by buffer for holding the frame blocks in a order of transmission;

a readout request storage unit for storing a readout request of which a requested frame block has been read out and stored in the transmission stand-by buffer together with correlation with the frame block;

a frame block retrieval unit for retrieving the frame blocks from the transmission stand-by buffer;

a request-sender detection unit for detecting a request-sender subscriber interface of the readout request for the frame block retrieved from the transmission stand-by buffer;

a frame block division unit for dividing the retrieved frame block from the transmission stand-by buffer into a set of sub-blocks of an equal size;

a writing unit for writing each sub-block into the data area of the cell structure, and writing the request sender detected by the request sender detection unit into the header area of the cell structure; and a cell transmission unit for transmitting the cells written with the sub-block and the request-sender subscriber interface to the request-sender subscriber interface.

42. The video server of claim 41, wherein the frame block transmission unit includes:

a monitor unit for monitoring an overflow occurring in the ATM cell switch; and a disallow unit for disallowing the cell transmission unit to transmit the cells in case of an overflow, and for allowing the cell transmission unit to transmit the cells when the overflow is eliminated.

43. The video server of claim 41, wherein each image memory includes a disk array comprising a plurality of disk drives, and wherein the readout control unit further includes a plurality of queues, each queue being furnished for each disk drive respectively, and holding the readout requests to read out the frame blocks from their corresponding disk drives.

44. The video server of claim 43, wherein the readout request includes an address of each frame block server that stores each frame block, and an address of the frame block in the frame block server in a corresponding disk array, and wherein the readout request is of a cell structure, and each subscriber interface writes the address of the frame block server in a header area of the cell structure and the address of the frame block server in a data area of the cell structure.

45. The video server of claim 8, wherein the number of subscribers to whom the video server can supply the digital video data must satisfy a following equation:

$$NSB < EX/(p \times rt)$$

where

NSB is the number of the subscribers who can access to the video server simultaneously, EX is an exchange ability of the switch means, rt is a transmission rate of a cable line interconnecting each subscriber interface and each subscriber terminal, p is a use frequency per subscriber (times/second).

46. The video server of claim 45, wherein the number of the frame block servers is found by $$NDB > EX/rr$$

where

NDB is the number of the frame block servers, rr is a maximum retrieval rate of the frame block server.

47. The video server of claim 46, wherein the number of the subscribers who can access to the video server at a time is found by $$NACC = NDB \times (rr/rt)$$

wherein

NACC is the number of the subscribers.

48. The video server of claim 47, wherein a memory capacity of each frame block server can be found by $$Mem = (DB \times NB)$$

where

Mem is the memory capacity of the frame block server,

DB is a data size of one frame block,

NB is the maximum number of the frame blocks stored in one frame block server, and wherein the total memory capacity must satisfy an equation $$Mem > Sm \times T \times rt/NDB$$

where

Sm is the number of source videos,

T is a length of a piece of digital video data.

49. The video server of claim 48, wherein a memory capacity of the block buffer in each subscriber interface is found by $$B > tr(rr - rt)$$

where

B is the memory capacity of the block buffer, tr is a time required to transmit the frame block from the frame block server to the subscriber interface.

50. A video server which transmits digital video data comprising frame blocks having a predetermined sequence and stored therein to subscriber terminals as per video requests and which can rewrite the digital video data comprising:

a plurality of frame block servers, each including an image memory, a readout control unit for the image memory, and a writing control unit for the image memory, each image memory storing a plurality of said frame blocks nonconsecutive with respect to said predetermined display sequence, the read control unit receiving readout requests and in response reading out requested frame blocks from the adequate image memory, the write control unit receiving a write request and in response writing the frame blocks into the image memory;

management means for storing management data specifying which frame block server stores which frame block in the image memory and which frame block server has a writable area in the image memory, and for updating the management data each time a frame block is written in the image memory;

a plurality of subscriber interfaces for receiving the video requests from the subscriber terminals, and in response sending readout requests to frame block servers to readout frame blocks forming requested digital image data in said predetermined sequence while referring to the management data, and for transmitting the frame blocks transmitted from the frame block servers to the subscriber terminals at such timing that ensures continuous video-play;

a write interface for obtaining a digital video to divide the digital video into a set of sections, and for transmitting the divided sections to the frame block servers having the writable areas together with the write request, each section being of a same size as the frame block; and exchange means for interconnecting each block server, each subscriber interface, and each write interface, and for transferring the frame blocks read out from the frame block servers and transmitted from the write interface to the request-sender subscriber interfaces and the frame block servers having the writable areas respectively.

51. The video server of claim 50, wherein the management data comprise a plurality of block pointers, each identifying a location of each frame block respectively, and including an address of each frame block server that stores each frame block respectively, and wherein each subscriber interface includes:

a management data obtainment unit for receiving the video request from the subscriber terminal, and in response retrieving block pointers for the requested piece of digital video data from the management means;

a readout request generation unit for generating a readout request for each retrieved block pointer addressing to the frame block server specified by the address included therein;

a readout request transmission unit for transmitting the readout requests to the specified frame block servers, one readout request being transmitted at a time; and a frame block output unit for receiving the frame blocks read out as per the readout requests, and in response outputting the frame blocks to the request-sender subscriber terminal at the predetermined timing.

52. The video server of claim 51, wherein the image memory in each frame block server has a memory area which is divided into a set of area, each area being sufficiently large to record one frame block, and the management means includes:

a write pointer storage unit for storing write pointers, each write pointer being data showing a correspondence between the writable area in the image memory and its location;

a write control data generation unit for retrieving the write pointers for each frame block server from the write pointer storage unit when the write interface receives the write request, and for aligning the retrieved write pointers in sequence to generate write control data for a piece of digital video data to be recorded;

a management data conversion unit for converting the write control data generated by the write control data generation unit into the management data, and wherein the write interface includes:

a management data obtainment unit for receiving the write request, and in response retrieving the write pointers for the piece of digital video data to be recorded from the management means; and a write request generation unit for generating a write request for each retrieved write pointer addressing to the frame block server specified by the write pointer;

a division unit for generating a plurality of frame blocks by dividing the digital video data;

a write request transmission unit for transmitting the write requests first and then the requested frame blocks to the specified frame block servers, one of one write request and requested frame block being transmitted at a time, and wherein each specified frame block server writes the frame block on the writable area in the image memory specified by the write request when the write request and the frame block are received.

53. The video server of claim 52, wherein the exchange means is an ATM cell switch for exchanging cells, and wherein each image memory is a disk array comprising K disk drives for storing the frame blocks, and wherein each block pointer includes an address of each frame block server storing each frame block, and an address of the frame block in the disk array, and wherein each write pointer includes an address of a frame block server storing the corresponding frame block, and an address of the writable area in the disk array, and wherein the readout request is of a cell structure, and the readout request transmission unit writes the address of the frame block server in a header area of the cell structure while writing the address of the frame block in the disk array in a data area of the cell structure to generate a readout request for each block pointer, and the write request transmission unit writes the address of the frame block server in the header area while writing the address of the writable area in the data area, and wherein the readout control unit in the frame block server detects the address of the frame block in each readout request and reads out the requested frame block by accessing to the address of the disk array, and wherein the write control unit in the frame block server detects the address of the frame block in each write request and writes the frame block in the writable area.

54. The video server of claim 53, wherein the disk array comprises K disk drives interconnected by a SCSI, and the address of the frame block is formatted for a readout command in a SCSI system, and wherein the address of the writable area is formatted for a write command in the SCSI system.

55. The video server of claim 53, wherein the readout control unit in each frame block server includes:

K queues for holding the readout requests to read out the requested frame blocks from corresponding disk drives in an order of receipt, one queue being furnished for one disk drive;

a readout request receipt unit for receiving the readout requests addressed to the self's frame block server;

an address analysis unit for detecting the address of the requested frame block contained in each readout request received by the readout request receipt unit and in response specifying the disk drives to which each readout request is addressed using the detected address, and for having the queue furnished for the specified disk drive store the readout request;

a disk access unit for retrieving one readout request from the K queues, and in response accessing to a memory area in the specified disk drive at the address contained in the readout request to have the disk drive read out the requested frame block;

a transmission stand-by buffer for holding the frame blocks read out from the K disk drives; and a frame block transmission unit for retrieving the frame blocks from the transmission stand-by buffer to transmit to the request-sender subscriber interface.

56. The video server of claim 55, wherein the write control unit includes:

a write request receipt unit for receiving the write requests addressed to the self's frame block server;

a frame block receipt unit for receiving the frame blocks addressed to the self's frame block server;

K queues for holding the write requests received by the write request receipt unit in an order of receipt, each queue being furnished for each disk drive respectively;

a frame block buffer for holding the frame blocks received by the frame block receipt unit;

an address analysis unit for detecting the address of the frame block in each write request received by the write request receipt unit, and for specifying the disk drive to which each write request is addressed using the detected address, and for having the queue furnished for the specified disk drive store the write request; and a readout request judgment unit for judging whether there is any readout request in the queue furnished for the disk drive specified by the address analysis unit, and wherein each disk drive forming the disk array includes a write control unit for writing the frame block as per the write request in the frame block buffer on the writable area specified by the address in the write request by retrieving the write request from the queue when there is no readout request in the queue.

57. The video server of claim 56, wherein the frame block transmission unit includes:

a readout request storage unit for storing a readout request for which a requested frame block has been read out and stored in the transmission stand-by buffer together with a correlation with the frame block;

a frame block retrieval unit for retrieving the frame blocks from the transmission stand-by buffer;

a request-sender detection unit for detecting a request-sender subscriber interfaces of the readout request for the frame block retrieved from the transmission stand-by buffer;

a frame block division unit for dividing the retrieved frame block from the transmission stand-by buffer into a set of sub-blocks of an equal size;

a writing unit for writing each sub-block into the data area of the cell structure, and writing the request-sender detected by the request-sender detection unit into the header area of the cell structure; and a cell transmission unit for transmitting the cells written with the sub-block and the request-sender subscriber interface to the request-sender subscriber interface.

58. The video server of claim 57, wherein the frame block transmission unit includes:

a monitor unit for monitoring an overflow occurring in the ATM cell switch; and a disallow unit for disallowing the cell transmission unit to transmit the cells in case of an overflow, and for allowing the cell transmission unit to transmit the cells when the overflow is eliminated.

59. The video server of claim 57, wherein the readout control unit in each frame block server includes:

a delay timer for counting a time for each readout request upon receipt thereof, a time-out occurring when the delay timer counts up a redetermined value; and a delayed data write unit for writing delay data indicating a delay into the cells of a frame block which has been read out by a time-out readout request, and wherein the ATM cell switch includes:

a higher priority queue for storing the cells which have delay priority in an order of arrival;

a lower priority queue for storing the cells which do not have the delay priority in an order of arrival; and an exchange control unit for controlling a cell exchange in such a way that the cells in the higher priority queue are transmitted first, and then the cells in the lower priority queue are transmitted.

60. A video server which transmits digital video data comprising frame blocks having a predetermined sequence and stored therein to subscriber terminals as per video requests comprising:

a plurality of frame block servers, each including an image memory and a readout control unit for the image memory, each image memory storing a plurality of said frame blocks nonconsecutive with respect to said predetermined display sequence, the readout control unit receiving readout requests and in response reading out requested frame blocks from the image memory;

management means for storing management data specifying which frame block server stores which frame block in the image memory;

a plurality of subscriber interfaces for receiving the video requests from the subscriber terminals, and in response sending readout requests to the frame block servers to readout the frame blocks forming requested digital image data in said predetermined sequence while referring to the management data, and for transmitting the frame blocks transmitted from the frame block servers to the subscriber terminals at such timing that ensures continuous play, each subscriber interface being connected to a plurality of terminals; and exchange means for interconnecting each block server and each subscriber interface to transfer the frame blocks read out from the frame block servers as per the readout requests to the request-sender subscriber interfaces.

61. The video server of claim 60, wherein the management data comprise a plurality of block pointers, each identifying a location of each frame block respectively, and including an address of each frame block server that stores each frame block respectively, and wherein each subscriber interface includes:

a management data obtainment unit for receiving the video request from the subscriber terminal, and in response retrieving block pointers for the requested piece of digital video data from the management means;

a readout request generation unit for generating a readout request for each retrieved block pointer addressing to the frame block server specified by the address included therein;

a readout request transmission unit for transmitting the readout requests to the specified frame block servers, one readout request being transmitted at a time; and a frame block output unit for receiving the frame blocks read out as per the readout requests, and in response outputting the frame blocks to the request-sender subscriber terminal at predetermined timing.

62. The video server of claim 61, wherein each subscriber interface is connected to a plurality of subscriber terminals, each subscriber terminal outputting a video request including a terminal identifier, and wherein the management data obtainment unit further includes an identifier detection unit for detecting the terminal identifiers contained in the video requests sent from the subscriber terminals upon receipt thereof, and wherein the readout request transmission unit further includes an identifier attachment unit for attaching the terminal identifiers detected by the identifier detection unit to each readout request generated by the readout request generation unit, and wherein the readout control unit in each frame block server includes:

a readout request receipt unit for detecting the terminal identifiers when receiving the readout requests from the readout request transmission unit; and a frame block transmission unit for attaching the terminal identifiers detected by the readout request receipt unit to each request frame block read out as per the readout requests before the transmission thereof to the request-sender subscriber interface, and wherein the frame block output unit further includes a distribution output control unit for receiving the terminal-identifier-attached frame blocks and in response outputting the same to the request-sender subscriber terminal identified by the terminal identifier.

63. The video server of claim 62, wherein the frame block output unit includes:

a frame block receipt unit for receiving the frame blocks addressed to the self's subscriber interface and attached with the terminal identifier;

a block buffer for accumulating a certain number of frame blocks received by the frame block receipt unit;

an accumulated amount judgment unit for judging whether the block buffer stores more than a predetermined number of frame blocks; and an output unit for outputting the certain number of the frame blocks accumulated in the block buffer when the accumulated amount judgment unit judges that the block buffer stores more than the predetermined number of frame blocks, one frame block being outputted at a time to the request-sender subscriber terminal.

64. The video server of claim 63, wherein the frame block output unit further includes a check unit for checking an overflow and an underflow occurring at the block buffer, and wherein the readout request transmission unit includes a transmission control unit for controlling a readout-request transmission in such a way that the readout request are transmitted after the predetermined timing upon detection of the overflow by the check unit, and before the predetermined timing upon detection of the underflow by the check unit.

65. The video serve of claim 62, wherein the exchange means is an ATM cell switch for exchanging cells, and wherein each image memory is a disk array comprising K disk drives for storing the frame blocks, and wherein each block pointer includes an address of each frame block server storing each frame block, and an address of the frame block in the disk array, and wherein the readout request is of a cell structure, and the readout request transmission unit writes the address of the frame block server in a header area of the cell structure while writing the address of the frame block in the disk array in a data area of the cell structure to generate a readout request for each block pointer, and wherein the readout control unit in the frame block server detects the address of the frame block in each readout request and reads out the requested frame block by accessing to the address of the disk array.

66. The video server of claim 65, wherein the disk array comprises K disk drive interconnected by a SCSI, and the address of the frame block is formatted for a readout command in a SCSI system.

67. The video server of claim 65, wherein the readout control unit in each frame block server includes:

K queues for holding the readout requests to read out the requested frame blocks from corresponding disk drives in an order of receipt, one queue being furnished for one disk drive;

an address analysis unit for detecting the address of the requested frame block contained in each readout request received by the readout request receipt unit and in response specifying the disk drives to which each readout request is addressed using the detected address, and for having the queue furnished for the specified disk drive store the readout request;

a disk access unit for retrieving one readout request from the K queue, and in response accessing to a memory area in the specified disk drive at the address contained in the readout request to have the disk drive read out the requested frame block;

a transmission stand-by buffer for holding the frame blocks read out from the K disk drives; and a frame block transmission unit for retrieving the frame blocks from the transmission stand-by buffer, and for attaching the terminal identifier to the retrieved frame block to transmit to the request-sender subscriber interface.

68. The video server of claim 67, wherein the frame block transmission unit includes:

a readout request storage unit for storing a readout request for which a requested frame block has been read out and stored in the transmission stand-by buffer together with a correlation with the frame block;

a frame block retrieval unit for retrieving the frame blocks from the transmission stand-by buffer;

a request-sender detection unit for detecting a request-sender subscriber interface of the readout request for the frame block retrieved from the transmission stand-by buffer;

an identifier attachment unit for attaching the terminal identifier in the retrieved readout request detected by the readout receipt unit to the requested frame block;

a frame block division unit for dividing the retrieved frame block attached with the terminal identifier from the transmission stand-by buffer into a set of sub-blocks of an equal size;

a writing unit for writing each sub-block into the data area of the cell structure, and writing the request-sender detected by the request-sender detection unit into the header area of the cell structure; and a cell transmission unit for transmitting the cells written with the sub-blocks and the request-sender subscriber interface to the request-sender subscriber interface.

69. The video server of claim 68, wherein the frame block transmission unit includes:

a monitor unit for monitoring an overflow occurring in the ATM cell switch; and a disallow unit for disallowing the cell transmission unit to transmit the cells in case of an overflow, and for allowing the cell transmission unit to transmit the cells when the overflow is eliminated.

70. The video server of claim 68, wherein the readout control unit in each frame block server includes:

a delay timer for counting a time for each readout request upon receipt thereof, a time-out occurring when the delay timer counts up a redetermined value; and a delayed data write unit for writing delay data indicating a delay into the cells of a frame block which has been read out by a time-out readout request, and wherein the ATM cell switch includes:

a higher priority queue for storing the cells which have delay priority in an order of arrival;

a lower priority queue for storing the cells which do not have the delay priority in an order of arrival; and an exchange control unit for controlling a cell exchange in such a way that the cells in the higher priority queue are transmitted first, and then the cells in the lower priority queue are transmitted.

71. The video server of claim 61, wherein the readout request transmission unit includes:

a most recent transmission time storage unit for storing a transmission time when a readout request is transmitted most recently;

a transmission judgment unit for judging whether a readout request is being transmitted for another subscriber when the management data obtainment unit receives a video request from one subscriber;

a time control unit for controlling a readout-request transmission for one subscriber while the readout request for another subscriber is being transmitted in such a way that a first readout request for the video request from the former subscriber is transmitted after a certain interval from the most recent transmission time, and that a second and subsequent readout requests are transmitted at predetermined issuance intervals from the transmission of the first readout request, the certain interval being found by multiplying a mean frame-block transmission rate of the plurality of subscriber interfaces in transmitting the frame blocks to the request-sender subscriber terminals by the number of the connected subscriber terminals, and dividing an amount of data of one frame block by the resulting value, the predetermined issuance interval being found by dividing the frame-block data amount by the transmission rate of one frame block.

72. The video server of claim 61, wherein the readout request transmission unit includes:

a transmission schedule generation unit for making out a transmission schedule of each readout request for a video requests upon receipt thereof by the management data obtainment unit;

a clock unit for showing a current time;

a transmission time buffer for storing a next scheduled time, the next scheduled time being a scheduled time nearest to the current time;

a transmission control unit for controlling a readout-request transmission in such a way that a readout request scheduled for the next scheduled time is transmitted when the clock unit shows the next scheduled time;

a transmission scheduled time determination unit for determining the transmission schedule, when the management data obtainment unit receives a video request from another subscriber, by setting the transmission scheduled time for a first readout request after a predetermined interval from the next scheduled time, and by setting scheduled times for second and subsequent readout requests at predetermined issuance intervals from the scheduled time for the first readout request;

a schedule write unit for writing the transmission scheduled times determined by the transmission scheduled time determination unit into the transmission schedule, the certain interval being found by multiplying a mean frame-block transmission rate of the plurality of subscriber interfaces in transmitting the frame-blocks to the request-sender subscriber terminals by the number of the connected subscriber terminals, and dividing an amount of data of one frame block by the resulting value, the predetermined issuance interval being found by dividing the frame-block data amount by the transmission rate of one frame block.

73. A video server which transmits digital video data comprising frame blocks having a predetermined sequence and stored therein to subscriber terminals as per video requests comprising:

a plurality of frame block servers, each including an image memory and a readout control unit for the image memory, each image memory storing a plurality of said frame blocks nonconsecutive with respect to said predetermined display sequence, the readout control unit receiving readout requests and in response reading out requested frame blocks from the image memory;

management means for storing management data specifying which frame block server stores which frame block in the image memory;

a plurality of subscriber interfaces for receiving the video requests from the subscriber terminals, and in response sending readout requests to the frame block servers to readout the frame blocks forming requested digital image data in said predetermined sequence while referring to the management data, and for transmitting the frame blocks transmitted from the frame block servers to the subscriber terminals at such timing that ensures a continuous play; and an exchange network including a plurality of exchange units interconnected to each other, each being selectively connected to a plurality of frame block servers and a plurality of subscriber interfaces for transferring the frame blocks addressed to the self's frame block server to the request-sender subscriber interfaces respectively.

74. The video server of claim 73, wherein the management data comprises a plurality of block pointers, each identifying a location of each frame block respectively, and including an address of each frame block server that stores each frame block respectively, and wherein each subscriber interface includes:

a management data obtainment unit for receiving the video request from the subscriber terminal, and in response retrieving block pointers for the requested piece of digital video data from the management means;

a readout request generation unit for generating a readout request for each retrieved block pointer addressing to the frame block server specified by the address included therein;

a readout request transmission unit for transmitting the readout requests to the specified frame block servers, one readout request being transmitted at a time; and a frame block output unit for receiving the frame blocks read out as per the readout requests, and in response outputting the frame blocks to the request-sender subscriber terminal at predetermined timing.

75. The video server of claim 74, wherein the exchange network is an ATM cell switch for transferring the cells, and wherein each image memory is a disk array comprising K disk drives for storing the frame blocks, and wherein each block pointer includes an address of each frame block server storing each frame block, and an address of the frame block in the disk array, and wherein the readout request is of a cell structure, and the readout request transmission unit writes the address of the frame block server in a header area of the cell structure while writing the address of the frame block in the disk array in a data area of the cell structure to generate a readout request for each block pointer, and wherein the readout control unit in the frame block server detects the address of the frame block in each readout request and reads out the requested frame block by accessing to the address of the disk array.

76. The video server of claim 75, wherein the disk array comprises K disk drives interconnected by a SCSI, and the address of the frame block is formatted for a readout command in a SCSI system.

77. The video server of claim 75, wherein the readout control unit in each frame block server includes:

K queues for holding the readout requests to read out the requested frame blocks from corresponding disk drives in an order of receipt, one queue being furnished for one disk drive;

a readout request receipt unit for receiving the readout requests addressed to the self's frame block server;

an address analysis unit for detecting the address of the requested frame block contained in each readout request received by the readout request receipt unit and in response specifying the disk drives to which each readout request is addressed using the detected address, and for having the queue furnished for the specified disk drive store the readout request;

a disk access unit for retrieving one readout request from the K queues, and in response accessing to a memory area in the specified disk drive at the address contained in the readout request to have the disk drive read out the requested frame block;

a transmission stand-by buffer for holding the frame blocks read out from the K disk drives; and a frame block transmission unit for retrieving the frame blocks from the transmission stand-by buffer to transmit to the request-sender subscriber interface.

78. The video server of claim 77, wherein the frame block transmission unit includes:

a readout request storage unit for storing a readout request for which a requested frame block has been read out and stored in the transmission stand-by buffer together with a correlation with the frame block;

a frame block retrieval unit for retrieving the frame blocks from the transmission stand-by buffer;

a request-sender detection unit for detecting a request-sender subscriber interface of the readout request for the frame block retrieved from the transmission stand-by buffer;

a frame block division unit for dividing the retrieved frame block from the transmission stand-by user into a set of sub-blocks of an equal size;

a writing unit for writing each sub-block into the data area of the cell structure, and writing the request-sender detected by the request-sender detection unit into the header area of the cell structure; and a cell transmission unit for transmitting the cells written with the sub-block and the request-sender subscriber interface to the request-sender subscriber interface.

79. The video server of claim 78, wherein the frame block transmission unit includes:

a monitor unit for monitoring an overflow occurring in the ATM cell switch; and a disallow unit for disallowing the cell transmission unit to transmit the cells in case of an overflow, and for allowing the cell transmission unit to transmit the cells when the overflow is eliminated.

80. A method for storing and distributing a plurality of video data to a plurality of clients in response to video requests made by said clients comprising;

dividing each video into a plurality of discrete video segments and storing said video segments in a plurality of video segment file servers;

recording the location of each video segment and the intended sequence of each video segment in a control file, and storing each control file in a system manager;

providing a client interface which is connected to a plurality of client terminals for receiving client requests and communicating a readout request corresponding to said client request to a video file sequence manager;

communicating the control file of the video data corresponding to each readout request from said system manager to said video file sequence manager;

retrieving the video segments from the video segment file servers to the video file sequence manager according to said control file of the video data;

transmitting each video segment retrieved by said video file sequence manager to said client interface in a predetermined sequence profile specified by said control file and coordinated to achieve a continuous transmission of said video data; and transmitting said continuous transmission of said video data from said client interface to said client.

81. The method for storing and transmitting video data as recited in claim 80 further including the step of monitoring the amount of video segments arriving at said video file sequence manager and temporarily storing said video segments in a buffer when an overflow occurs, and retrieving said video segments from said buffer into said video file sequence manager when said overflow has expired.

82. The method for storing and transmitting video data as recited in claim 81 further including the step of assigning priority to video segments having a shorter retrieval time to be transmitted by said video file sequence manager to said client interface whereby the continuous transmission of said video data is maintained.

83. The method for storing and transmitting video data as recited in claim 81 wherein the step of dividing the video data into video segments is performed to distribute an approximately equal number of video segments in each video segment file server.

84. A video storage and distribution system for accessing and transmitting video data to a plurality of subscribers according to submitted requests by said subscribers, said system designed to transmit a requested video data to multiple subscribers using a plurality of video storage units load balanced to operate at generally identical delivery loads, each said requested video data comprised of discrete video segments stored substantially equally among the plurality of video storage units, said system comprising:

a plurality of subscriber terminal means for transmitting subscriber requests for video data;

a subscriber interface connected to said plurality of subscriber terminal means adapted to receive said request for video data and generate a readout command for said requested video data;

a system control unit comprising sequence information and address information corresponding to said requested video data;

a plurality of video storage units comprising readout command receiving means for receiving one of said readout commands generated by said subscriber interface, video segment storage means for storing a plurality discrete video segment data corresponding to increments of said requested video data according to said address information, and video segment data retrieval means for retrieving said video segment data corresponding to said readout command; and an exchange unit connected to each of said plurality of video storage units, said subscriber interface, and said system control unit, said exchange unit receiving said readout command from said subscriber interface and retrieving said sequence information and address information corresponding to said requested video data from said system control unit and submitting readout commands to the video storage unit corresponding with each video segment of said requested video data as determined by the address information and sequence information, said exchange unit thereafter receiving said video segment data retrieved by said video segment data retrieval means of said video storage unit, and said exchange unit thereafter transmitting said video segment data sequentially to said subscriber interface for continuous delivery to said subscriber terminal.

85. A method for transmitting a video image sequence of a predetermined duration concurrently to a plurality of clients in response to requests by said clients comprising:

dividing said video image sequence into a plurality of discrete video segments;

distributing said discrete video segments among a plurality of video segment storage units;

storing a storage address for each discrete video segment in a control unit, and storing a predetermined sequence data of said video segments in said control unit;

receiving a first request for said video image sequence from a first client;

transmitting said first request to a data exchange unit, which retrieves said sequence data and sends a request to the address of said video segment corresponding to said first video segment of said sequence data, and after receiving same transmitting said first video segment to said first user according to a predetermined schedule;

receiving a second request for said video image sequence from a second client;

transmitting said second request to said data exchange, which retrieves said sequence data and sends a request to the address of said video segment corresponding to said first video segment, and after receiving same transmitting said first video segment to said second user according to a predetermined schedule; and locating and retrieving each successive video segment and transmitting each video segment to each requesting client according to said retrieved sequence and a predetermined schedule.

86. A system for storing, retrieving, and delivering a plurality of audio visual works such as feature length movies to a plurality of requesting clients, each audio-visual work being deliverable to a plurality of clients concurrently and delivery of said audio-visual work to each of said clients is independent of delivery of said audio-visual work to all other clients, said system comprising:

a plurality of video storage servers each comprising a computer interface and video data storage means for storing a plurality of video data blocks, each said video data block containing video data corresponding to a segment of one of said plurality of audio-visual works such that when each video data block corresponding to one of said audio-visual works is delivered continuously in a predetermined sequence said audio-visual work is reproduced, said video data blocks stored in said video storage servers such that no video storage server stores two sequential video data blocks of a given audio-visual work;

a sequence storage means for storing sequence information for each audio-visual work and for transmitting said sequence information, said sequence information comprising the predetermined sequence of the video data blocks and video storage server storing each video block;

a plurality of sequence control brokers connected to a plurality of clients, said sequence control brokers adapted to receive a video request for an audio-visual work from said client and generate a readout command for said video request, and further adapted to receive video data and transmit said video data to said client; and a control unit connected to each of said plurality of sequence control brokers, said sequence storage means, and each of said video storage servers, said control unit adapted to receive said readout commands generated from said control brokers, retrieve the sequence information for the video request corresponding to said readout request, retrieve the video data sequentially from the plurality of video data servers for the audio-visual work according to said sequence information, and transmit the video data sequentially to the sequence control brokers such that an uninterrupted delivery of said audio-visual work to said client is achieved.

* * * * *